United States Patent
Chang et al.

(10) Patent No.: US 11,614,599 B2
(45) Date of Patent: *Mar. 28, 2023

(54) OPTICAL IMAGE CAPTURING SYSTEM

(71) Applicant: Ability Opto-Electronics Technology Co., Ltd., Taichung (TW)

(72) Inventors: Yeong-Ming Chang, Taichung (TW); Chien-Hsun Lai, Taichung (TW); Yao-Wei Liu, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 325 days.

This patent is subject to a terminal disclaimer.

(21) Appl. No.: 16/823,362

(22) Filed: Mar. 19, 2020

(65) Prior Publication Data

US 2021/0063691 A1    Mar. 4, 2021

(30) Foreign Application Priority Data

Aug. 30, 2019 (TW) ................................ 108131419

(51) Int. Cl.
 *G02B 9/34* (2006.01)
 *G02B 13/00* (2006.01)
 *G02B 3/04* (2006.01)

(52) U.S. Cl.
 CPC ............. *G02B 13/004* (2013.01); *G02B 3/04* (2013.01); *G02B 9/34* (2013.01)

(58) Field of Classification Search
 CPC .......... G02B 9/36; G02B 3/02; G02B 13/004; G02B 9/34; G02B 13/04
 See application file for complete search history.

(56) References Cited

U.S. PATENT DOCUMENTS

| 8,179,616 | B1 * | 5/2012 | Hsu | ........................ G02B 9/34 |
| | | | | 359/781 |
| 9,958,643 | B2 * | 5/2018 | Lai | ........................ G02B 9/34 |
| 10,175,455 | B2 * | 1/2019 | Lai | ..................... G02B 27/0025 |
| 2014/0078603 | A1 * | 3/2014 | You | ..................... G02B 13/0015 |
| | | | | 359/759 |
| 2018/0017760 | A1 * | 1/2018 | Lai | ........................ G02B 5/208 |
| 2018/0024319 | A1 * | 1/2018 | Lai | ...................... G02B 13/004 |
| | | | | 359/739 |

FOREIGN PATENT DOCUMENTS

| CN | 108267841 A | 7/2018 |
| CN | 110161651 A | 8/2019 |
| TW | 201825945 A | 7/2018 |
| TW | I638200 B | 10/2018 |

OTHER PUBLICATIONS

Office Action of corresponding CN application, published on May 19, 2022.

* cited by examiner

*Primary Examiner* — Joseph P Martinez
(74) *Attorney, Agent, or Firm* — Wang Law Firm, Inc.

(57) ABSTRACT

The invention discloses a four-piece optical lens for capturing image and a four-piece optical module for capturing image. From an object side to an image side, the optical lenses along the optical axis comprises a first lens with refractive power, a second lens with refractive power, a third lens with refractive power, and a fourth lens with refractive power; and at least one of an image-side surface and object-side surface of each of the four lens elements are aspheric. The optical lens can increase aperture value and improve the image quality for use in compact cameras.

23 Claims, 15 Drawing Sheets

OPTICAL IMAGE CAPTURING SYSTEM

BACKGROUND OF THE INVENTION

1. Field of the Invention

The present disclosure relates to an optical image capturing system, and more particularly to a compact optical image capturing system which can be applied to electronic products.

2. Description of the Prior Art

In recent years, with the rise of portable electronic devices having camera functionalities, the demand for an optical image capturing system gradually increased. The image sensing devices of ordinary optical systems is commonly selected from charge coupled devices (CCD) or complementary metal-oxide semiconductor sensors (CMOS sensors). As advanced semiconductor manufacturing technology enables the miniaturization of pixel sizes of the image sensing device, the development of optical image capturing systems has been directed towards developing systems with high pixel counts, thereby increasing the demand on image quality.

Traditional optical image capturing systems of a portable electronic device mainly comprise a two-lens or three-lens design structure. However, pixel counts of portable devices continues to increase, and end users require large apertures to fulfill functionalities such as micro filming and night filming, and require a wide-view angle design to fulfill self-filming functionalities of front facing cameras. But designing optical image capturing systems with a large aperture often results in more aberration and deteriorated quality when forming peripheral images along with difficulties in manufacturing; on the other hand, optical image capturing systems with a wide-angle view design has an increased distortion rate in the formed images, thus optical image capturing systems in prior arts cannot meet higher level filming requirements.

Therefore, how to design an optical image capturing system capable of balancing the requirement for higher total pixel count and quality of the formed images as well as the miniaturization of camera modules by effectively increasing the amount of admitted light and the angle of view of the optical image capturing system has become a pressing issue.

SUMMARY OF THE INVENTION

An aspect of an embodiment of the present disclosure directs to an optical image capturing system and an optical image capturing lens which use combinations of refractive powers of four pieces of optical lenses along with convex and concave surfaces of the four pieces of optical lenses (the convex or concave surface in the disclosure denotes the geometrical shape of an image-side surface or an object-side surface of each lens on an optical axis) to further increase an amount of admitted light into the optical image capturing system and an angle of view of the optical lenses, while possessing a certain amount of relative illuminance and improving a total number of pixels and an image quality for image formation, so as to be applied to miniaturized electronic products.

In addition, when it comes to certain applications of optical imaging, there will be a need to capture images with respect to light sources having wavelengths of both visible and infrared ranges, an example being IP video surveillance cameras that are equipped with a Day & Night function. The visible light range for human vision is in a wavelength range from 400 nm to 700 nm, but images formed on a camera sensor includes the infrared light which is invisible to human eyes. Therefore, in order to ensure that the camera sensor only retains light visible to human eyes, an IR Cut filter Removable (ICR) may be configured before the lens of the IP video surveillance camera under certain circumstances, so as to enhance the "fidelity" of the captured image. The ICR element of the IP video surveillance camera may completely filter out infrared light in a daytime mode so as to avoid color cast; whereas in a night mode, the ICR allows infrared light to pass through to enhance image brightness. Nevertheless, the ICR is bulky in size and expensive, so as to be disadvantageous when designing and manufacturing miniaturized surveillance cameras for the future.

An embodiment of the present disclosure simultaneously directs to an optical image capturing system and an optical image capturing lens that utilize the refractive power of four lenses, a combination of convex and concave surfaces of the four lenses, as well as a selection of materials thereof, so as to reduce the difference between the image focal length of visible light and the image focal length of infrared light of the image capturing system; that is, to achieve a near "confocal" effect such that the use of ICR elements is not essential.

The terminologies together with their numerals for the lens parameters related to the embodiment of the present disclosure are provided in the following paragraphs for reference in subsequent descriptions:

Lens Parameters Related to Magnification of the Optical Image Capturing System and the Optical Image Capturing Lens:

The optical image capturing system and the optical image capturing lens of the present disclosure may be simultaneously designed for and applied in a biometric field, such as in facial recognition. When the embodiment of the present disclosure is used to capture images for facial recognition, infrared light may be selected as an operation wavelength. For a face with a width of about 15 centimeters (cm) at a distance of about 25-30 cm, at least 30 horizontal pixels may capture an image thereof in a horizontal direction of an image sensing device (a pixel size of the image sensing device is 1.4 micrometers (μm)). A linear magnification of the infrared light on the image plane is LM, which meets the following conditions: LM=(30 horizontal pixels)*(1.4 μm pixel size)/(15 cm of the width of the photographed object); wherein LM≥0.0003. In the meantime, visible light may also be selected for as an operation wavelength. For a face with a width of about 15 cm at a distance of about 25-30 cm, at least 50 horizontal pixels may capture an image thereof in the horizontal direction of the image sensing device (the pixel size thereof is 1.4 micrometers (μm)).

Lens Parameters Related to Length or Height of the Lens

Regarding visible spectrum, the present disclosure may select a wavelength of 555 nm as a primary reference wavelength and a basis for measuring focus shift; regarding infrared spectrum (700-1300 nm), the present disclosure may select a wavelength of 850 nm as the primary reference wavelength and the basis for measuring focus shift.

The optical image capturing system has a first image plane and a second image plane. The first image plane is an image plane particularly for visible light, which is perpendicular to the optical axis, and a central field of view (FOV) of the first image plane has a maximum value of a through-focus modulation transfer function rate (MTF) at a first spatial frequency; and the second image plane is an image plane particularly for infrared light, which is perpendicular to the optical axis, and a central field of view of the second image plane has a maximum value of the through-focus modulation transfer function rate (MTF) at the first spatial frequency. The optical image capturing system also has a first average image plane and a second average image plane. The first average image plane is an image plane particularly for visible light, which is perpendicular to the optical axis, and configured at the average position of the through-focus positions, where the values of MTF at the central field of view, 0.3 field of view and the 0.7 field of view are at their respective maximums at the first spatial frequency; and the second average image plane is an image plane for the infrared light, which is particularly perpendicular to the optical axis, and configured at an average position of the through-focus positions, where the values of MTF at the central field of view, 0.3 field of view and the 0.7 field of view are at their respective maximums at the first spatial frequency.

The aforementioned first spatial frequency is set to be a half of the spatial frequency (half frequency) of the image sensing device (sensor) used in the present disclosure. For example, for an image sensing device including a pixel size of 1.12 μm or less, the quarter spatial frequency, half spatial frequency (half frequency) and full spatial frequency (full frequency) in the characteristic diagram of modulation transfer function thereof are at least 110 cycles/mm, 220 cycles/mm and 440 cycles/mm, respectively. Light of any field of view may be further divided into sagittal ray and tangential ray.

Focus shift amounts corresponding to maximum values of through-focus MTF of the sagittal ray at the central field of view, 0.3 field of view and 0.7 field of view for the visible light of the optical image capturing system of the present disclosure, are denoted as VSFS0, VSFS3 and VSFS7 (unit of measurement: mm), respectively; and the maximum values of through-focus MTF of the sagittal ray at the central field of view, 0.3 field of view and 0.7 field of view for the visible light are denoted as VSMTF0, VSMTF3 and VSMTF7, respectively. On the other hand, focus shift amounts corresponding to the respective maximum values of through-focus MTF of the tangential ray at the central field of view, 0.3 field of view and 0.7 field of view for the visible light of the optical image capturing system of the present disclosure, are denoted as VTFS0, VTFS3 and VTFS7 (unit of measurement: mm), respectively; and the maximum values of through-focus MTF of the tangential ray at the central field of view, 0.3 field of view and 0.7 field of view for the visible light are denoted as VTMTF0, VTMTF3 and VTMTF7, respectively. The average focus shift amount (position) of both focus shift amounts of the aforementioned sagittal ray at three fields of view and tangential ray at three fields of view for visible light is denoted as AVFS (unit of measurement: mm), which is equal to the absolute value |(VSFS0+VSFS3+VSFS7+VTFS0+VTFS3+VTFS7)/6|.

Focus shift amounts corresponding to maximum values of through-focus MTF of the sagittal ray at the central field of view, 0.3 field of view and 0.7 field of view for the infrared light of the optical image capturing system of the present disclosure are denoted as ISFS0, ISFS3 and ISFS7, respectively. The average focus shift amount (position) of the focus shift amounts of the aforementioned sagittal ray at three fields of view for the infrared light is denoted as AISFS (unit of measurement: mm); and the maximum values of through-focus MTF of the sagittal ray at the central field of view, 0.3 field of view and 0.7 field of view for the infrared light are denoted as ISMTF0, ISMTF3 and ISMTF7, respectively. On the other hand, the focus shift amounts corresponding to maximum values of through-focus MTF of the tangential ray at the central field of view, 0.3 field of view and 0.7 field of view for the infrared light of the optical image capturing system of the present disclosure are denoted as ITFS0, ITFS3 and ITFS7 (unit of measurement: mm), respectively. The average focus shift amount (position) of the focus shift amounts of the aforementioned tangential ray at three fields of view for the infrared light is denoted as AITF5 (unit of measurement: mm); and the maximum values of through-focus MTF of the tangential ray at the central field of view, 0.3 field of view and 0.7 field of view for the infrared light are denoted as ITMTF0, ITMTF3 and ITMTF7, respectively. The average focus shift amount (position) of both focus shift amounts of the aforementioned sagittal ray at three fields of view and tangential ray at three fields of view for the infrared light is denoted as AIFS (the unit of measurement: mm), which is equal to the absolute value |(ISFS0+ISFS3+ISFS7+ITFS0+ITFS3+ITFS7)/6|.

The focus shift amount between focal points of the central fields of view for the visible light and the infrared light (RGB/IR) of the entire optical image capturing system is denoted as FS (i.e., wavelength 850 nm versus wavelength 555 nm, unit of measurement: mm), which is equal to the absolute value |(VSFS0+VTFS0)/2−(ISF0+ITFS0 )/2|. A difference (focus shift amount) between the average focus shift amounts at three fields of view for the visible light and the infrared light (RGB/IR) of the entire optical image capturing system is denoted as AFS (i.e. the wavelength of 850 nm versus wavelength of 555 nm, the unit of measurement: mm), which is equal to the absolute value of |AIFS−AVFS|.

A maximized height for image formation of the optical image capturing system is denoted as HOI. A height of the optical image capturing system is denoted as HOS. A distance from the object-side surface of the first lens to the image-side surface of the fourth lens is denoted as InTL. A distance from the image-side surface of the fourth lens to the image plane is denoted as InB, wherein InTL+InB=HOS. A distance from an aperture stop (aperture) to an image plane is denoted as InS. A distance from the first lens to the second lens is denoted as IN12 (shown as example). A central thickness of the first lens of the optical image capturing system on the optical axis is denoted as TP1 (shown as example).

Lens Parameters Related to a Material of the Lens

An Abbe number (dispersion coefficient) of the first lens in the optical image capturing system is denoted as NA1 (shown as example). A refractive index of the first lens is denoted as Nd1 (shown as example).

Lens Parameters Related to an Angle of View of the Lens

Angle of view is denoted as AF. Half of the angle of view is denoted as HAF. A major light angle is denoted as MRA.

Lens Parameters Related to Exit/Entrance Pupil in the Lens

An entrance pupil diameter of the optical image capturing system is denoted as HEP. An exit pupil of the optical image capturing system is the image formed in the image space after light passes through the lens assembly behind the aperture stop, and the exit pupil diameter is denoted as HXP. The maximum effective half diameter (EHD) of any surface of a single lens refers to a vertical height between the optical axis and an intersection point, where an incident ray with a maximum angle of view of the system passes through the outermost edge of an entrance pupil and intersects the surface of the lens. For example, the maximum effective half diameter of the object-side surface of the first lens is denoted as EHD11. The maximum effective half diameter of the image-side surface of the first lens is denoted as EHD12. The maximum effective half diameter of the object-side surface of the second lens is denoted as EHD21. The maximum effective half diameter of the image-side surface of the second lens is denoted as EHD22. Maximum effective half diameters of any surface of other lenses in the optical image capturing system are denoted according to the regular pattern shown above.

Lens Parameters Related to an Arc Length of the Lens Shape and an Outline of a Surface of the Lens An outline curve length of the maximum effective half diameter of any surface of a single lens refers to an arc length of a curve, which starts from an intersection point as an initial point where the surface of the lens intersects with the optical axis of the optical image capturing system, travels along the surface outline of the lens, and ends at a point which defines the maximum effective half diameter; the arc length between the aforementioned two points is the outline curve length of the maximum effective half diameter, and is denoted as ARS. For example, a length of the maximum effective half diameter outline curve of the object-side surface of the first lens is denoted as ARS11. A length of the maximum effective half diameter outline curve of the image-side surface of the first lens is denoted as ARS12. A length of the maximum effective half diameter outline curve of the object-side surface of the second lens is denoted as ARS21. A length of the maximum effective half diameter outline curve of the image-side surface of the second lens is denoted as ARS22. Outline curve lengths of the maximum effective half diameter of any surface of other lenses in the optical image capturing system are denoted according to the regular pattern shown above.

An outline curve length of ½ entrance pupil diameter (HEP) of any surface of a single lens refers to an arc length of a curve, which starts from an intersection point as an initial point where the surface of the lens intersects with the optical axis of the optical image capturing system, travels along the surface outline of the lens, and ends at a coordinate point on the surface where a vertical height from the optical axis to the coordinate point is equivalent to ½ entrance pupil diameter; an arc length between the aforementioned two points is the outline curve length of the ½ entrance pupil diameter (HEP), and is denoted as ARE. For example, an outline curve length of the ½ entrance pupil diameter (HEP) of the object-side surface of the first lens is denoted as ARE11. An outline curve length of the ½ entrance pupil diameter (HEP) of the image-side surface of the first lens is denoted as ARE12. An outline curve length of the ½ entrance pupil diameter (HEP) of the object-side surface of the second lens is denoted as ARE21. An outline curve length of the ½ entrance pupil diameter (HEP) of the image-side surface of the second lens is denoted as ARE22. Outline curve lengths of the ½ entrance pupil diameter (HEP) of any surface of other lenses in the optical image capturing system are denoted according to the regular pattern shown above.

Lens Parameters Related to a Depth of the Lens Shape

A horizontal shift distance from an intersection point of the object-side surface of the fourth lens and the optical axis to a maximum effective half diameter position of the object-side surface of the fourth lens is denoted as InRS41 (shown as example). A horizontal shift distance from an intersection point of the image-side surface of the fourth lens and the optical axis to a maximum effective half diameter position of the image-side surface of the fourth lens is denoted as InRS42 (shown as example).

Lens Parameters Related to the Lens Shape

A critical point C is a point on a surface of a specific lens, where a tangent plane to the surface at that point is perpendicular to the optical axis, and the point cannot be an intersection point with the optical axis on that specific surface of the lens. In addition, a perpendicular distance between a critical point C31 on the object-side surface of the third lens and the optical axis is denoted as HVT31 (shown as example). A perpendicular distance between a critical point C32 on the image-side surface of the third lens and the optical axis is denoted as HVT32 (shown as example). A perpendicular distance between a critical point C41 on the object-side surface of the fourth lens and the optical axis is denoted as HVT41 (shown as example). A perpendicular distance between a critical point C42 on the image-side surface of the fourth lens and the optical axis is denoted as HVT42 (shown as example). Perpendicular distances between a critical point on the object-side surface or image-side surface of other lenses are denoted according to the regular pattern shown above.

An inflection point on the object-side surface of the fourth lens and nearest to the optical axis is denoted as IF411, wherein a sinkage value of the inflection point IF411 is denoted as SGI411 (shown as example). The sinkage value SGI411 is a horizontal shift distance paralleling the optical axis, which is from an intersection point of the optical axis and the object-side surface of the fourth lens to an inflection point nearest to the optical axis on the object-side surface of the fourth lens. A distance perpendicular to the optical axis between the inflection point IF411 and the optical axis is denoted as HIF411 (shown as example). An inflection point on the image-side surface of the fourth lens which is nearest to the optical axis is denoted as IF421, and a sinkage value of the inflection point IF421 is denoted as SGI421 (shown as example). The sinkage value SGI421 is a horizontal shift distance paralleling the optical axis, which is from the intersection point of the optical axis and the image-side surface of the fourth lens to the inflection point nearest to the optical axis on the image-side surface of the fourth lens. A distance perpendicular to the optical axis between the inflection point IF421 and the optical axis is denoted as HIF421 (shown as example).

The object-side surface of the fourth lens has an inflection point IF412 which is the second nearest to the optical axis and a sinkage value of the inflection point IF412 is denoted as SGI412 (shown as example). The sinkage value SGI412 is a horizontal shift distance paralleling the optical axis from an intersection point of the optical axis and the object-side surface of the fourth lens to the inflection point which is the second nearest to the optical axis on the object-side surface of the fourth lens. A distance perpendicular to the optical axis between the inflection point IF412 and the optical axis is denoted as HIF412 (shown as example). The image-side surface of the fourth lens has an inflection point IF422 which is the second nearest to the optical axis and a sinkage value of the inflection point IF422 is denoted as SGI422 (shown as example). The sinkage value SGI422 is a horizontal shift distance paralleling the optical axis from an intersection point of the optical axis and the image-side surface of the fourth lens to the inflection point which is second nearest to the optical axis on the image-side surface of the fourth lens. A distance perpendicular to the optical axis between the inflection point IF422 and the optical axis is denoted as HIF422 (shown as example).

The object-side surface of the fourth lens has an inflection point IF413 which is the third nearest to the optical axis, and a sinkage value of the inflection point IF413 is denoted as SGI413 (shown as example). The sinkage value SGI413 is a horizontal shift distance paralleling the optical axis from an intersection point of the optical axis and the object-side surface of the fourth lens to the inflection point which is the third nearest to the optical axis on the object-side surface of the fourth lens. A distance perpendicular to the optical axis between the inflection point IF413 and the optical axis is denoted as HIF413 (example). The image-side surface of the fourth lens has an inflection point IF423 which is the third nearest to the optical axis, and a sinkage value of the inflection point IF423 is denoted as SGI423 (example). The sinkage value SGI423 is a horizontal shift distance paralleling the optical axis from an intersection point of the optical axis and the image-side surface of the fourth lens to the inflection point which is the third nearest to the optical axis on the image-side surface of the fourth lens. A distance perpendicular to the optical axis between the inflection point IF423 and the optical axis is denoted as HIF423 (shown as example).

The object-side surface of the fourth lens has an inflection point IF414 which is the fourth nearest to the optical axis and a sinkage value of the inflection point IF414 is denoted as SGI414 (shown as example). The sinkage value SGI414 is a horizontal shift distance paralleling the optical axis from an intersection point of the optical axis and the object-side surface of the fourth lens to the inflection point which is the fourth nearest to the optical axis on the object-side surface of the fourth lens. A distance perpendicular to the optical axis between the inflection point IF414 and the optical axis is denoted as HIF414 (shown as example). The image-side surface of the fourth lens has an inflection point IF424 which is the fourth nearest to the optical axis and a sinkage value of the inflection point IF424 is denoted as SGI424 (shown as example). The sinkage value SGI424 is a horizontal shift distance paralleling the optical axis from an intersection point of the optical axis and the image-side surface of the fourth lens to the inflection point which is the fourth nearest to the optical axis on the image-side surface of the fourth lens. A distance perpendicular to the optical axis between the inflection point IF424 and the optical axis is denoted as HIF424 (example).

Inflection points on the object-side surface or the image-side surface of other lenses and perpendicular distances between them and the optical axis, or sinkage values thereof are denoted according to the regular patterns shown above.

Lens Parameters Related to Aberration

Optical distortion for image formation in the optical image capturing system is denoted as ODT. TV distortion for image formation in the optical image capturing system is denoted as TDT. Additionally, degree of aberration offset within a range of 50% to 100% field of view of the formed image may be further illustrated. An offset of spherical aberration is denoted as DFS. An offset of coma aberration is denoted as DFC.

A transverse aberration of an edge of an aperture is denoted as STOP Transverse Aberration (STA), which assesses the performance of a specific optical image capturing system. A tangential fan or sagittal fan may be utilized to calculate the STA of any fields of view, and in particular, to calculate the STAs of the longest operation wavelength (e.g. 650 nm) and the shortest operation wavelength (e.g. 470 nm) respectively, which serve as a standard indicating a performance thereof. Coordinate directions of the aforementioned tangential fan may be further defined as positive (overhead-light) and negative (lower-light) directions. The STA of the longest operation wavelength is defined as a distance between the position of the image formed when the longest operation wavelength passing through the edge of the aperture strikes a specific field of view on the image plane and the position of the image formed via the primary light of the reference wavelength (e.g. 555 nm) on the specific field of view on the image plane. Whereas the STA of the shortest operation wavelength is defined as the distance between the position of the image formed when the shortest operation wavelength passing through an edge of the aperture strikes a specific field of view on the image plane and the position of the image formed via the primary light of the reference wavelength on the specific field of view on the image plane. The criteria for assessing whether an optical image capturing system has an excellent performance may be set as: both STAs of the incident longest operation wavelength and the incident shortest operation wavelength at 0.7 field of view on the image plane (i.e. 0.7 height of image (HOI)) must be less than 50 µm or, furthermore, even less than 30 µm.

The optical image capturing system has a maximum height of image HOI on the image plane perpendicular to the optical axis. A transverse aberration of the longest operation wavelength of a positive direction tangential fan of the optical image capturing system passing through an edge of the entrance pupil and incident at the position of 0.7 HOI on the image plane is denoted as PLTA. A transverse aberration of the shortest operation wavelength of the positive direction tangential fan of the optical image capturing system passing through the edge of the entrance pupil and incident at the position of 0.7 HOI on the image plane is denoted as PSTA. A transverse aberration of the longest operation wavelength of a negative direction tangential fan of the optical image capturing system passing through the edge of the entrance pupil and incident at the position of 0.7 HOI on the image plane is denoted as NLTA. A transverse aberration of the shortest operation wavelength of a negative direction tangential fan of the optical image capturing system passing through the edge of the entrance pupil and incident at the position of 0.7 HOI on the image plane is denoted as NSTA. A transverse aberration of the longest operation wavelength of a sagittal fan of the optical image capturing system passing through the edge of the entrance pupil and incident at the position of 0.7 HOI on the image plane is denoted as SLTA. A transverse aberration of the shortest operation wavelength of the sagittal fan of the optical image capturing system passing through the edge of the entrance pupil and incident at the position of 0.7 HOI on the image plane is denoted as SSTA.

The disclosure provides an optical image capturing system, wherein the object-side surface or the image-side surface of the fourth lens thereof is configured with inflection points, such that angle of incidence from each field of view to the fourth lens may be adjusted effectively, and in particular, the optical distortion as well as the TV distortion may also be corrected. Additionally, surfaces of the fourth lens may possess a better capability for adjusting an optical path, so as to enhance image quality.

An optical image capturing system is provided in accordance with the present disclosure. In sequence from an object side to an image side, a first lens, a second lens, a third lens, a fourth lens, a first image plane, and a second image plane are included. The first image plane is an image plane specifically for visible light, which is perpendicular to the optical axis, wherein the central field of view of the first image plane has a maximum value of the through-focus modulation transfer rate (MTF) at the first spatial frequency; the second image plane is an image plane specifically for infrared light, which is perpendicular to the optical axis, wherein the central field of view of the second image plane has a maximum value of the through-focus modulation transfer rate (MTF) at the first spatial frequency. The first to fourth lenses all have refractive power. Focal lengths of the first, second, third and fourth lenses are f1, f2, f3 and f4, respectively. The focal length of the optical image capturing system is f. The entrance pupil diameter of the optical image capturing system is HEP. The distance on the optical axis from an object-side surface of the first lens to the first image plane is HOS. Half of the maximum angle of view of the optical image capturing system is denoted as HAF. A maximum image height on the first image plane and perpendicular to the optical axis of the optical image capturing system is HOI. A distance on the optical axis between the first image plane and the second image plane is denoted as FS. Conditions as follows are satisfied: 1≤f/HEP≤10, 0 deg<HAF≤150 deg, and |FS|≤30 μm.

Another optical image capturing system is further provided in accordance with the present disclosure. In sequence from an object side to an image side, a first lens element, a second lens element, a third lens element, a fourth lens element, a first image plane, and a second image plane are included. The first image plane is an image plane specifically for visible light, which is perpendicular to the optical axis, wherein the central field of view on the first image plane has a maximum value of the through-focus modulation transfer rate (MTF) at the first spatial frequency; the second image plane is an image plane specifically for infrared light, which is perpendicular to the optical axis, wherein the central field of view on the second image plane has a maximum value of the through-focus modulation transfer rate (MTF) at the first spatial frequency. The first lens has positive refractive power. The second lens has refractive power and a convex image-side surface on the optical axis. The third lens has refractive power and a convex image-side surface on the optical axis. Focal lengths of the first, second, third and fourth lens are f1, f2, f3 and f4, respectively. The focal length of the optical image capturing system is f The entrance pupil diameter of the optical image capturing system is denoted as HEP. The distance on the optical axis from an object-side surface of the first lens to the first image plane is denoted as HOS. Half of the maximum angle of view of the optical image capturing system is denoted as HAF. The maximum height of image on the first image plane perpendicular to the optical axis of the optical image capturing system is denoted as HOI. The distance on the optical axis between the first image plane and the second image plane is denoted as FS. An outline curve starting from an intersection point of the optical axis and any surface of any one of those lenses, travelling along the outline of the surface, and ending at a coordinate point on the surface which has a vertical height of ½ entrance pupil diameter from the optical axis is defined, and the length of the outline curve is denoted as ARE. Conditions as follows are satisfied: 1≤f/HEP≤10, 0 deg<HAF≤150 deg, 0.9≤2(ARE/HEP)≤2.0, and |FS|≤30 μm.

In addition, another optical image capturing system is further provided in accordance with the present disclosure. In sequence from an object side to an image side, a first lens, a second lens, a third lens, a fourth lens, a first average image plane and a second average image plane are included. The first average image plane is an image plane specifically for the visible light, which is perpendicular to the optical axis, and configured at the average position of the through-focus positions, where the values of MTF for the visible light at the central field of view, 0.3 field of view and the 0.7 field of view are at their respective maximum at the first spatial frequency. The second average image plane is an image plane specifically for the infrared light, which is perpendicular to the optical axis, and configured at the average position of the through-focus positions, where the values of MTF for the infrared light at the central field of view, 0.3 field of view and the 0.7 field of view are at their respective maximum at the first spatial frequency. The first lens has positive refractive power. The second lens has refractive power and a convex image-side surface on the optical axis. The third lens has positive refractive power and a convex image-side surface on the optical axis. The focal lengths of the first, second, third, and fourth lenses are f1, f2, f3 and f4, respectively. The focal length of the optical image capturing system is denoted as f. The entrance pupil diameter of the optical image capturing system is denoted as HEP. The distance on the optical axis from the object-side surface of the first lens to the first average image plane is denoted as HOS. Half of the maximum angle of view of the optical image capturing system is denoted as HAF. The maximum height of image on the first average image plane perpendicular to the optical axis of the optical image capturing system is denoted as HOI. An outline curve starting from an intersection point of the optical axis and any surface of any one of those lenses, travelling along the outline of the surface, and ending at a coordinate point on the surface which has a vertical height of ½ entrance pupil diameter from the optical axis is defined, and the length of the outline curve is denoted as ARE. The distance between the first average image plane and the second average image plane is denoted as AFS, and the distance on the optical axis between the first average image plane and the second average image plane is denoted as FS. Conditions as follows are satisfied: 1≤f/HEP≤10, 0 deg<HAF≤150 deg, 0.9≤2(ARE/HEP)≤2.0, and |AFS|≤30 μm.

Lengths of an outline curve of any surface of a single lens within a range of maximum effective half diameter affects a capability for correcting surface aberration and optical path difference between rays in each field of view. A longer outline curve length may lead to a better capability of aberration correction, but the difficulty of production may simultaneously become higher. Hence, the length of an outline curve of any surface of a single lens within the range of the maximum effective half diameter has to be controlled, and especially, the proportional relationship between the length of the outline curve (ARS) of the surface within the range of the maximum effective half diameter and the central thickness (TP) of the lens to which the surface belongs on the optical axis (that is, the ARS/TP value) has to be controlled. For example, the length of the maximum effective half diameter outline curve of the object-side surface of the first lens is denoted as ARS11, and a central thickness of the first lens on the optical axis is denoted as TP1, wherein a ratio between both of them is denoted as ARS11/TP1. A length of the maximum effective half diameter outline curve of the image-side surface of the first lens is denoted as ARS12, and a ratio between the ARS12 and TP1 is denoted as ARS12/TP1. A length of the maximum effective half diameter outline curve of the object-side surface of the second lens is denoted as ARS21, and a central thickness of the second lens on the optical axis is TP2, wherein a ratio between both of them is denoted as ARS21/TP2. A length of the maximum effective half diameter outline curve of the image-side surface of the second lens is denoted as ARS22, wherein a ratio between ARS22 and TP2 is denoted as ARS22/TP2. Proportional relationships between the lengths of the maximum effective half diameter outline curve of any surface of other lenses and central thicknesses (TP) of other lenses to which the surfaces belong on the optical axis are denoted according to the regular pattern shown above.

An outline curve length of ½ entrance pupil diameter within a range of height (HEP) of any surface of a single lens specifically affects a capability of correcting the aberration in a shared region of each field of view on the surface and a capability of correcting the optical path difference among each field of view. Longer outline curve lengths may lead to a better capability of aberration correction, but the difficulty in production of such lens may simultaneously become higher. Hence, an outline curve length of ½ entrance pupil diameter within a range of height (HEP) of any surface of a single lens has to be controlled, and especially, a proportional relationship between the outline curve length (ARE) of ½ entrance pupil diameter within a range of height (HEP) of any surface of a single lens and a central thickness (TP) on the optical axis (that is, the ARE/TP value) has to be controlled. For example, an outline curve length of the ½ entrance pupil diameter height (HEP) of the object-side surface of the first lens is denoted as ARE11, and a central thickness of the first lens on the optical axis is denoted as TP1, wherein a ratio thereof is denoted as ARE11/TP1. An outline curve length of the ½ entrance pupil diameter height (HEP) of the image-side surface of the first lens is denoted as ARE12, wherein a ratio of the ARE12 to TP1 is denoted as ARE12/TP1. An outline curve length of the ½ entrance pupil diameter height (HEP) of the object-side surface of the second lens is denoted as ARE21, and a central thickness of the second lens on the optical axis is denoted as TP2, wherein the ratio thereof is denoted as ARE21/TP2. An outline curve length of the ½ entrance pupil diameter height (HEP) of the image-side surface of the second lens is denoted as ARE22, wherein a ratio of the ARE22 to TP2 is denoted as ARE22/TP2. Proportional relationships of outline curve lengths of the ½ entrance pupil diameter height (HEP) on any surface of other lenses of the optical image capturing system to central thicknesses (TP) on the optical axis of other lenses to which the surfaces belong are denoted according to the regular pattern shown above.

The optical image capturing system described above may be configured to form an image on an image sensing device which is shorter than 1/1.2 inch in diagonal length. Preferably, a size of the image sensing device is ½.3 inch. A pixel size of the image sensing device is smaller than 1.4 micrometers (μm). Preferably, the pixel size thereof is smaller than 1.12 micrometers (μm). The best pixel size thereof is smaller than 0.9 micrometers (μm). Furthermore, the optical image capturing system is applicable to an image sensing device with an aspect ratio of 16:9.

The optical image capturing system described above is applicable to video recordings requiring more than millions of or ten-millions of pixels (e.g. 4K and 2K videos or the so-called MD and QHD) while simultaneously possessing a good image quality.

A height of optical system (HOS) may be appropriately reduced so as to achieve a miniaturization of the optical image capturing system when |f1|>f4.

When a relationship of |f2|+|f3|>|f1|+|f4| is met, at least one of the second to the third lenses may have a weak positive refractive power or a weak negative refractive power. The aforementioned weak refractive power indicates that an absolute value of the focal length of a specific lens is greater than 10. When at least one of the second lens to the third lens has the weak positive refractive power, the positive refractive power of the first lens may be shared, so as to prevent unnecessary aberration from appearing too early. On the contrary, when at least one of the second lens to the third lens has the weak negative refractive power, the aberration of the optical image capturing system may be corrected and fine-tuned.

The fourth lens may have a positive refractive power. Additionally, at least one surface of the fourth lens may possess at least one inflection point, which is capable of effectively reducing an incident angle of the off-axis FOV rays, thereby further correcting an off-axis FOV aberration.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION

Figure 1A:
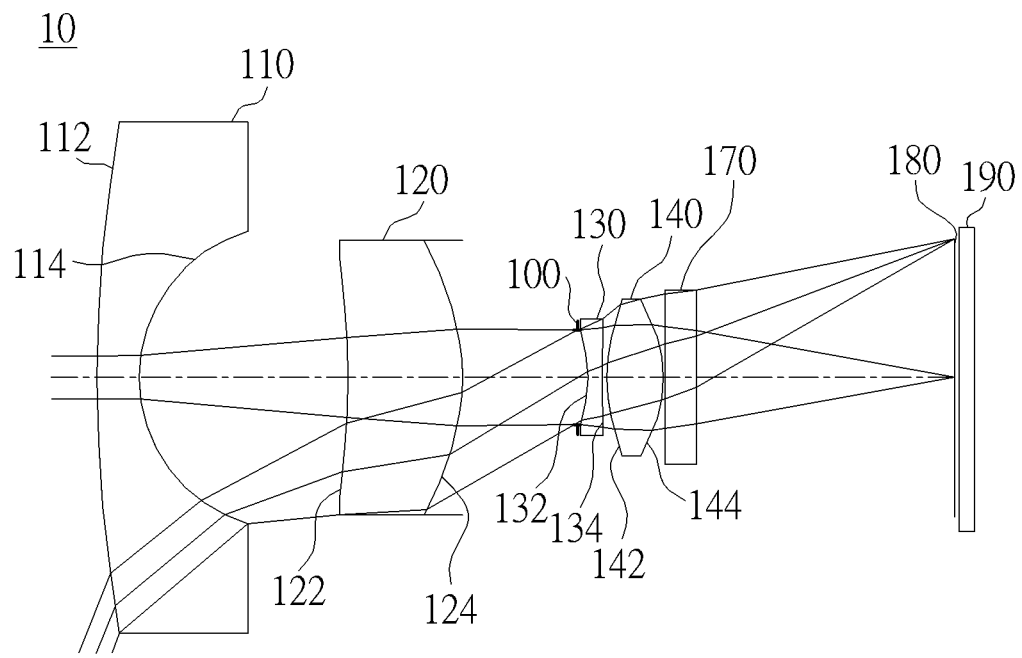
FIG. 1A is a schematic view of an optical image capturing system according to a first embodiment of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in sequence from an object side to an image side, includes a first lens, a second lens, a third lens, and a fourth lens with refractive power. The optical image capturing system may further include an image sensing device, which is configured on an image plane.

The optical image capturing system may utilize three sets of operation wavelengths which are 486.1 nm, 587.5 nm and 656.2 nm respectively, wherein the 587.5 nm wavelength is served as a primary reference wavelength and a reference wavelength for obtaining technical features. The optical image capturing system may also utilize five sets of operation wavelengths which are 470 nm, 510 nm, 555 nm, 610 nm and 650 nm respectively, wherein the 555 nm wavelength is served as the primary reference wavelength and the reference wavelength for obtaining technical features.

A ratio of the focal length f of the optical image capturing system to the focal length fp of each lens with positive refractive power is denoted as PPR. A ratio of the focal length f of the optical image capturing system to the focal length fn of each lens with negative refractive power is denoted as NPR. A sum of the PPR of all lenses with positive refractive powers is denoted as ΣPPR, and a sum of the NPR of all lenses with negative refractive powers is denoted as ΣNPR. A total refractive power and a total length of the optical image capturing system may be easier to control when the following conditions are met: 0.5≤ΣPPR/|ΣNPR|≤4.5; preferably, the following condition may be met: 0.9≤ΣPPR/|ΣNPR|≤3.5.

A height of the optical image capturing system is denoted as HOS. When the value of the ratio, i.e. HOS/f, approaches 1, it would be easier to manufacture the miniaturized optical image capturing system which is capable of forming an ultra-high pixel image.

A sum of the focal length fp of each lens with positive refractive power is denoted as ΣPP. A sum of the focal length fn of each lens with negative refractive power is denoted as ΣNP. In one embodiment of the optical image capturing system of the present disclosure, the following conditions are met: 0<ΣPP≤200 and f4/ΣPP≤0.85. Preferably, the following conditions may be met: 0<ΣPP≤150 and 0.01≤Σf4/ΣPP≤0.7. As a result, the optical image capturing system will have better control over a focusing ability, and the positive refractive power of the optical image capturing system may be distributed appropriately, so as to suppress the premature formation of noticeable aberration.

The optical image capturing system may further include an image sensing device, which is configured on an image plane. Half of a diagonal of an effective sensing field of the image sensing device (i.e. the image height or the so-called maximum image height of the optical image capturing system) is denoted as HOI. A distance on the optical axis from the object-side surface of the first lens to the image plane is denoted as HOS, which meets the following conditions: HOS/HOI≤15 and 0.5≤HOS/f≤20.0. Preferably, the following conditions may be met: 1≤HOS/HOI≤10 and 1≤HOS/f≤15. As a result, the optical image capturing system may remain miniaturized, so as to be applicable to a light-weight and portable electronic product.

In addition, in the optical image capturing system of the disclosure, at least one aperture may be configured depending on requirements so as to reduce stray light and improve image quality.

In the optical image capturing system of the disclosure, the aperture may be configured as a front-set aperture or middle-set aperture, wherein the front-set aperture is disposed between a photographed object and the first lens, and the middle-set aperture is disposed between the first lens and the image plane. If the aperture is the front-set aperture, a longer distance between the exit pupil and the image plane of the optical image capturing system may be provided, such that more optical elements may be accommodated in the optical image capturing system, and an efficiency of the image sensing device in receiving images may be improved. If the aperture is the middle-set aperture, an angle of field of view (FOV) of the optical image capturing system may be expanded, such that the optical image capturing system has the same advantage as wide-angle cameras. A distance from the aforementioned apertures to the image plane is denoted as InS, which meets the following conditions: 0.2≤InS/HOS≤1.1. Preferably, the following condition may be met: 0.4≤InS/HOS≤1. Hence, the optical image capturing system may simultaneously be miniaturized while equipped with wide-angle features.

In the optical image capturing system of the present disclosure, a distance from the object-side surface of the first lens to the image-side surface of the fourth lens is denoted as InTL. A sum of central thicknesses of all lenses with refractive power on the optical axis is denoted as ΣTP. The following condition is met: 0.2≤ΣTP/InTL≤0.95. Preferably, the following condition may be met: 0.2≤ΣTP/InTL≤0.9. In this manner, a suitable contrast ratio for image formation in the optical image capturing system and a suitable yield rate of manufacturing the lenses may be simultaneously achieved, and an appropriate back focal length may be provided so as to accommodate other optical elements in the optical image capturing system.

A curvature radius of the object-side surface of the first lens is denoted as R1, a curvature radius of the image-side surface of the first lens is denoted as R2, and the following conditions are met: 0.01≤|R1/R2|≤100. Preferably, the following condition may be met: 0.01≤|R1/R2|≤60.

A curvature radius of the object-side surface of the fourth lens is denoted as R9. A curvature radius of the image-side surface of the fourth lens is denoted as R10. The following condition is met: −200<(R7−R8)/(R7+R8)<30. Such configuration is beneficial for correcting astigmatism generated by the optical image capturing system.

A distance between the first lens and the second lens on the optical axis is denoted as IN12. The following condition is met: 0<IN12/f≤5.0. Preferably, the following condition may be met: 0.01≤IN12/f≤4.0. Hence, chromatic aberration of the lens may be mitigated, such that performance thereof is improved.

A distance between the second lens and the third lens on the optical axis is denoted as IN23. The following condition is met: 0<IN23/f≤5.0. Preferably, the following condition may be met: 0.01≤IN23/f≤3.0. Hence, performances of the lenses may be improved.

A distance between the third lens and the fourth lens on the optical axis is denoted as IN34. The following condition is met: 0<IN34/f≤5.0. Preferably, the following condition may be met: 0.001≤IN34/f≤3.0. Hence, performances of the lenses may be improved.

A central thicknesses of the first lens and the second lens on the optical axis are denoted as TP1 and TP2, respectively, which meets the following condition: 1≤(TP1+IN12)/TP2≤20. Hence, a sensitivity formed via the optical image capturing system may be easier to control, and performance of the optical image capturing system may be improved.

Central thicknesses of the third lens and the fourth lens on the optical axis are denoted as TP3 and TP4, respectively, and a distance between the aforementioned two lenses on the optical axis is denoted as IN34. The following condition is met: 0.2≤(TP4+IN34)/TP4≤20. Hence, a sensitivity formed via the optical image capturing system may be easier to control, and a total height of the optical image capturing system may be reduced.

A distance between the second lens and the third lens on the optical axis is denoted as IN23. A sum of distances from the first lens to the fourth lens on the optical axis is denoted as ΣTP. The following condition is met: 0.01≤IN23/(TP2+IN23+TP3)≤0.9. Preferably, the following condition may be met: 0.05≤IN23/(TP2+IN23+TP3)≤0.7. Hence, an aberration generated in a process of the incident light travelling inwardly into the optical image capturing system may be easier to gradually correct layer upon layer, and a total height of the optical image capturing system may be reduced.

In the optical image capturing system of the present disclosure, a horizontal shift distance in parallel with the optical axis from a position of maximum effective half diameter to an intersection point on the optical axis of the object-side surface 142 of the fourth lens is denoted as InRS41 (if the horizontal shift is towards the image-side surface, the InRS41 is a positive value; if the horizontal shift is towards the object-side surface, the InRS41 is a negative value). A distance in parallel with the optical axis from a position of maximum effective half diameter to an intersection point on the optical axis of the image-side surface 144 of the fourth lens is denoted as InRS42. A central thickness of the fourth lens 140 on the optical axis is denoted as TP4. The following conditions are met: −1 mm≤InRS41≤1 mm, −1 mm≤InRS42≤1 mm, 1 mm≤|InRS41|+|InRS42|≤2 mm, 0.01≤|InRS41|/TP4≤10 and 0.01≤|InRS42|/TP4≤10. Hence, the position of maximum effective half diameter between both surfaces of the fourth lens may be controlled, so as to facilitate an aberration correction of a peripheral field of view of the optical image capturing system and effectively retain the miniaturization thereof.

In the optical image capturing system of the present disclosure, a horizontal shift distance in parallel with the optical axis from an inflection point which is nearest to the optical axis on the object-side surface of the fourth lens to an intersection point on the optical axis of the object-side surface of the fourth lens is denoted as SGI411. A horizontal shift distance in parallel with the optical axis from an inflection point which is nearest to the optical axis on the image-side surface of the fourth lens to an intersection point on the optical axis of the image-side surface of the fourth lens is denoted as SGI421. The following conditions are met: 0<SGI411/(SGI411+TP4)≤0.9 and 0<SGI421/(SGI421+TP4)≤0.9. Preferably, the following conditions may be met: 0.01<SGI411/(SGI411+TP4)≤0.7 and 0.01<SGI421/(SGI421+TP4)≤0.7.

A horizontal shift distance in parallel with the optical axis from the inflection point which is the second nearest to the optical axis on the object-side surface of the fourth lens to an intersection point on the optical axis of the object-side surface of the fourth lens is denoted as SGI412. A horizontal shift distance in parallel with the optical axis from the inflection point which is the second nearest to the optical axis on the image-side surface of the fourth lens to an intersection point on the optical axis of the image-side surface of the fourth lens is denoted as SGI422. The following conditions are met: 0<SGI412/(SGI412+TP4)≤0.9 and 0<SGI422/(SGI422+TP4)≤0.9. Preferably, the following conditions may be met: 0.1≤SGI412/(SGI412+TP4)≤0.8 and 0.1≤SGI422/(SGI422+TP4)≤0.8.

A perpendicular distance to the optical axis between the inflection point which is nearest to the optical axis on the object-side surface of the fourth lens and the optical axis is denoted as HIF411. A perpendicular distance to the optical axis between the inflection point which is nearest to the optical axis on the image-side surface of the fourth lens and an intersection point on the optical axis of the image-side surface of the fourth lens is denoted as HIF421. The following conditions are met: 0.01≤HIF411/HOI≤0.9 and 0.01≤HIF421/HOI≤0.9. Preferably, the following conditions may be met: 0.09≤HIF411/HOI≤0.5 and 0.09≤HIF421/HOI≤0.5.

A perpendicular distance to the optical axis between the inflection point which is the second nearest to the optical axis on the object-side surface of the fourth lens and the optical axis is denoted as HIF412. A perpendicular distance to the optical axis between an intersection point on the optical axis of the image-side surface of the fourth lens and the inflection point which is the second nearest to the optical axis on the image-side surface of the fourth lens is denoted as HIF422. The following conditions are met: 0.01≤HIF412/HOI≤0.9 and 0.01≤HIF422/HOI≤0.9. Preferably, the following conditions may be met: 0.09≤HIF412/HOI≤0.8 and 0.09≤HIF422/HOI≤0.8.

A perpendicular distance to the optical axis between the inflection point which is the third nearest to the optical axis on the object-side surface of the fourth lens and the optical axis is denoted as HIF413. A perpendicular distance to the optical axis between an intersection point on the optical axis of the image-side surface of the fourth lens and the inflection point which is the third nearest to the optical axis on the image-side surface of the fourth lens is denoted as HIF423. The following conditions are met: 0.001 mm≤|HIF431|≤5 mm and 0.001 mm≤|HIF423|≤5 mm; preferably, the following conditions may be met: 0.1 mm≤|HIF423|≤3.5 mm and 0.1 mm≤|HIF413|≤3.5 mm.

A perpendicular distance to the optical axis between the inflection point which is the fourth nearest to the optical axis on the object-side surface of the fourth lens and the optical axis is denoted as HIF414. A perpendicular distance to the optical axis between an intersection point on the optical axis of the image-side surface of the fourth lens and the inflection point which is the fourth nearest to the optical axis on the image-side surface of the fourth lens is denoted as HIF424. The following conditions are met: 0.001 mm≤|HIF414|≤5 mm and 0.001 mm≤|HIF424|≤5 mm; preferably, the following conditions may be met: 0.1 mm≤|HIF424|≤3.5 mm and 0.1 mm≤|HIF414|≤3.5 mm.

In one embodiment of the optical image capturing system of the present disclosure, a chromatic aberration of the optical image capturing system may be easier to correct via alternately arranging lenses with a large Abbe number and a small Abbe number.

An equation of the aforementioned aspheric surface is:

$$z = ch^2/[1+[1-(k+1)c^2h^2]^{0.5}] + A4h^4 + A6h^6 + A8h^8 + A10h^{10} + A12h^{12} + A14h^{14} + A16h^{16} + A18h^{18} + A20h^{20} + \quad (1),$$

wherein z is a position value of the position at a height h along the optical axis which refers to the surface apex, k is the conic coefficient, c is the reciprocal of curvature radius, and A4, A6, A8, A10, A12, A14, A16, A18 as well as A20 are high-order aspheric coefficients.

In the optical image capturing system provided by the present disclosure, a material of lens may be glass or plastic. If a plastic material is adopted, a manufacture cost as well as a weight of the lens may be reduced effectively. If a glass material is adopted, a heat effect may be controlled, and a design space for configuring the lenses with their respective refractive powers of the optical image capturing system may also be increased. Additionally, the object-side surface and the image-side surface of the first to the fourth lens in the optical image capturing system may be aspheric surfaces, which provide more controlled variables, such that the number of lenses used may be less than that the number of lenses used when traditional glass lenses are selected; in addition, the aberration may be mitigated as well. Hence, the total height of the optical image capturing system may be reduced effectively.

In addition, in the optical image capturing system provided by the present disclosure, if the surface of a lens is a convex surface, it means that the surface of the lens adjacent to the optical axis is a convex surface. If the surface of a lens is a concave surface, it means that the surface of the lens adjacent to the optical axis is a concave surface.

Furthermore, the optical image capturing system of the present disclosure, at least one aperture stop may be configured depending on requirements so as to reduce stray light and improve image quality.

The optical image capturing system of the present disclosure may be further applied to an optical system with an automatic-focus feature depending on requirements. Having features of both aberration correction and an ability to form high-quality images, the optical image capturing system may have even broader applications.

The optical image capturing system of the present disclosure may include a driving module depending on requirements, wherein the driving module may be coupled to the lenses to enable lens movement. The aforementioned driving module may be a voice coil motor (VCM) which is used to drive the lenses to focus, or may be an optical image stabilization (OIS) element which is used to reduce a frequency of through-focus occurrence resulting from lens vibration when shooting photo or video.

At least one lens among the first, second, third and fourth lenses of the optical image capturing system of the present disclosure may be set as a light filtering element which filters wavelength less than 500 nm depending on requirements. The light filtering element may be made by coating a film on at least one surface of the lens specifically having a filtering function, or by forming the lens itself with a material which may filter out light with short wavelengths.

Specific embodiments are presented below in detail with reference to figures based on the description above.

First Embodiment

Figure 1B:
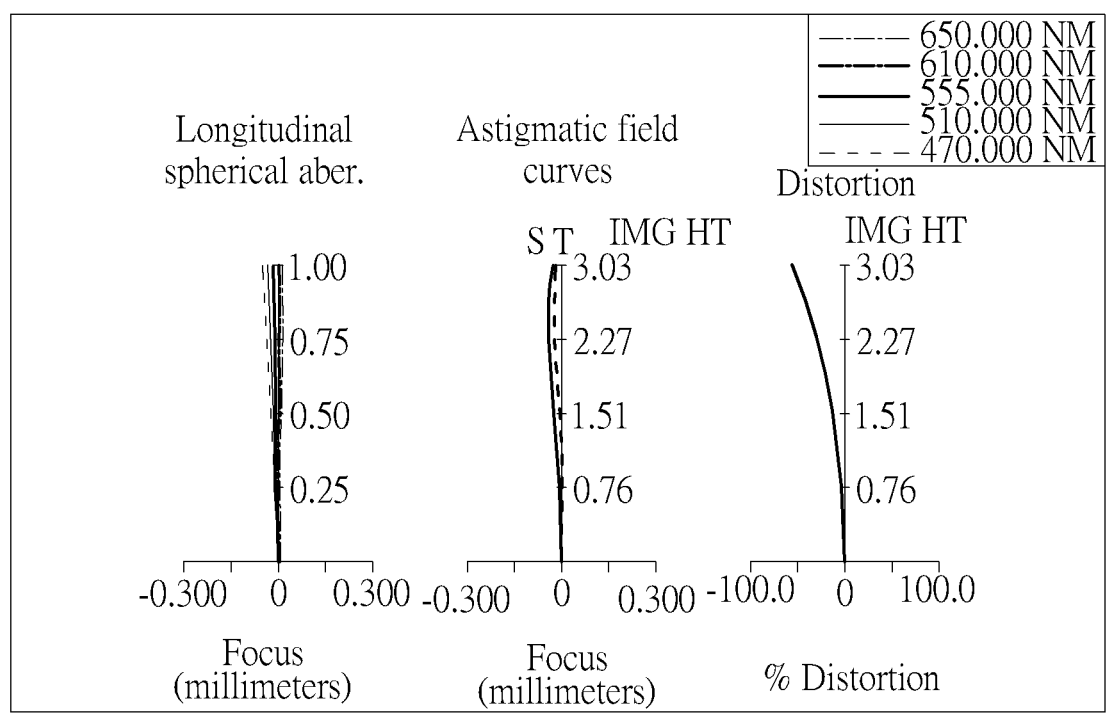
FIG. 1B is a curve diagram illustrating spherical aberration, astigmatism and optical distortion of the optical image capturing system in sequence from left to right according to the first embodiment of the present disclosure.
Figure 1C:
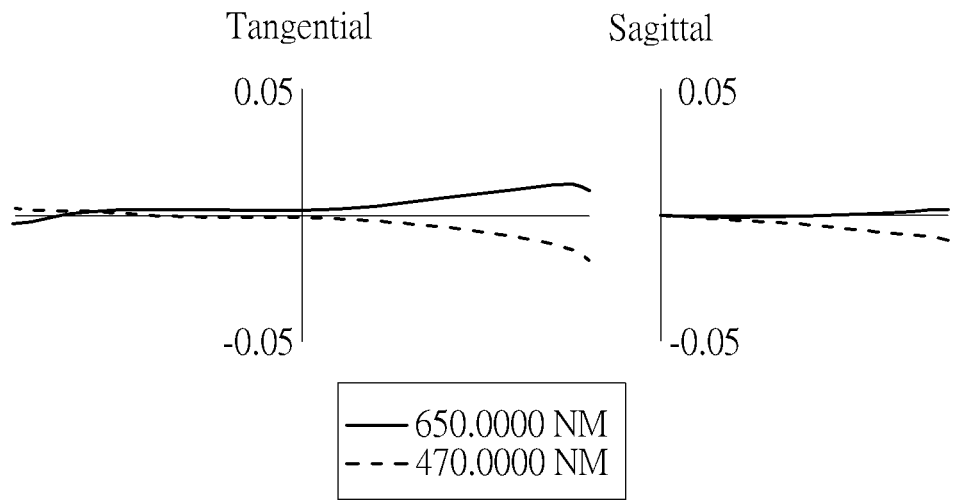
FIG. 1C is a transverse aberration diagram of the longest operation wavelength and the shortest operation wavelength for a tangential fan and a sagittal fan, of which the longest operation wavelength and the shortest operation wavelength pass through an edge of aperture at a position of 0.7 field of view on the image plane, according to the first embodiment of the present disclosure.
Figure 1D:
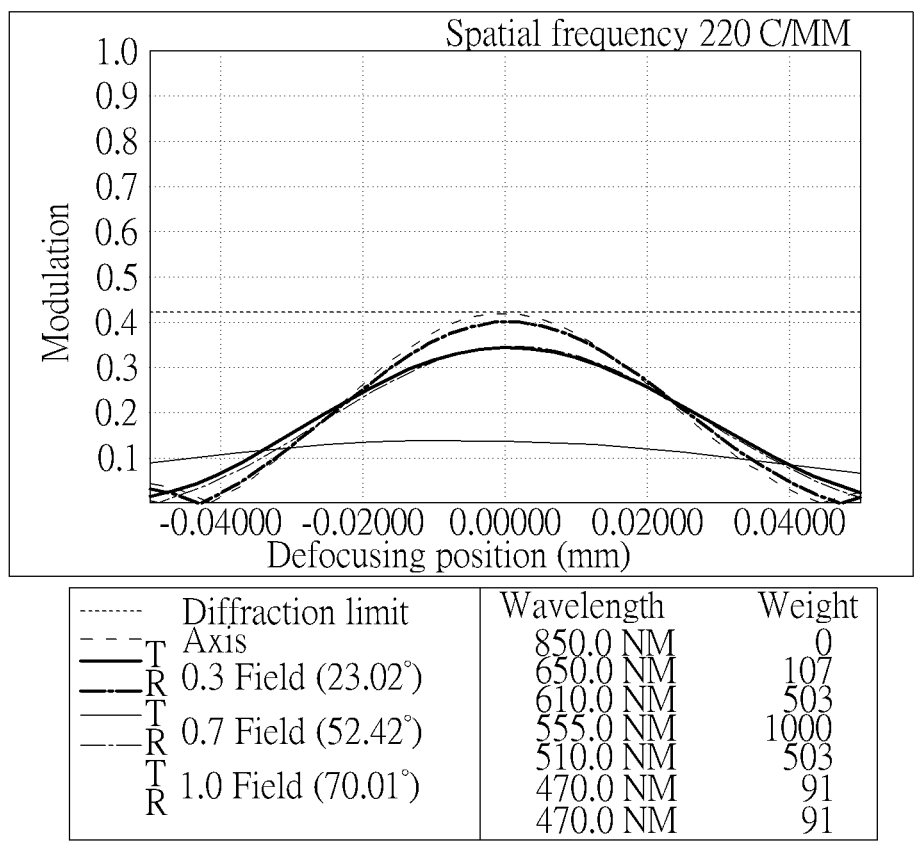
FIG. 1D is a diagram illustrating through-focus MTF values for a visible light spectrum at a central field of view, 0.3 field of view and 0.7 field of view according to the first embodiment of the present disclosure.
Figure 1E:
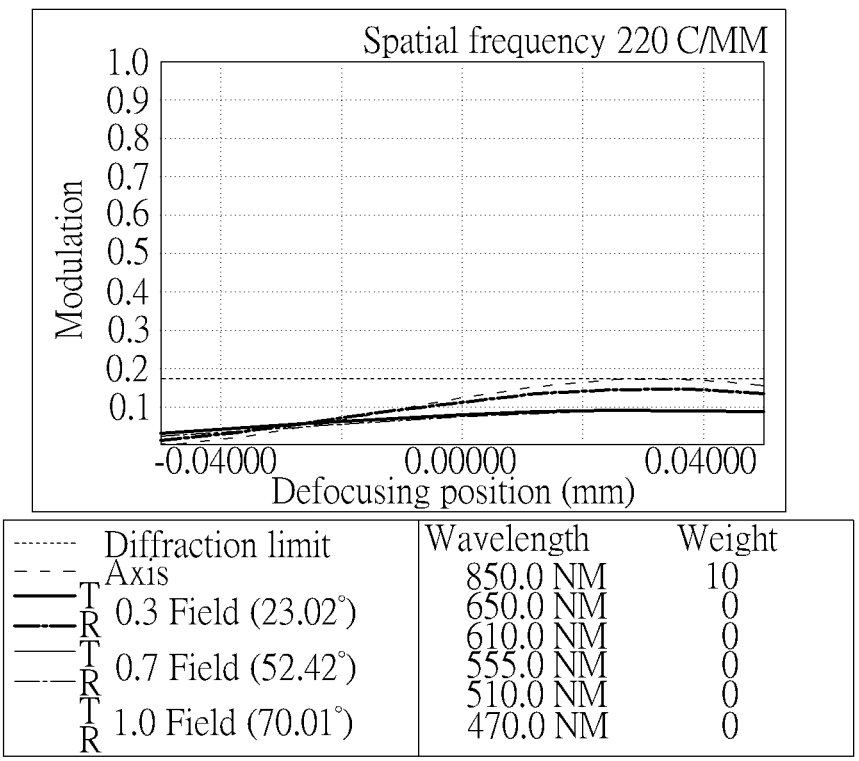
FIG. 1E is a diagram illustrating through-focus MTF values for an infrared light spectrum at the central field of view, 0.3 field of view and 0.7 field of view according to the first embodiment of the present disclosure.

Please refer to FIGS. 1A and 1B, wherein FIG. 1A is a schematic view of the optical image capturing system according to the first embodiment of the present disclosure; FIG. 1B is a curve diagram illustrating the spherical aberration, astigmatism and optical distortion of the optical image capturing system in sequence from left to right according to the first embodiment of the present disclosure; FIG. 1C is a transverse aberration diagram of the longest operation wavelength and the shortest operation wavelength for tangential fan and sagittal fan, of which the longest operation wavelength and the shortest operation wavelength pass through the edge of the aperture at the position of 0.7 field of view on the image plane according to the first embodiment of the present disclosure; FIG. 1D is a diagram illustrating the through-focus MTF values for the visible light spectrum at the central field of view, 0.3 field of view and 0.7 field of view of the first embodiment of the present disclosure. FIG. 1E is a diagram illustrating the through-focus MTF values for the infrared light spectrum at the central field of view, 0.3 field of view and 0.7 field of view of the first embodiment of the present disclosure. As shown in FIG. 1A, it may be seen that, in the order from the object side to the image side, the optical image capturing system includes first lens 110, second lens 120, aperture 100, third lens 130, fourth lens 140, infrared filter 170, image plane 180 and image sensing device 190.

First lens 110 has negative refractive power and is made of glass materials. The first lens 110 has a convex object-side surface 112 and a concave image-side surface 114, wherein both of them are aspheric. The outline curve length of the maximum effective half diameter of the object-side surface of the first lens is denoted as ARS11. The outline curve length of the maximum effective half diameter of the image-side surface of the first lens is denoted as ARS12. The outline curve length of ½ entrance pupil diameter (HEP) of the object-side surface of the first lens is denoted as ARE11, and the length of outline curve of ½ entrance pupil diameter (HEP) of the image-side surface of the first lens is denoted as ARE12. The central thickness of the first lens on the optical axis is denoted as TP1.

A horizontal shift distance in parallel with the optical axis from an inflection point which is nearest to the optical axis on the object-side surface of the first lens to an intersection point on the optical axis of the object-side surface of the first lens is denoted as SGI111. A horizontal shift distance in parallel with the optical axis from an inflection point which is nearest to the optical axis on the image-side surface of the first lens to an intersection point on the optical axis of the image-side surface of the first lens is denoted as SGI121. The following conditions are met: SGI111=0 mm, SGI121=0 mm, |SGI111|/(|SGI111|+TP1)=0 and |SGI121|/(|SGI121|+TP1)=0.

A perpendicular distance to the optical axis from the inflection point which is nearest to the optical axis on the object-side surface of the first lens to an intersection point on the optical axis of the object-side surface of the first lens is denoted as HIF111. A perpendicular distance to the optical axis from the inflection point which is nearest to the optical axis on the image-side surface of the first lens to an intersection point on the optical axis of the image-side surface of the first lens is denoted as HIF121. The following conditions are met: HIF111=0 mm, HIF121=0 mm, HIF111/HOI=0 and HIF121/HOI=0.

Second lens 120 has positive refractive power and is made of plastic materials. The second lens 120 has a concave object-side surface 122 and a convex image-side surface 124, wherein both of them are aspheric, and the object-side surface 122 thereof has an inflection point. The outline curve length of the maximum effective half diameter of the object-side surface of the second lens is denoted as ARS21, and the outline curve length of the maximum effective half diameter of the image-side surface of the second lens is denoted as ARS22. The outline curve length of ½ entrance pupil diameter (HEP) of the object-side surface of the second lens is denoted as ARE21, and the outline curve length of ½ entrance pupil diameter (HEP) of the image-side surface of the second lens is denoted as ARE22. The central thickness of the second lens on the optical axis is denoted as TP2.

A horizontal shift distance in parallel with the optical axis from an inflection point which is nearest to the optical axis on the object-side surface of the second lens to an intersection point on the optical axis of the object-side surface of the second lens is denoted as SGI211. A horizontal shift distance in parallel with the optical axis from an inflection point which is nearest to the optical axis on the image-side surface of the second lens to an intersection point on the optical axis of the image-side surface of the second lens is denoted as SGI221. The following conditions are met: SGI211=−0.13283 mm and |SGI211|/(|SGI211|+TP2)=0.05045.

A perpendicular distance to the optical axis from the inflection point which is nearest to the optical axis on the object-side surface of the second lens to an intersection point on the optical axis of the object-side surface of the second lens is denoted as HIF211. A perpendicular distance to the optical axis from the inflection point which is nearest to the optical axis on the image-side surface of the second lens to an intersection point on the optical axis of the image-side surface of the second lens is denoted as HIF221. The following conditions are met: HIF211=2.10379 mm and HIF211/HOI=0.69478.

The third lens 130 has negative refractive power and is made of plastic materials. The third lens 130 has a concave object-side surface 132 and a concave image-side surface 134, wherein both of them are aspheric, and the image-side surface 134 thereof has an inflection point. The outline curve length of the maximum effective half diameter of the object-side surface of the third lens is denoted as ARS31, and the outline curve length of the maximum effective half diameter of the image-side surface of the third lens is denoted as ARS32. The outline curve length of ½ entrance pupil diameter (HEP) of the object-side surface of the third lens is denoted as ARE31, and the outline curve length of ½ entrance pupil diameter (HEP) of the image-side surface of the third lens is denoted as ARE32. The central thickness of the third lens on the optical axis is denoted as TP3.

A horizontal shift distance in parallel with the optical axis from an inflection point which is nearest to the optical axis on the object-side surface of the third lens to an intersection point on the optical axis of the object-side surface of the third lens is denoted as SGI311. A horizontal shift distance in parallel with the optical axis from an inflection point which is nearest to the optical axis on the image-side surface of the third lens to an intersection point on the optical axis of the image-side surface of the third lens is denoted as SGI321. The following conditions are met: SGI321=0.01218 mm, and |SGI321|/(|SGI321|+TP3)= 0.03902.

A perpendicular distance to the optical axis from the inflection point which is nearest to the optical axis on the object-side surface of the third lens to the optical axis is denoted as HIF311. A perpendicular distance to the optical axis from the inflection point which is nearest to the optical axis on the image-side surface of the third lens to an intersection point on the optical axis of the image-side surface of the third lens is denoted as HIF321. The following conditions are met: HIF321=0.84373 mm and HIF321/HOI=0.27864.

The fourth lens 140 has positive refractive power and is made of plastic materials. The fourth lens 140 has a convex object-side surface 142 and a convex image-side surface 144, wherein both of them are aspheric, and the image-side surface 144 thereof has an inflection point. The outline curve length of the maximum effective half diameter of the object-side surface of the fourth lens is denoted as ARS41, and the outline curve length of the maximum effective half diameter of the image-side surface of the fourth lens is denoted as ARS42. The outline curve length of ½ entrance pupil diameter (HEP) of the object-side surface of the fourth lens is denoted as ARE41, and the outline curve length of ½ entrance pupil diameter (HEP) of the image-side surface of the fourth lens is denoted as ARE42. The central thickness of the fourth lens on the optical axis is denoted as TP4.

A horizontal shift distance in parallel with the optical axis from an inflection point which is nearest to the optical axis on the object-side surface of the fourth lens to an intersection point on the optical axis of the object-side surface of the fourth lens is denoted as SGI411. A horizontal shift distance in parallel with the optical axis from an inflection point which is nearest to the optical axis on the image-side surface of the fourth lens to an intersection point on the optical axis of the image-side surface of the fourth lens is denoted as SGI421. The following conditions are met: SGI411=0 mm, SGI421=−0.41627 mm, |SGI411|/(|SGI411|+TP4)=0 and |SGI421|/(|SGI421|+TP4)=0.25015.

A horizontal shift distance in parallel with the optical axis from an inflection point which is second nearest to the optical axis on the object-side surface of the fourth lens to an intersection point on the optical axis of the object-side surface of the fourth lens is denoted as SGI412. The following conditions are met: SGI412=0 mm and |SGI412|/(|SGI412|+TP4)=0.

A perpendicular distance to the optical axis from the inflection point which is nearest to the optical axis on the object-side surface of the fourth lens to the optical axis is denoted as HIF411. A perpendicular distance to the optical axis from the inflection point which is nearest to the optical axis on the image-side surface of the fourth lens to the optical axis is denoted as HIF421. The following conditions are met: HIF411=0 mm, HIF421=1.55079 mm, HIF411/HOI=0 and HIF421/HOI=0.51215.

A perpendicular distance to the optical axis from the inflection point which is second nearest to the optical axis on the object-side surface of the fourth lens to the optical axis is denoted as HIF412. The following conditions are met: HIF412=0 mm and HIF412/HOI=0.

The infrared filter 170 is made of glass materials and configured between the fourth lens 140 and the image plane 180. Additionally, the infrared filter 170 does not affect the focal length of the optical image capturing system.

In the optical image capturing system of the first embodiment, the focal length of the optical image capturing system is f, the entrance pupil diameter of the optical image capturing system is HEP, and half of the maximum angle of view of the optical image capturing system is HAF. The detailed parameters are shown as follows: f=2.6841 mm, f/HEP=2.7959, HAF=70 deg. and tan(HAF)=2.7475.

In the optical image capturing system of the first embodiment, the focal length of the first lens 110 is f1, and the focal length of the fourth lens 140 is f4. The following conditions are met: f1=−5.4534 mm, |f/f1|=0.4922, f4=2.7595 mm and |f1/f4|=1.9762.

In the optical image capturing system of the first embodiment, the focal length of the second lens 120 is f2, and the focal length of the third lens 130 is f3. The following conditions are met: |f2|+|f3|=13.2561 mm, |f1|+|f4|=8.2129 mm and |f2|+|f3|>|f1|+|f4|.

The ratio of the focal length f of the optical image capturing system to a focal length fp of each of lenses with positive refractive powers is denoted as PPR. The ratio of the focal length f of the optical image capturing system to a focal length fn of each of lenses with negative refractive powers is denoted as NPR. In the optical image capturing system of the first embodiment, the sum of the PPR of all lenses with positive refractive power is ΣPPR=|f/f2|+|f/f4|=1.25394, and the sum of the NPR of all lenses with negative refractive power is ΣNPR=|f/f1|+|f/f2|=1.21490, wherein ΣPPR/|ΣNPR|=1.03213. The following conditions are also met: |f/f1|=0.49218, |f/f2|=0.28128, |f/f3|=0.72273 and |f/f4|=0.97267.

In the optical image capturing system of the first embodiment, a distance from the object-side surface 112 of the first lens to the image-side surface 144 of the fourth lens is denoted as InTL. A distance from the object-side surface 112 of the first lens to the image plane 180 is denoted as HOS. A distance from the aperture 100 to the image plane 180 is denoted as InS. Half of a diagonal length of an effective sensing field of the image sensing device 190 is denoted as HOI. A distance from the image-side surface 144 of the fourth lens to the image plane 180 is denoted as InB. The following conditions are met: InTL+InB=HOS, HOS=18.74760 mm, HOI=3.088 mm, HOS/HOI=6.19141, HOS/f=6.9848, InTL/HOS=0.6605, InS=8.2310 mm and InS/HOS=0.4390.

In the optical image capturing system of the first embodiment, the sum of central thicknesses of all lenses with refractive power on the optical axis is denoted as ΣTP. The following conditions are met: ΣTP=4.9656 mm and ΣTP/InTL=0.4010. In this manner, a suitable contrast ratio for image formation in the optical image capturing system and a suitable yield rate of manufacturing the lenses may be simultaneously achieved, and an appropriate back focal length may be provided so as to accommodate other optical elements in the optical image capturing system.

In the optical image capturing system of the first embodiment, the curvature radius of the object-side surface 112 of the first lens is denoted as R1. The curvature radius of the image-side surface 114 of the first lens is denoted as R2. The following condition is met: |R1/R2|=9.6100. Hence, the first lens element has a suitable magnitude of the positive refractive power, so as to prevent the spherical aberration from increasing too fast.

In the optical image capturing system of the first embodiment, the curvature radius of the object-side surface 142 of the fourth lens is denoted as R7. The curvature radius of the image-side surface 144 of the fourth lens is denoted as R8. The following condition is satisfied: (R7−R8)/(R7+R8)=−35.5932. Hence, the astigmatism generated by the optical image capturing system may be easier to correct.

In the optical image capturing system of the first embodiment, the sum of the focal lengths of all lenses with positive refractive power is denoted as ΣPP, which meets the following conditions: ΣPP=12.30183 mm, and f4/ΣPP=0.22432. Therefore, the positive refractive power of the fourth lens 140 may be distributed to other lenses with positive refractive power appropriately, so as to suppress noticeable aberrations generated in the process of the incident light travelling inwardly into the optical image capturing system.

In the optical image capturing system of the first embodiment, the sum of the focal lengths of all lenses with negative refractive power is denoted as ΣNP, which meets the following conditions: ΣNP=−14.6405 mm, and f1/ΣNP=0.59488. Therefore, the negative refractive power of the first lens 110 may be distributed to other lenses with negative refractive power appropriately, so as to suppress noticeable aberrations generated in the process of the incident light travelling inwardly into the optical image capturing system.

In the optical image capturing system of the first embodiment, the distance between the first lens 110 and the second lens 120 on the optical axis is denoted as IN12. The following conditions are satisfied: IN12=4.5709 mm, and IN12/f=1.70299. Hence, the chromatic aberration of the lenses may be mitigated, so as to improve the performance thereof.

In the optical image capturing system of the first embodiment, the distance between the second lens 120 and the third lens 130 on the optical axis is denoted as IN23. The following conditions are satisfied: IN23=2.7524 mm, IN23/f=1.02548. Hence, the chromatic aberration of the lenses may be mitigated, so as to improve the performance thereof.

In the optical image capturing system of the first embodiment, the distance between the third lens 130 and the fourth lens 140 on the optical axis is denoted as IN34. The following conditions are satisfied: IN34=0.0944 mm and IN34/f=0.03517. Hence, the chromatic aberration of the lenses may be mitigated, so as to improve the performance thereof.

In the optical image capturing system of the first embodiment, central thicknesses of the first lens 110 and the second lens 120 on the optical axis are denoted as TP1 and TP2, respectively. The following conditions are satisfied: TP1=0.9179 mm, TP2=2.5000 mm, TP1/TP2=0.36715 and (TP1+IN12)/TP2=2.19552. Hence, the sensitivity formed via the optical image capturing system may be easier to control, and the performance thereof may be improved.

In the optical image capturing system of the first embodiment, central thicknesses of the third lens 130 and the fourth lens 140 on the optical axis are denoted as TP3 and TP4, respectively. The distance between the aforementioned two lenses on the optical axis is denoted as IN34. The following conditions are satisfied: TP3=0.3 mm, TP4=1.2478 mm, TP3/TP4=0.24043 and (TP4+IN34)/TP3=4.47393. Hence, the sensitivity formed via the optical image capturing system may be easier to control, and the total height of the optical image capturing system may be reduced.

In the optical image capturing system of the first embodiment, the following condition is satisfied: IN23/(TP2+IN23+TP3)=0.49572. Hence, an aberration generated in a process of the incident light travelling inwardly into the optical image capturing system may be easier to gradually correct layer upon layer, and a total height of the optical image capturing system may be reduced.

In the optical image capturing system of the first embodiment, a horizontal shift distance in parallel with the optical axis from a maximum effective half diameter position to an intersection point of the optical axis and the object-side surface 142 of the fourth lens is denoted as InRS41. A horizontal shift distance in parallel with the optical axis from a maximum effective half diameter position to an intersection point of the optical axis and the image-side surface 144 of the fourth lens is denoted as InRS42. A central thickness of the fourth lens 140 is denoted as TP4. The following conditions are satisfied: InRS41=0.2955 mm, InRS42=−0.4940 mm, |InRS41|+|InRS42|=0.7894 mm, |InRS41|/TP4=0.23679 and |InRS42|/TP4=0.39590. Hence, the configuration is beneficial for manufacturing and forming the lenses, and for effectively retaining the miniaturization of the optical image capturing system.

In the optical image capturing system of the first embodiment, a perpendicular distance to the optical axis between a critical point C41 on the object-side surface 142 of the fourth lens and the optical axis is denoted as HVT41. A perpendicular distance to the optical axis between a critical point C42 on the image-side surface 144 of the fourth lens and the optical axis is denoted as HVT42. The following conditions are satisfied: HVT41=0 mm and HVT42=0 mm.

In the optical image capturing system of the present embodiment, the following condition is satisfied: HVT42/HOI=0.

In the optical image capturing system of the present embodiment, the following condition is satisfied: HVT42/HOS=0.

In the optical image capturing system of the first embodiment, the Abbe number of the first lens is denoted as NA1. The Abbe number of the second lens is denoted as NA2. An Abbe number of the third lens is denoted as NA3. An Abbe number of the fourth lens is denoted as NA4. The following condition is satisfied: |NA1−NA2|=0.0351. Hence, the chromatic aberration of the optical image capturing system may be easier to correct.

In the optical image capturing system of the first embodiment, the TV distortion and optical distortion when images are formed in the optical image capturing system are TDT and ODT, respectively. The following conditions are satisfied: TDT=37.4846% and ODT=−55.3331%.

In the present embodiment of the disclosure, light of any field of view may be further divided into sagittal ray and tangential ray, and a spatial frequency of 220 cycles/mm serves as the benchmark for assessing the focus shifts and the values of MTF. The focus shifts where the through-focus MTF values of the visible sagittal ray at the central field of view, 0.3 field of view and 0.7 field of view of the optical image capturing system are at their respective maximums are denoted as VSFS0, VSFS3 and VSFS7 (unit of measurement: mm), respectively, wherein the values of VSFS0, VSFS3 and VSFS7 are equal to 0.00000 mm, 0.00000 mm and 0.00000 mm, respectively. The maximum values of the through-focus MTF of the visible sagittal ray at the central field of view, 0.3 field of view and 0.7 field of view are denoted as VSMTF0, VSMTF3 and VSMTF7, respectively, wherein the values of VSMTF0, VSMTF3 and VSMTF7 are equal to 0.416, 0.397 and 0.342, respectively. The focus shifts where the through-focus MTF values of the visible tangential ray at the central field of view, 0.3 field of view and 0.7 field of view of the optical image capturing system are at their respective maximums are denoted as VTFS0, VTFS3 and VTFS7 (unit of measurement: mm), respectively, wherein the values of VTFS0, VTFS3 and VTFS7 are equal to 0.00000 mm, 0.00000 mm, and −0.01000 mm, respectively. The maximum values of the through-focus MTF of the visible tangential ray at the central field of view, 0.3 field of view and 0.7 field of view are denoted as VTMTF0, VTMTF3 and VTMTF7, respectively, wherein the values of VTMTF0, VTMTF3 and VTMTF7 are equal to 0.416, 0.34 and 0.139, respectively. The average focus shift (position) of the aforementioned focus shifts of the visible sagittal ray at three fields of view and the visible tangential ray at three fields of view is denoted as AVFS (unit of measurement: mm), which meets the absolute value of |(VSFS0+VSFS3+VSFS7+VTFS0+VTFS3+VTFS7)/6|=|−0.00200 mm|.

The focus shifts where the through-focus MTF values of the infrared sagittal ray at the central field of view, 0.3 field of view and 0.7 field of view of the optical image capturing system are at their respective maximums are denoted as ISFS0, ISFS3 and ISFS7 (unit of measurement: mm), respectively, wherein the values of ISFS0, ISFS3 and ISFS7 are equal to 0.03000 mm, 0.03300 mm, and 0.03300 mm, respectively. The average focus shift (position) of the aforementioned focus shifts of the infrared sagittal ray at three fields of view is denoted as AISFS. The maximum values of the through-focus MTF of the infrared sagittal ray at the central field of view, 0.3 field of view and 0.7 field of view are denoted as ISMTF0, ISMTF3, and ISMTF7, respectively, wherein the values of ISMTF0, ISMTF3 and ISMTF7 are equal to 0.169, 0.148 and 0.089, respectively. The focus shifts where the through-focus MTF values of the infrared tangential ray at the central field of view, 0.3 field of view and 0.7 field of view of the optical image capturing system are at their respective maximums are denoted as ITFS0, ITFS3 and ITFS7 (unit of measurement: mm), respectively, wherein the values of ITFS0, ITFS3 and ITFS7 equal to 0.03, 0.028 and 0.005, respectively. The average focus shift (position) of the aforementioned focus shifts of the infrared tangential ray at three fields of view is denoted as AITFS (the unit of measurement: mm). The maximum values of the through-focus MTF of the infrared tangential ray at the central field of view, 0.3 field of view and 0.7 field of view are denoted as ITMTF0, ITMTF3 and ITMTF7, respectively, wherein the values of ITMTF0, ITMTF3 and ITMTF7 equal to 0.169, 0.093 and 0.00000, respectively. The average focus shift (position) of the aforementioned focus shifts of the infrared sagittal ray at the three fields of view and of the infrared tangential ray at the three fields of view is denoted as AIFS (unit of measurement: mm), which meets the absolute value of |(ISFS0+ISFS3+ISFS7+ITFS0+ITFS3+ITFS7)/6|=|0.02600 mm|.

The focus shift between the focal points for the visible light and the infrared light (RGB/IR) at their central fields of view of the entire optical image capturing system (i.e. the wavelength of 850 nm versus the wavelength of 555 nm, unit of measurement: mm) is denoted as FS (the distance between the first and second image planes on the optical axis), which meets the absolute value of |(VSFS0+VTFS0)/2−(ISFS0+ITFS0)/2|=|0.03000 mm|. The difference (focus shift) between the average focus shift of the visible light at the three fields of view and the average focus shift of the infrared light (RGB/IR) at the three fields of view of the entire optical image capturing system is denoted as AFS (i.e. the wavelength of 850 nm versus the wavelength of 555 nm, unit of measurement: mm), which meets the absolute value of |AIFS−AVFS|=|0.02800 mm|.

In the optical image capturing system of the first embodiment, the transverse aberration of the longest operation wavelength of a positive direction tangential fan passing through the edge of the aperture and incident at the position of 0.7 field of view on the image plane is denoted as PLTA, which is −0.018 mm. The transverse aberration of the shortest operation wavelength of a positive direction tangential fan passing through the edge of the aperture and incident at the position of 0.7 field of view on the image plane is denoted as PSTA, which is 0.010 mm. The transverse aberration of the longest operation wavelength of the negative direction tangential fan passing through the edge of the aperture and incident at the position of 0.7 field of view on the image plane is denoted as NLTA, which is 0.003 mm. The transverse aberration of the shortest operation wavelength of the negative direction tangential fan passing through the edge of the aperture and incident at the position of 0.7 field of view on the image plane is denoted as NSTA, which is −0.003 mm. The transverse aberration of the longest operation wavelength of the sagittal fan passing through the edge of the aperture and incident at the position of 0.7 field of view on the image plane is denoted as SLTA, which is −0.010 mm. The transverse aberration of the shortest operation wavelength of the sagittal fan passing through the edge of the aperture and incident at the position of 0.7 field of view on the image plane is denoted as SSTA, which is 0.003 mm.

Table 1 and Table 2 below should be incorporated into the reference of the present embodiment.

TABLE 1

Lens Parameters for the First Embodiment
f(focal length) = 2.6841 mm; f/HEP = 2.7959;
HAF(half angle of view) = 70 deg.; tan(HAF) = 2.7475

| Surface No. | | Curvature Radius | Thickness (mm) | Material | Refractive Index | Abbe No. | Focal Distance |
|---|---|---|---|---|---|---|---|
| 0 | Object | Plane | At infinity | | | | |
| 1 | Lens 1 | 31.98102785 | 0.918 | Glass | 1.688 | 50.26 | −5.453 |
| 2 | | 3.327880578 | 4.571 | | | | |
| 3 | Lens 2 | −15.2556818 | 2.500 | Plastic | 1.642 | 22.46 | 9.542 |
| 4 | | −4.681543531 | 2.528 | | | | |
| 5 | Aperture | Plane | 0.225 | | | | |
| 6 | Lens 3 | −2.453543123 | 0.300 | Plastic | 1.642 | 22.46 | −3.714 |
| 7 | | 127.8664454 | 0.094 | | | | |
| 8 | Lens 4 | 2.697747363 | 1.248 | Plastic | 1.544 | 56.09 | 2.759 |
| 9 | | −2.853715061 | 0.725 | | | | |
| 10 | Infrared Filter | Plane | 2.000 | BK7_SCHOTT | 1.517 | 64.13 | |
| 11 | | Plane | 3.640 | | | | |
| 12 | Image Plane | Plane | | | | | |

Reference Wavelength = 555 nm; Shield Position: The 3$^{rd}$ surface with clear aperture of 3.0 mm

TABLE 2

Aspheric Coefficients of the First Embodiment
Table 2: Aspheric Coefficients

| | Surface No. | | | | | |
|---|---|---|---|---|---|---|
| | 3 | 4 | 6 | 7 | 8 | 9 |
| k= | −2.918829E+01 | −3.214789E+00 | −1.504539E+01 | −2.970417E+01 | −1.613370E+01 | −1.145951E+00 |
| $A_4$= | −9.004096E−04 | −9.725260E−06 | 8.890018E−05 | 3.634454E−02 | 9.587367E−03 | −4.742020E−03 |
| $A_6$= | 2.391364E−04 | −8.096303E−05 | −1.166688E−02 | −3.060142E−02 | −3.693991E−03 | 1.232422E−03 |
| $A_8$= | −2.421089E−05 | 7.787465E−07 | −5.720942E−04 | 8.833265E−03 | 8.653836E−04 | 3.333400E−04 |
| $A_{10}$= | 1.716292E−06 | 3.517517E−07 | 8.305770E−04 | −1.362695E−03 | −7.093620E−05 | −2.583094E−06 |
| $A_{12}$= | 0.000000E+00 | 0.000000E+00 | 0.000000E+00 | 0.000000E+00 | 0.000000E+00 | 0.000000E+00 |

The values pertaining to the outline curve lengths may be obtained according to data in Table 1 and Table 2:

First Embodiment (Primary Reference Wavelength Used = 555 nm)

| ARE | ½(HEP) | ARE value | ARE − ½(HEP) | 2(ARE/HEP) % | TP | ARE/TP (%) |
|---|---|---|---|---|---|---|
| 11 | 0.480 | 0.480 | 0.000 | 100.00% | 0.918 | 52.30% |
| 12 | 0.480 | 0.482 | 0.002 | 100.35% | 0.918 | 52.48% |
| 21 | 0.480 | 0.480 | 0.000 | 100.02% | 2.500 | 19.20% |
| 22 | 0.480 | 0.481 | 0.001 | 100.17% | 2.500 | 19.23% |
| 31 | 0.480 | 0.482 | 0.002 | 100.49% | 0.300 | 160.78% |
| 32 | 0.480 | 0.480 | 0.000 | 100.00% | 0.300 | 160.00% |
| 41 | 0.480 | 0.482 | 0.002 | 100.42% | 1.248 | 38.63% |
| 42 | 0.480 | 0.482 | 0.002 | 100.47% | 1.248 | 38.65% |

| ARS | EHD | ARS value | ARS − EHD | (ARS/EHD) % | TP | ARS/TP (%) |
|---|---|---|---|---|---|---|
| 11 | 5.943 | 5.978 | 0.035 | 100.58% | 0.918 | 651.27% |
| 12 | 3.236 | 4.439 | 1.204 | 137.20% | 0.918 | 483.66% |
| 21 | 3.000 | 3.007 | 0.007 | 100.24% | 2.500 | 120.29% |
| 22 | 2.855 | 2.983 | 0.128 | 104.49% | 2.500 | 119.33% |
| 31 | 1.061 | 1.079 | 0.017 | 101.61% | 0.300 | 359.54% |
| 32 | 1.293 | 1.292 | −0.001 | 99.95% | 0.300 | 430.77% |
| 41 | 1.642 | 1.676 | 0.034 | 102.06% | 1.248 | 134.30% |
| 42 | 1.767 | 1.859 | 0.092 | 105.21% | 1.248 | 148.98% |

Table 1 is the detailed structural data for the first embodiment in FIG. 1, wherein the unit of the curvature radius, the central thickness, the distance and the focal length is millimeters (mm), and surfaces 0-14 illustrate the surfaces in order from the object side to the image plane of the optical image capturing system. Table 2 shows the aspheric coefficients of the first embodiment, wherein k is the conic coefficient in the aspheric surface curve equation, and $A_1$-$A_{20}$ are the first to the twentieth order aspheric surface coefficients respectively. In addition, the tables of following embodiments exactly correspond to their respective schematic views and the diagrams of aberration curves, and the definitions of parameters therein are identical to those in the Table 1 and the Table 2 of the first embodiment, so that the repetitive details are not stated here.

Second Embodiment

Figure 2A:
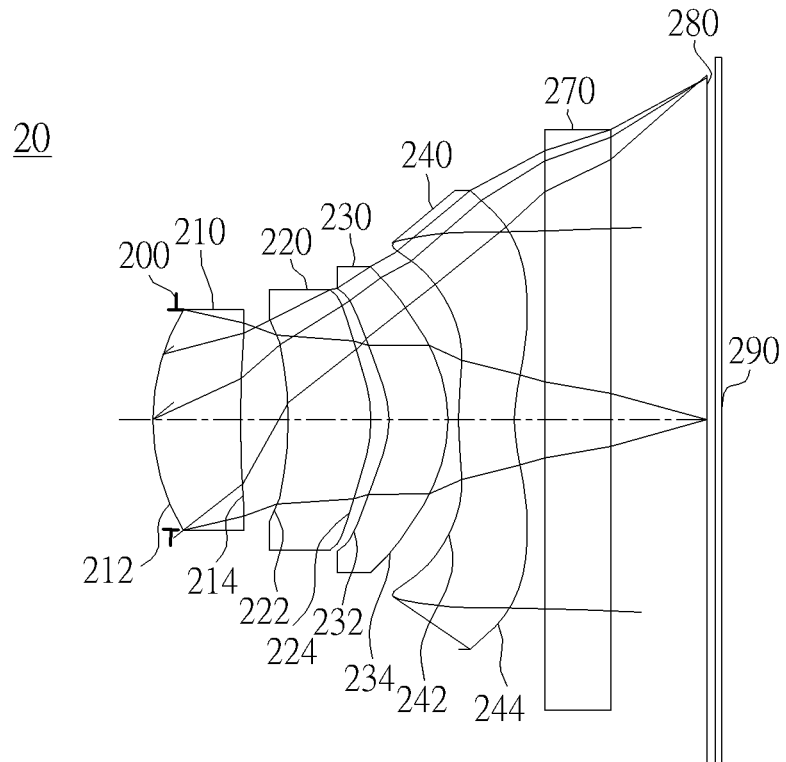
FIG. 2A is a schematic view of the optical image capturing system according to a second embodiment of the present disclosure.
Figure 2B:
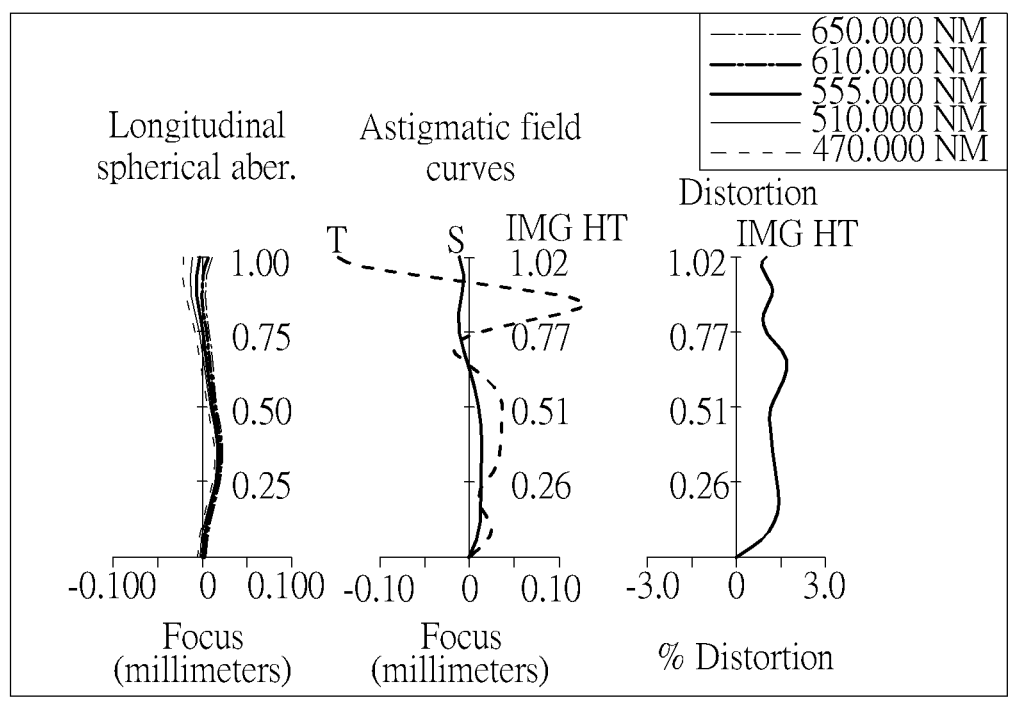
FIG. 2B is a curve diagram illustrating the spherical aberration, astigmatism and optical distortion of the optical image capturing system in sequence from left to right according to the second embodiment of the present disclosure.
Figure 2C:
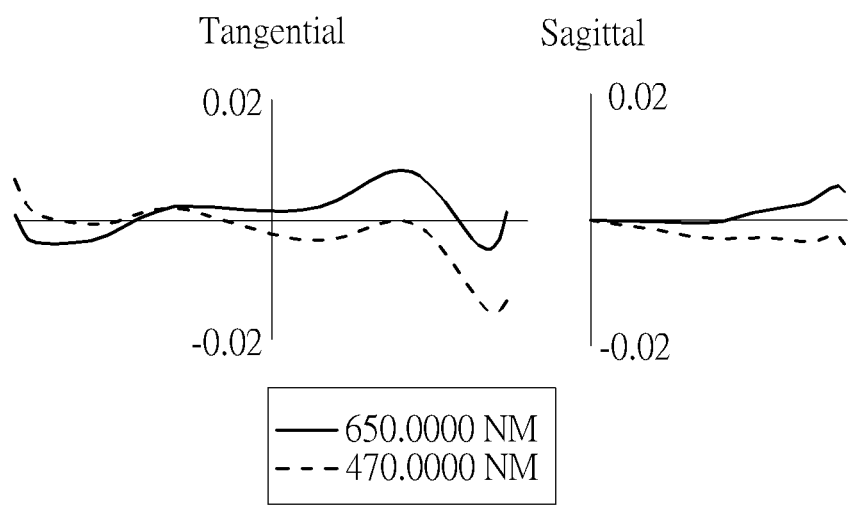
FIG. 2C is a transverse aberration diagram of the longest operation wavelength and the shortest operation wavelength for the tangential fan and the sagittal fan, of which the longest operation wavelength and the shortest operation wavelength pass through the edge of aperture at the position of 0.7 field of view on the image plane, according to the second embodiment of the present disclosure.
Figure 2D:
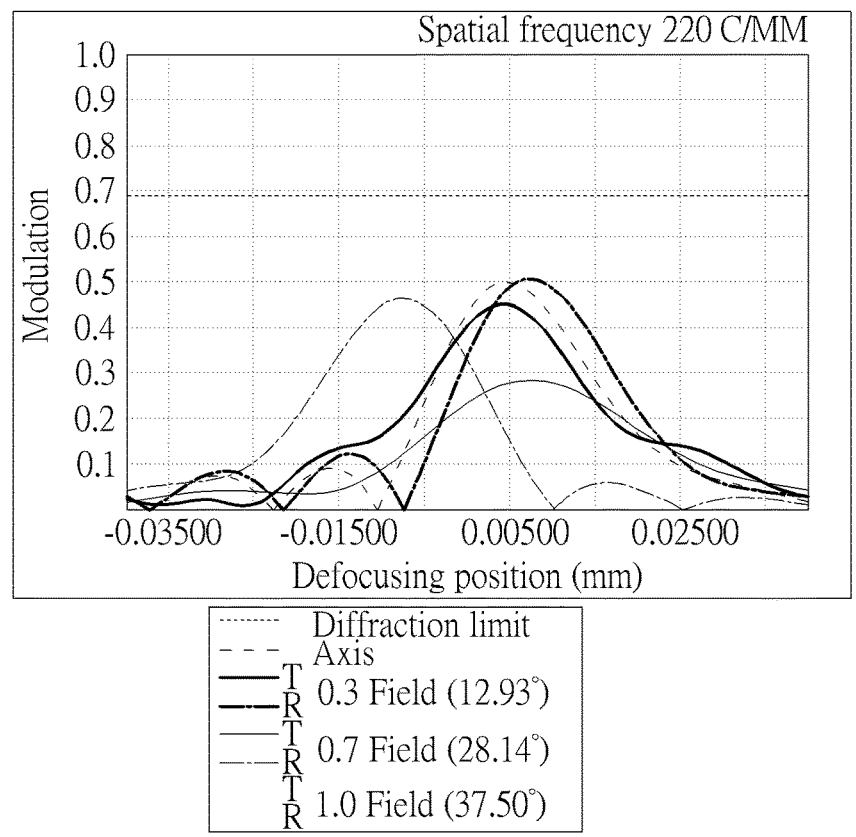
FIG. 2D is a diagram illustrating the through-focus MTF values for the visible light spectrum at the central field of view, 0.3 field of view and 0.7 field of view according to the second embodiment of the present disclosure.
Figure 2E:
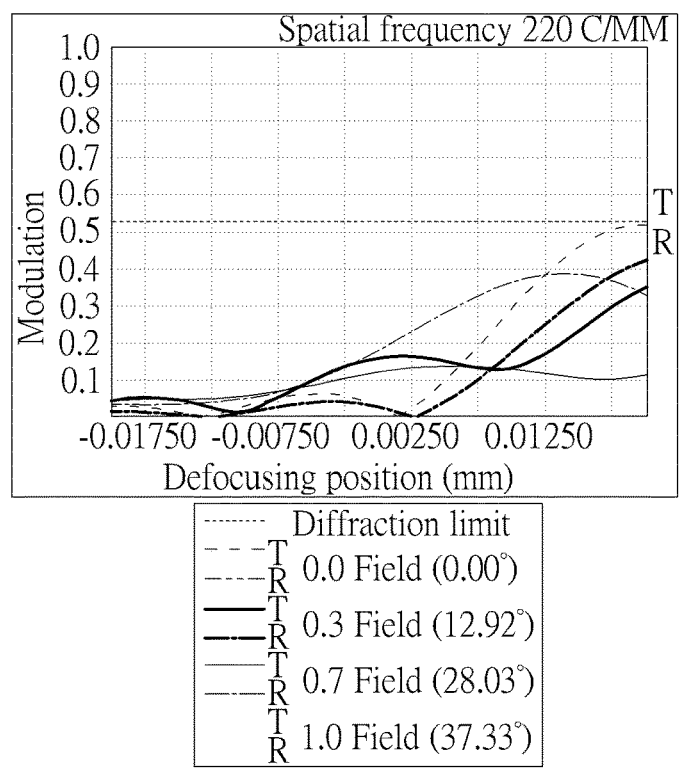
FIG. 2E is a diagram illustrating the through-focus MTF values for the infrared light spectrum at the central field of view, 0.3 field of view and 0.7 field of view according to the second embodiment of the present disclosure.

Please refer to FIGS. 2A and 2B, wherein FIG. 2A is a schematic view of the optical image capturing system according to the second embodiment of the present disclosure. FIG. 2B is a curve diagram illustrating the spherical aberration, astigmatism and optical distortion of the optical image capturing system in sequence from left to right according to the second embodiment of the present disclosure. FIG. 2C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane according to the second embodiment of the present disclosure. FIG. 2D is a diagram illustrating the through-focus MTF values for the visible light spectrum at the central field of view, 0.3 field of view and 0.7 field of view of the second embodiment of the present disclosure. FIG. 2E is a diagram illustrating the through-focus MTF values for the infrared light spectrum at the central field of view, 0.3 field of view and 0.7 field of view of the second embodiment of the present disclosure. As shown in FIG. 2A, in the order from an object side to an image side, the optical image capturing system includes an aperture 200, a first lens 210, a second lens 220, a third lens 230, a fourth lens 240, an infrared filter 270, an image plane 280 and an image sensing device 290.

The first lens 210 has positive refractive power and is made of plastic material. The first lens 210 has a convex object-side surface 212 and a concave image-side surface 214, wherein both of them are aspheric. The image-side surface 214 has one inflection point.

The second lens 220 has positive refractive power and is made of plastic material. The second lens 220 has a concave object-side surface 222 and a convex image-side surface 224, wherein both of them are aspheric. The image-side surface 224 has two inflection points.

The third lens 230 has negative refractive power and is made of plastic material. The third lens 230 has a concave object-side surface 232 and a convex image-side surface 234, wherein both of them are aspheric. The object-side surface 232 has two inflection points and the image-side surface 234 has one inflection point.

The fourth lens 240 has negative refractive power and is made of plastic material. The fourth lens 240 has a convex object-side surface 242 and a concave image-side surface 244, wherein both of them are aspheric. The object-side surface 242 and the image-side surface 244 each has one inflection point.

The infrared filter 270 is made of glass material and is configured between the fourth lens 240 and the image plane 280. The infrared filter 270 does not affect the focal length of the optical image capturing system.

Table 3 and Table 4 below should be incorporated into the reference of the present embodiment.

TABLE 3

Lens Parameters of the Second Embodiment
f(focal length) = 1.327 mm; f/HEP = 2.0; HAF(half angle of view) = 37.495 deg.

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Aperture | 1E+18 | −0.067 | | | | |
| 2 | Lens 1 | 0.618467252 | 0.282 | Plastic | 1.535 | 56.27 | 1.360 |
| 3 | | 3.416065403 | 0.034 | | | | |
| 4 | | 1E+18 | 0.117 | | | | |
| 5 | Lens 2 | −1.162407401 | 0.266 | Plastic | 1.535 | 56.27 | 0.834 |
| 6 | | −0.348828145 | 0.059 | | | | |
| 7 | Lens 3 | −0.230253772 | 0.190 | Plastic | 1.642 | 22.46 | −3.910 |
| 8 | | −0.335439926 | 0.033 | | | | |
| 9 | Lens 4 | 0.768985307 | 0.179 | Plastic | 1.642 | 22.46 | −1.554 |
| 10 | | 0.396082053 | 0.101 | | | | |
| 11 | Infrared Filter | 1E+18 | 0.210 | BK7_SCHOTT | 1.517 | 64.13 | |
| 12 | | 1E+18 | 0.310 | | | | |
| 13 | Image Plane | 1E+18 | 0.000 | | | | |

Reference wavelength = 555 nm; shield position: the $4^{th}$ surface with clear aperture of 0.345 mm and the $8^{th}$ surface with clear aperture of 0.460 mm

TABLE 4

The Aspheric Coefficients of the Second Embodiment
Table 4: Aspheric Coefficients

| | Surface No. | | | | | |
|---|---|---|---|---|---|---|
| | 2 | 3 | 5 | 6 | 7 | 8 |
| k= | −1.365642E−01 | −7.811687E−01 | −3.065997E+00 | −6.081871E+00 | −5.317767E+00 | −8.457929E−01 |
| $A_4=$ | 3.107286E−01 | 9.618249E−01 | −3.912598E+00 | 2.902210E+00 | 4.792231E+00 | 1.528043E+01 |
| $A_6=$ | −5.963608E+00 | −8.649125E+01 | 1.503082E+02 | −9.989074E+01 | −2.008042E+02 | −4.013511E+02 |
| $A_8=$ | 1.674859E+02 | 3.266812E+03 | −5.174354E+03 | 1.513108E+03 | 3.593136E+03 | 6.359907E+03 |
| $A_{10}=$ | −2.923604E+03 | −6.758126E+04 | 9.841179E+04 | −1.035890E+04 | −3.596293E+04 | −6.020878E+04 |
| $A_{12}=$ | 3.130049E+04 | 7.495798E+05 | −1.114814E+06 | 4.179823E+04 | 2.279924E+05 | 3.365563E+05 |
| $A_{14}=$ | −1.849124E+05 | −4.270347E+06 | 6.869561E+06 | −1.765610E+05 | −8.692110E+05 | −1.018504E+06 |
| $A_{16}=$ | 4.504404E+05 | 9.766372E+06 | −1.778629E+07 | 4.189037E+05 | 1.384791E+06 | 1.278224E+06 |
| $A_{18}=$ | 0.000000E+00 | 0.000000E+00 | 0.000000E+00 | 0.000000E+00 | 0.000000E+00 | 0.000000E+00 |
| $A_{20}=$ | 0.000000E+00 | 0.000000E+00 | 0.000000E+00 | 0.000000E+00 | 0.000000E+00 | 0.000000E+00 |

| | Surface No. | |
|---|---|---|
| | 9 | 10 |
| k= | −5.291583E+01 | −8.086603E+00 |
| $A_4=$ | 5.854545E−01 | −4.363494E+00 |
| $A_6=$ | −2.569697E+02 | 6.300384E+00 |
| $A_8=$ | 4.337255E+03 | 1.193294E+02 |
| $A_{10}=$ | −3.674555E+04 | −8.970280E+02 |
| $A_{12}=$ | 1.741274E+05 | 2.748052E+03 |
| $A_{14}=$ | −4.409546E+05 | −4.041443E+03 |
| $A_{16}=$ | 4.633543E+05 | 2.337879E+03 |
| $A_{18}=$ | 0.000000E+00 | 0.000000E+00 |
| $A_{20}=$ | 0.000000E+00 | 0.000000E+00 |

In the second embodiment, the form of the aspheric surface equation therein is presented as that in the first embodiment. In addition, the definition of parameters in the following tables is equivalent to that in the first embodiment, so that the repetitive details are not stated here.

The following conditional values may be obtained according to the data in Table 3 and Table 4.

| Second Embodiment (Primary reference wavelength = 555 nm) | | | | | |
|---|---|---|---|---|---|
| InRS41 | InRS42 | HVT41 | HVT42 | ODT % | TDT % |
| −0.20004 | −0.14013 | 0.17715 | 0.32460 | 1.69844 | 0.88322 |
| \|f/f1\| | \|f/f2\| | \|f/f3\| | \|f/f4\| | \|f1/f2\| | \|f2/f3\| |
| 0.97552 | 1.59111 | 0.33935 | 0.85404 | 1.63104 | 0.21328 |
| ΣPPR | ΣNPR | ΣPPR/\|ΣNPR\| | ΣPP | ΣNP | f1/ΣPP |
| 2.44514 | 1.31487 | 1.85961 | −0.71970 | −2.54977 | 2.15870 |
| f4/ΣNP | IN12/f | IN23/f | IN34/f | TP3/f | TP4/f |
| −0.53344 | 0.11435 | 0.04462 | 0.02459 | 0.14320 | 0.13458 |
| InTL | HOS | HOS/HOI | InS/HOS | InTL/HOS | ΣTP/InTL |
| 1.16081 | 1.78220 | 1.73366 | 0.94522 | 0.65134 | 0.79019 |
| (TP1 + IN12)/TP2 | (TP4 + IN34)/TP3 | TP1/TP2 | TP3/TP4 | IN23/(TP2 + IN23 + TP3) | |
| 1.62891 | 1.11153 | 1.05942 | 1.06402 | 0.11481 | |
| \|InRS41\|/TP4 | \|InRS42\|/TP4 | HVT42/HOI | HVT42/HOS | | |
| 1.1202 | 0.7847 | 0.3158 | 0.1821 | | |
| f1/f2 | TP2/TP3 | IN12 | IN23 | IN34 | |
| 1.631 | 1.402 | 0.152 | 0.059 | 0.033 | |

| Second Embodiment (Primary reference wavelength = 555 nm) | | | | | |
|---|---|---|---|---|---|
| InTL234 | InTL234/f | HEP | HEP/IN12 | | |
| 0.727 | 0.548 | 0.6634 | 4.372 | | |
| PSTA | PLTA | NSTA | NLTA | SSTA | SLTA |
| −0.013 mm | 0.001 mm | 0.007 mm | 0.001 mm | −0.004 mm | 0.005 mm |
| VSFS0 | VSFS3 | VSFS7 | VTFS0 | VTFS3 | VTFS7 |
| 0.005 | 0.008 | −0.008 | 0.005 | 0.005 | 0.008 |
| VSMTF0 | VSMTF3 | VSMTF7 | VTMTF0 | VTMTF3 | VTMTF7 |
| 0.496 | 0.506 | 0.463 | 0.496 | 0.448 | 0.284 |
| ISFS0 | ISFS3 | ISFS7 | ITFS0 | ITFS3 | ITFS7 |
| 0.020 | 0.020 | 0.015 | 0.018 | 0.018 | 0.005 |
| ISMTF0 | ISMTF3 | ISMTF7 | ITMTF0 | ITMTF3 | ITMTF7 |
| 0.520 | 0.426 | 0.386 | 0.507 | 0.300 | 0.139 |
| FS | AIFS | AVFS | AFS | | |
| 0.015 | 0.016 | 0.004 | 0.012 | | |

The following conditional values may be obtained according to the data in Table 3 and Table 4.

| Values Related to Inflection Point of Second Embodiment (Primary Reference Wavelength = 555 nm) | | | | | | | |
|---|---|---|---|---|---|---|---|
| HIF121 | 0.20873 | HIF121/HOI | 0.20305 | SGI121 | 0.00619 | \|SGI121\|/(\|SGI121\| + TP1) | 0.02147 |
| HIF221 | 0.23574 | HIF221/HOI | 0.22932 | SGI221 | −0.05471 | \|SGI221\|/(\|SGI221\| + TP2) | 0.17036 |
| HIF222 | 0.29082 | HIF222/HOI | 0.28290 | SGI222 | −0.07364 | \|SGI222\|/(\|SGI222\| + TP2) | 0.21654 |
| HIF311 | 0.24890 | HIF311/HOI | 0.24212 | SGI311 | −0.07689 | \|SGI311\|/(\|SGI311\| + TP3) | 0.28809 |
| HIF312 | 0.30138 | HIF312/HOI | 0.29318 | SGI312 | −0.09981 | \|SGI312\|/(\|SGI312\| + TP3) | 0.34438 |
| HIF321 | 0.43896 | HIF321/HOI | 0.42700 | SGI321 | −0.22872 | \|SGI321\|/(\|SGI321\| + TP3) | 0.54623 |
| HIF411 | 0.10070 | HIF411/HOI | 0.09795 | SGI411 | 0.00539 | \|SGI411\|/(\|SGI411\| + TP4) | 0.02928 |
| HIF412 | 0.48471 | HIF412/HOI | 0.47151 | SGI412 | −0.17202 | \|SGI412\|/(\|SGI412\| + TP4) | 0.49066 |
| HIF421 | 0.14296 | HIF421/HOI | 0.13906 | SGI421 | 0.01987 | \|SGI421\|/(\|SGI421\| + TP4) | 0.10012 |
| HIF422 | 0.67926 | HIF422/HOI | 0.66076 | SGI422 | −0.12965 | \|SGI422\|/(\|SGI422\| + TP4) | 0.42064 |

The following conditional values may be obtained according to the data in Table 3 and Table 4.

| Second Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.332 | 0.350 | 0.01802 | 105.43% | 0.282 | 123.91% |
| 12 | 0.332 | 0.331 | −0.00047 | 99.86% | 0.282 | 117.35% |
| 21 | 0.332 | 0.348 | 0.01640 | 104.94% | 0.266 | 130.66% |
| 22 | 0.332 | 0.344 | 0.01235 | 103.72% | 0.266 | 129.14% |
| 31 | 0.332 | 0.352 | 0.02010 | 106.06% | 0.190 | 185.16% |
| 32 | 0.332 | 0.363 | 0.03122 | 109.41% | 0.190 | 191.01% |
| 41 | 0.332 | 0.337 | 0.00496 | 101.50% | 0.179 | 188.54% |
| 42 | 0.332 | 0.335 | 0.00287 | 100.86% | 0.179 | 187.37% |
| ARS | EHD | ARS value | ARS − EHD | (ARS/EHD) % | TP | ARS/TP (%) |
| 11 | 0.332 | 0.350 | 0.018 | 105.43% | 0.282 | 123.91% |
| 12 | 0.338 | 0.338 | 0.000 | 100.06% | 0.282 | 119.85% |
| 21 | 0.337 | 0.357 | 0.020 | 105.91% | 0.266 | 134.03% |
| 22 | 0.411 | 0.453 | 0.043 | 110.43% | 0.266 | 170.17% |
| 31 | 0.491 | 0.771 | 0.280 | 157.00% | 0.190 | 405.92% |
| 32 | 0.460 | 0.537 | 0.077 | 116.76% | 0.190 | 282.67% |

-continued

| Second Embodiment (Primary Reference Wavelength = 555 nm) | | | | | |
|---|---|---|---|---|---|
| 41 | 0.503 | 0.585 | 0.082 | 116.34% | 0.179 | 327.50% |
| 42 | 0.687 | 0.753 | 0.066 | 109.67% | 0.179 | 421.74% |

Third Embodiment

Figure 3A:
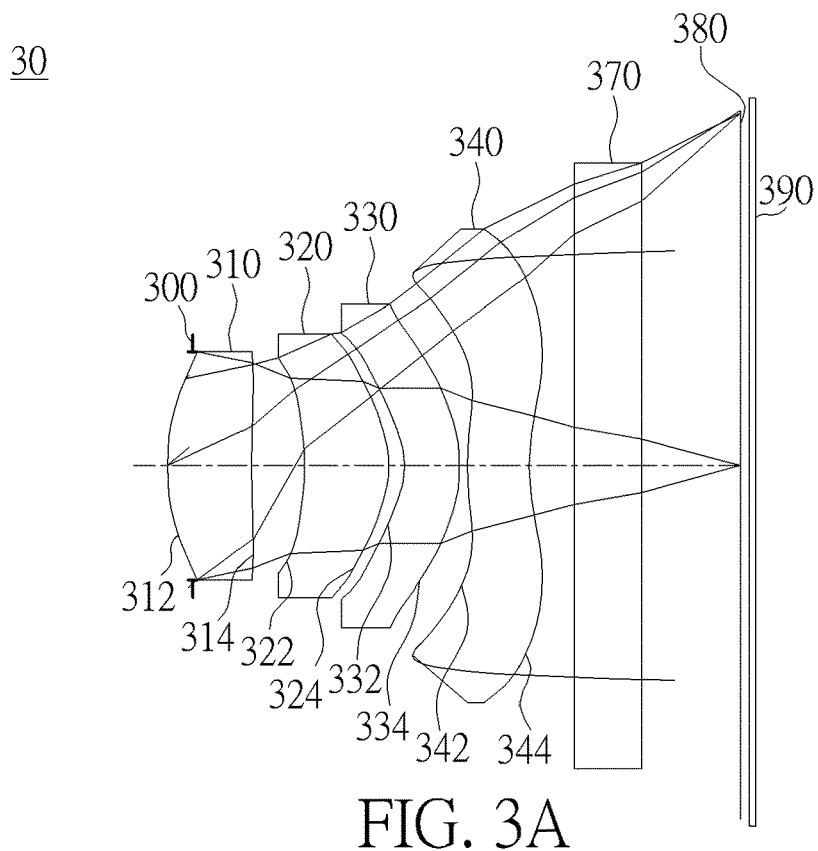
FIG. 3A is a schematic view of the optical image capturing system according to a third embodiment of the present disclosure.
Figure 3B:
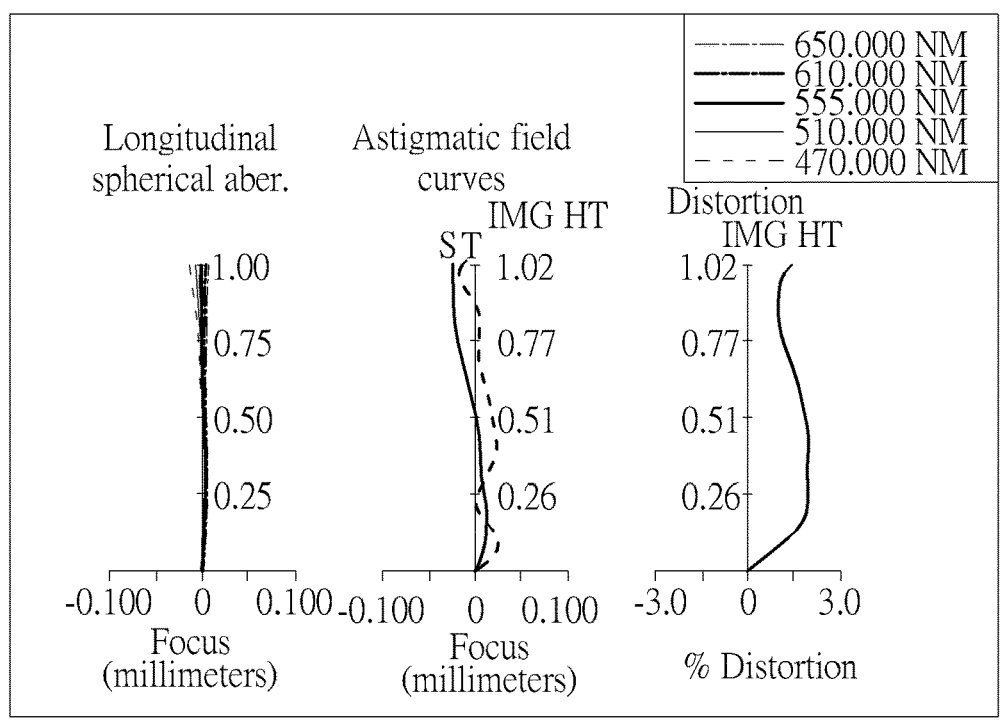
FIG. 3B is a curve diagram illustrating the spherical aberration, astigmatism and optical distortion of the optical image capturing system in sequence from left to right according to the third embodiment of the present disclosure.
Figure 3C:
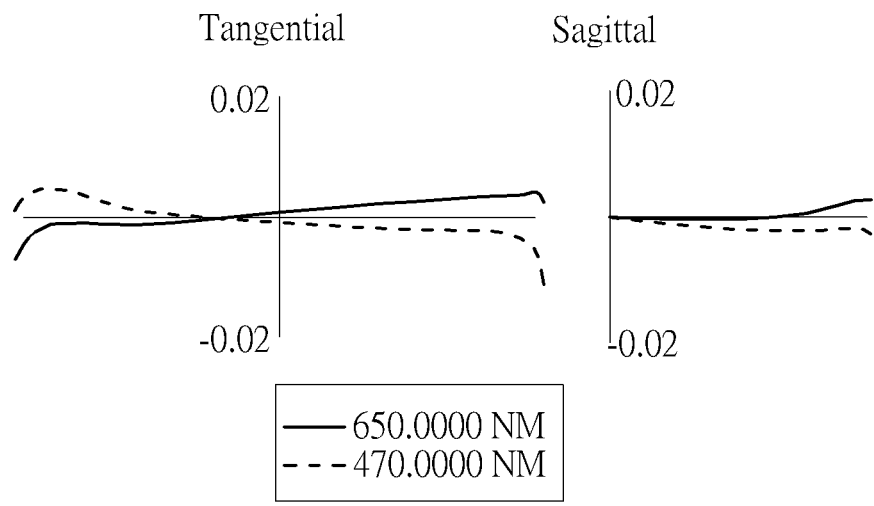
FIG. 3C is a transverse aberration diagram of the longest operation wavelength and the shortest operation wavelength for the tangential fan and the sagittal fan, of which the longest operation wavelength and the shortest operation wavelength pass through the edge of aperture at the position of 0.7 field of view on the image plane, according to the third embodiment of the present disclosure.
Figure 3D:
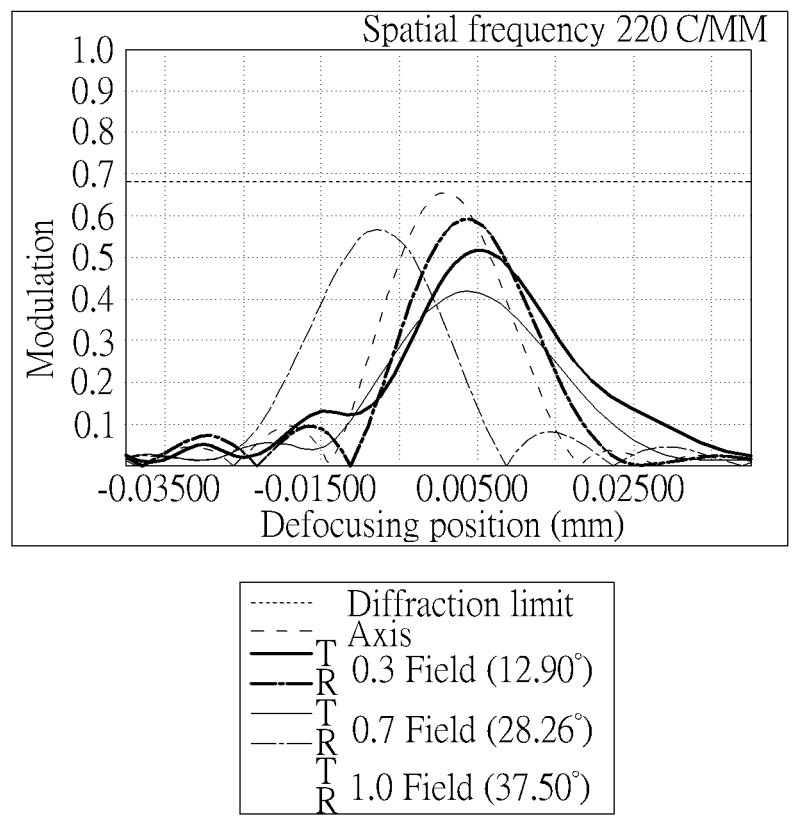
FIG. 3D is a diagram illustrating the through-focus MTF values for the visible light spectrum at the central field of view, 0.3 field of view and 0.7 field of view of the third embodiment of the present disclosure.
Figure 3E:
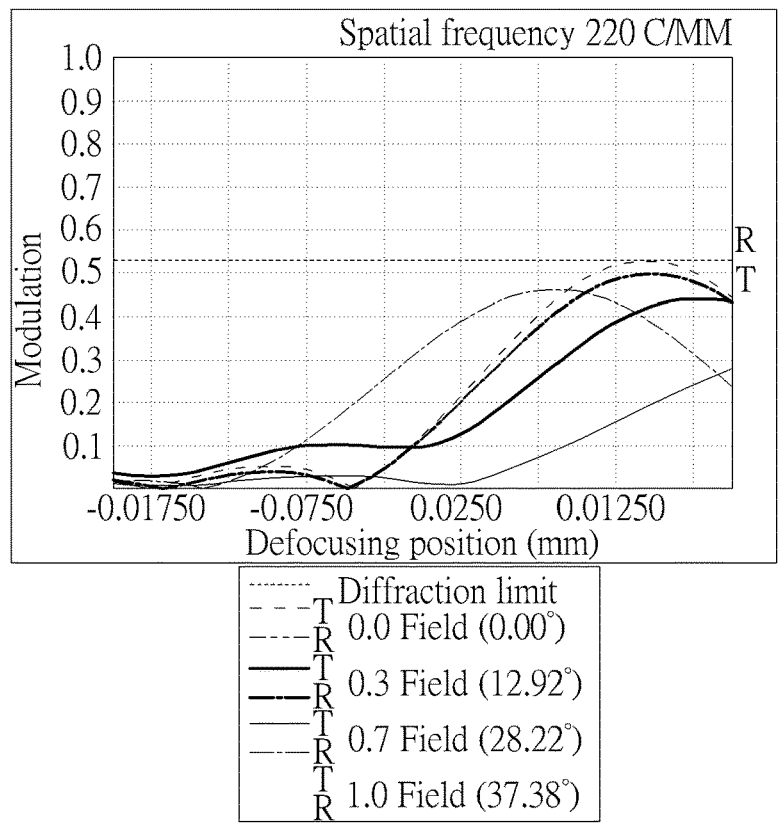
FIG. 3E is a diagram illustrating the through-focus MTF values for the infrared light spectrum at the central field of view, 0.3 field of view and 0.7 field of view of the third embodiment of the present disclosure.

Please refer to FIGS. 3A and 3B, wherein FIG. 3A is a schematic view of the optical image capturing system according to the third embodiment of the present disclosure. FIG. 3B is a curve diagram illustrating the spherical aberration, astigmatism and optical distortion of the optical image capturing system in sequence from left to right according to the third embodiment of the present disclosure. FIG. 3C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane according to the third embodiment of the present disclosure. FIG. 3D is a diagram illustrating the through-focus MTF values for the visible light spectrum at the central field of view, 0.3 field of view and 0.7 field of view of the third embodiment of the present disclosure. FIG. 3E is a diagram illustrating the through-focus MTF values for the infrared light spectrum at the central field of view, 0.3 field of view and 0.7 field of view of the third embodiment of the present disclosure. As shown in FIG. 3A, in the order from an object side to an image side, the optical image capturing system includes an aperture 300, a first lens 310, a second lens 320, a third lens 330, a fourth lens 340, an infrared filter 370, an image plane 380 and an image sensing device 390.

The first lens 310 has positive refractive power and is made of plastic material. The first lens 310 has a convex object-side surface 312 and a concave image-side surface 314, wherein both of them are aspheric. The image-side surface 314 has one inflection point.

The second lens 320 has positive refractive power and is made of plastic material. The second lens 320 has a concave object-side surface 322 and a convex image-side surface 324, wherein both of them are aspheric.

The third lens 330 has negative refractive power and is made of plastic material. The third lens 330 has a concave object-side surface 332 and a convex image-side surface 334, wherein both of them are aspheric. The image-side surface 334 has one inflection point.

The fourth lens 340 has negative refractive power and is made of plastic material. The fourth lens 340 has a convex object-side surface 342 and a concave image-side surface 344, wherein both of them are aspheric. The object-side surface 342 has two inflection points and the image-side surface 344 has one inflection point.

The infrared filter 370 is made of glass material and is configured between the fourth lens 340 and the image plane 380. The infrared filter 370 does not affect the focal length of the optical image capturing system.

Table 5 and Table 6 below should be incorporated into the reference of the present embodiment.

TABLE 5

Lens Parameters of the Third Embodiment
f(focal length) = 1.32075 mm; f/HEP = 2.0; HAF(half angle of view) = 37.4926 deg.

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Aperture | 1E+18 | −0.067 | | | | |
| 2 | Lens 1 | 0.622944458 | 0.256 | Plastic | 1.535 | 56.27 | 1.339 |
| 3 | | 4.031994408 | 0.029 | | | | |
| 4 | | 1E+18 | 0.136 | | | | |
| 5 | Lens 2 | −0.924041418 | 0.259 | Plastic | 1.535 | 56.27 | 0.926 |
| 6 | | −0.354752433 | 0.050 | | | | |
| 7 | Lens 3 | −0.245490266 | 0.170 | Plastic | 1.642 | 22.46 | −1.494 |
| 8 | | −0.418477027 | 0.025 | | | | |
| 9 | Lens 4 | 0.505054153 | 0.170 | Plastic | 1.642 | 22.46 | −7.036 |
| 10 | | 0.39450852 | 0.165 | | | | |
| 11 | Infrared Filter | 1E+18 | 0.210 | BK7_SCHOTT | 1.517 | 64.13 | |
| 12 | | 1E+18 | 0.310 | | | | |
| 13 | Image Plane | 1E+18 | 0.000 | | | | |

Reference wavelength = 555 nm; shield position: the $4^{th}$ surface with clear aperture of 0.345 mm and the $8^{th}$ surface with clear aperture of 0.468 mm

TABLE 6

The Aspheric Coefficients of the Third Embodiment
Table 6: Aspheric Coefficients

| | Surface No. | | | | | |
|---|---|---|---|---|---|---|
| | 2 | 3 | 5 | 6 | 7 | 8 |
| k= | −1.085921E+01 | −2.548739E−01 | −2.575272E+01 | −1.792746E+00 | −3.171500E+00 | −7.701317E−01 |
| $A_4$= | 5.599856E+00 | −7.247753E−01 | −6.021683E+00 | 3.558782E+00 | 6.155732E+00 | 5.661774E+00 |
| $A_6$= | −6.372193E+01 | 7.511250E+00 | 3.594659E+01 | 2.173699E+00 | −1.169016E+02 | −7.024593E+01 |
| $A_8$= | 8.804139E+02 | −2.827608E+02 | −4.507293E+02 | −2.187654E+03 | −5.718201E+02 | 1.149627E+02 |
| $A_{10}$= | −1.027121E+04 | 2.944985E+03 | 4.614342E+03 | 4.314900E+04 | 3.154356E+04 | 4.615139E+03 |
| $A_{12}$= | 8.147728E+04 | −1.379222E+04 | −3.469052E+04 | −3.669063E+05 | −3.159463E+05 | −3.836392E+04 |
| $A_{14}$= | −3.756482E+05 | −3.982158E+04 | 1.008579E+05 | 1.448955E+06 | 1.326918E+06 | 1.210188E+05 |
| $A_{16}$= | 7.102846E+05 | 3.582618E+05 | −2.484966E+04 | −2.190597E+06 | −2.116712E+06 | −1.376613E+05 |
| $A_{18}$= | 0.000000E+00 | 0.000000E+00 | 0.000000E+00 | 0.000000E+00 | 0.000000E+00 | 0.000000E+00 |
| $A_{20}$= | 0.000000E+00 | 0.000000E+00 | 0.000000E+00 | 0.000000E+00 | 0.000000E+00 | 0.000000E+00 |

| | Surface No. | |
|---|---|---|
| | 9 | 10 |
| k= | −1.615665E+01 | −4.031948E+00 |
| $A_4$= | 9.405843E−02 | −5.707877E+00 |
| $A_6$= | −1.207976E+02 | 2.241881E+01 |
| $A_8$= | 1.314207E+03 | −4.354937E+01 |
| $A_{10}$= | −6.850492E+03 | −5.439969E+00 |
| $A_{12}$= | 1.948933E+04 | 1.811404E+02 |
| $A_{14}$= | −2.938333E+04 | −3.140455E+02 |
| $A_{16}$= | 1.884324E+04 | 1.797143E+02 |
| $A_{18}$= | 0.000000E+00 | 0.000000E+00 |
| $A_{20}$= | 0.000000E+00 | 0.000000E+00 |

In the third embodiment, the form of the aspheric surface equation therein is presented as that in the first embodiment. In addition, the definition of parameters in the following tables is equivalent to that in the first embodiment, so that the repetitive details are not stated here.

The following values for the conditional expressions may be obtained from the data in Table 5 and Table 6.

| Third Embodiment (Primary reference wavelength = 555 nm) | | | | | |
|---|---|---|---|---|---|
| InRS41 | InRS42 | HVT41 | HVT42 | ODT % | TDT % |
| −0.12257 | −0.10718 | 0.23579 | 0.34872 | 2.03559 | 0.64224 |
| \|f/f1\| | \|f/f2\| | \|f/f3\| | \|f/f4\| | \|f1/f2\| | \|f2/f3\| |
| 0.98665 | 1.42582 | 0.88395 | 0.18770 | 1.44511 | 0.61996 |
| ΣPPR | ΣNPR | ΣPPR/\|ΣNPR\| | ΣPP | ΣNP | f1/ΣPP |
| 2.30976 | 1.17435 | 1.96684 | −0.56784 | −5.69771 | −1.63130 |
| f4/ΣNP | IN12/f | IN23/f | IN34/f | TP3/f | TP4/f |
| −0.23494 | 0.12522 | 0.03755 | 0.01893 | 0.12871 | 0.12871 |
| InTL | HOS | HOS/HOI | InS/HOS | InTL/HOS | ΣTP/InTL |
| 1.09541 | 1.78051 | 1.73201 | 0.94839 | 0.61522 | 0.78093 |
| (TP1 + IN12)/TP2 | (TP4 + IN34)/TP3 | TP1/TP2 | TP3/TP4 | IN23/(TP2 + IN23 + TP3) | |
| 1.62544 | 1.14706 | 0.98766 | 1.00000 | 0.10354 | |
| \|InRS41\|/TP4 | \|InRS42\|/TP4 | HVT42/HOI | HVT42/HOS | | |
| 0.7210 | 0.6305 | 0.3392 | 0.1959 | | |
| f1/f2 | TP2/TP3 | IN12 | IN23 | IN34 | |
| 1.942 | 1.538 | 0.165 | 0.050 | 0.025 | |

-continued

| Third Embodiment (Primary reference wavelength = 555 nm) | | | | | |
|---|---|---|---|---|---|
| InTL234 | InTL234/f | HEP | HEP/IN12 | | |
| 0.696 | 0.527 | 0.6608 | 4.009 | | |
| PSTA | PLTA | NSTA | NLTA | SSTA | SLTA |
| −0.013 mm | 0.001 mm | 0.007 mm | 0.001 mm | −0.004 mm | 0.005 mm |
| VSFS0 | VSFS3 | VSFS7 | VTFS0 | VTFS3 | VTFS7 |
| 0.003 | 0.003 | −0.005 | 0.003 | 0.005 | 0.005 |
| VSMTF0 | VSMTF3 | VSMTF7 | VTMTF0 | VTMTF3 | VTMTF7 |
| 0.631 | 0.592 | 0.558 | 0.631 | 0.529 | 0.437 |
| ISFS0 | ISFS3 | ISFS7 | ITFS0 | ITFS3 | ITFS7 |
| 0.015 | 0.015 | 0.008 | 0.015 | 0.018 | 0.018 |
| ISMTF0 | ISMTF3 | ISMTF7 | ITMTF0 | ITMTF3 | ITMTF7 |
| 0.527 | 0.499 | 0.459 | 0.527 | 0.442 | 0.242 |
| FS | AIFS | AVFS | AFS | | |
| 0.013 | 0.015 | 0.002 | 0.013 | | |

The following values for the conditional expressions may be obtained from the data in Table 5 and Table 6.

| Values Related to Inflection Point of Third Embodiment (Primary Reference Wavelength = 555 nm) | | | | | | | |
|---|---|---|---|---|---|---|---|
| HIF121 | 0.16004 | HIF121/HOI | 0.15568 | SGI121 | 0.00273 | \|SGI121\|/(\|SGI121\| + TP1) | 0.01056 |
| HIF321 | 0.34950 | HIF321/HOI | 0.33998 | SGI321 | −0.12992 | \|SGI321\|/(\|SGI321\| + TP3) | 0.43319 |
| HIF411 | 0.12964 | HIF411/HOI | 0.12611 | SGI411 | 0.01334 | \|SGI411\|/(\|SGI411\| + TP4) | 0.07274 |
| HIF412 | 0.51520 | HIF412/HOI | 0.50116 | SGI412 | −0.09913 | \|SGI412\|/(\|SGI412\| + TP4) | 0.36833 |
| HIF421 | 0.16133 | HIF421/HOI | 0.15694 | SGI421 | 0.02613 | \|SGI421\|/(\|SGI421\| + TP4) | 0.13321 |

The values pertaining to the outline curve lengths may be obtained from the data in Table 5 and Table 6:

| Third Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.330 | 0.347 | 0.01648 | 104.99% | 0.256 | 135.29% |
| 12 | 0.330 | 0.331 | 0.00056 | 100.17% | 0.256 | 129.07% |
| 21 | 0.330 | 0.352 | 0.02171 | 106.58% | 0.259 | 135.64% |
| 22 | 0.330 | 0.359 | 0.02937 | 108.90% | 0.259 | 138.59% |
| 31 | 0.330 | 0.364 | 0.03371 | 110.22% | 0.170 | 213.96% |
| 32 | 0.330 | 0.355 | 0.02543 | 107.71% | 0.170 | 209.09% |
| 41 | 0.330 | 0.333 | 0.00303 | 100.92% | 0.170 | 195.91% |
| 42 | 0.330 | 0.335 | 0.00536 | 101.62% | 0.170 | 197.28% |
| ARS | EHD | ARS value | ARS − EHD | (ARS/EHD) % | TP | ARS/TP (%) |
| 11 | 0.330 | 0.347 | 0.016 | 104.99% | 0.256 | 135.29% |
| 12 | 0.346 | 0.346 | 0.000 | 100.11% | 0.256 | 135.17% |
| 21 | 0.345 | 0.373 | 0.028 | 108.05% | 0.259 | 143.91% |
| 22 | 0.403 | 0.468 | 0.065 | 116.02% | 0.259 | 180.52% |
| 31 | 0.392 | 0.453 | 0.061 | 115.44% | 0.170 | 266.39% |
| 32 | 0.468 | 0.516 | 0.048 | 110.30% | 0.170 | 303.65% |
| 41 | 0.544 | 0.586 | 0.042 | 107.78% | 0.170 | 344.61% |
| 42 | 0.684 | 0.740 | 0.056 | 108.23% | 0.170 | 435.40% |

Fourth Embodiment

Figure 4A:
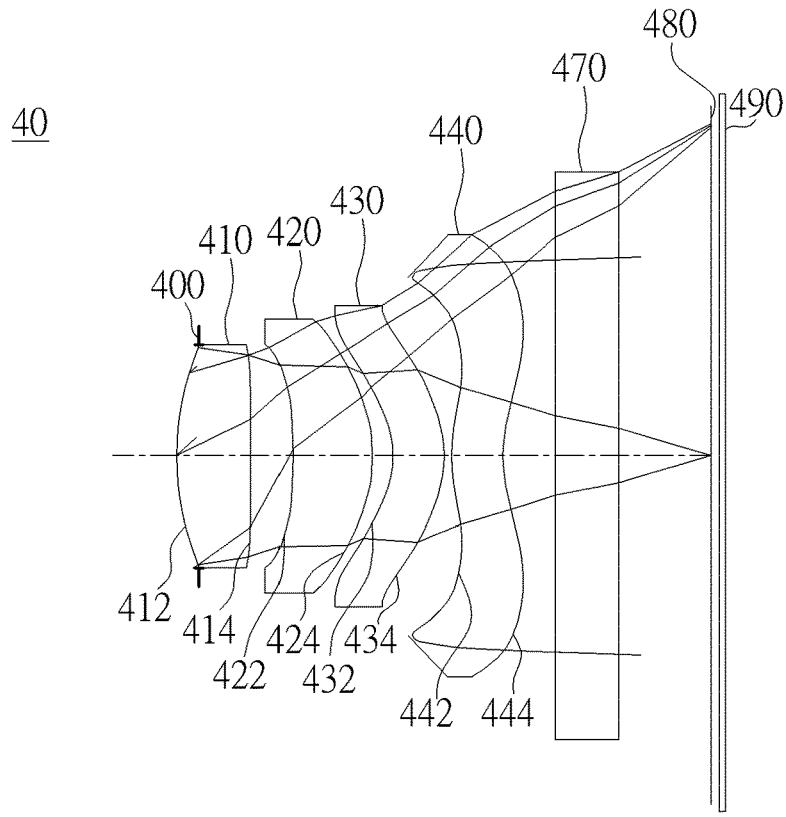
FIG. 4A is a schematic view of the optical image capturing system according to a fourth embodiment of the present disclosure.
Figure 4B:
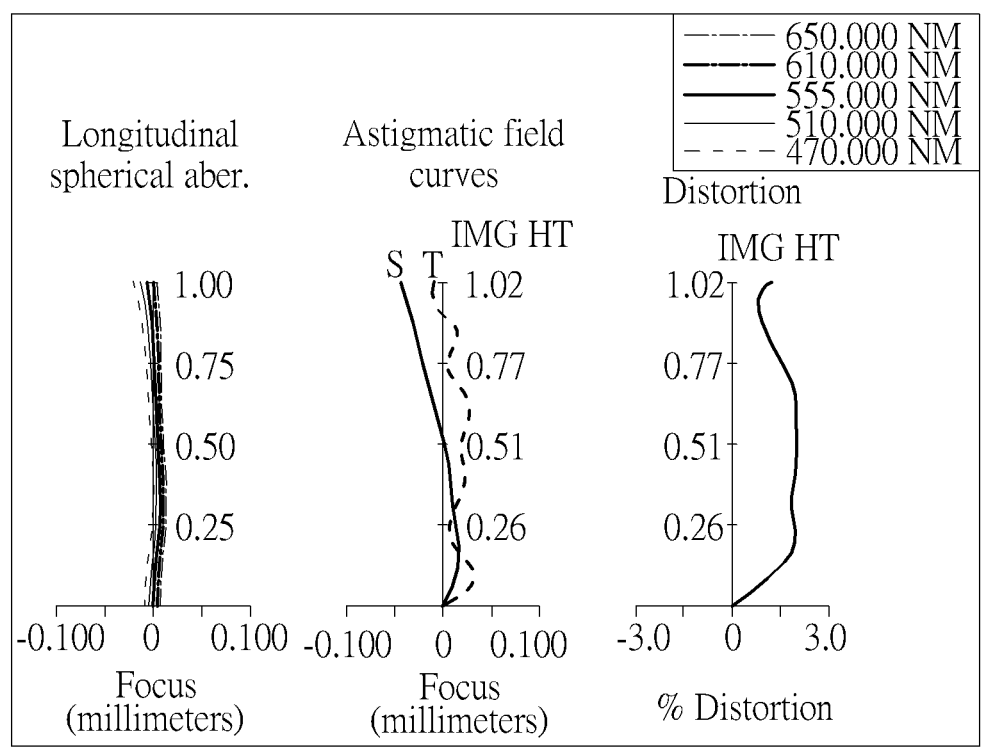
FIG. 4B is a curve diagram illustrating the spherical aberration, astigmatism and optical distortion of the optical image capturing system in sequence from left to right according to the fourth embodiment of the present disclosure.
Figure 4C:
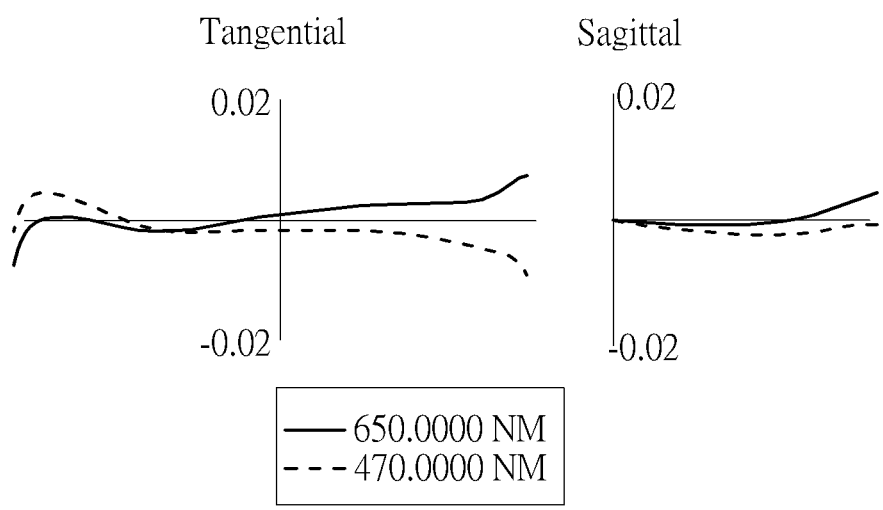
FIG. 4C is a transverse aberration diagram of the longest operation wavelength and the shortest operation wavelength for the tangential fan and the sagittal fan, of which the longest operation wavelength and the shortest operation wavelength pass through the edge of aperture at the position of 0.7 field of view on the image plane, according to the fourth embodiment of the present disclosure.
Figure 4D:
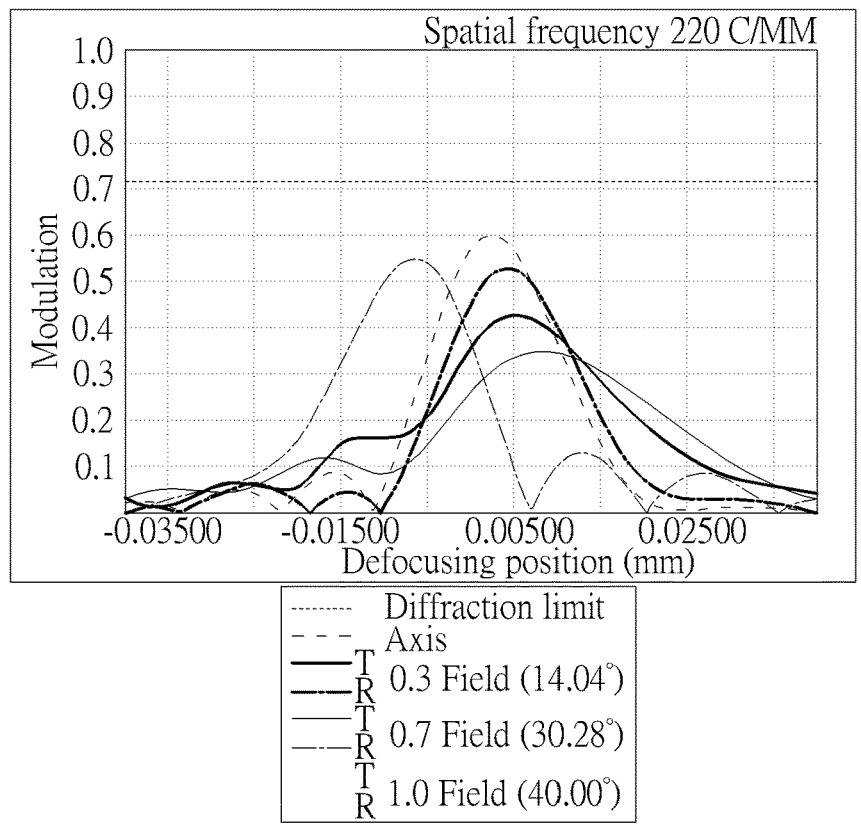
FIG. 4D is a diagram illustrating the through-focus MTF values for the visible light spectrum at the central field of view, 0.3 field of view and 0.7 field of view of the fourth embodiment of the present disclosure.
Figure 4E:
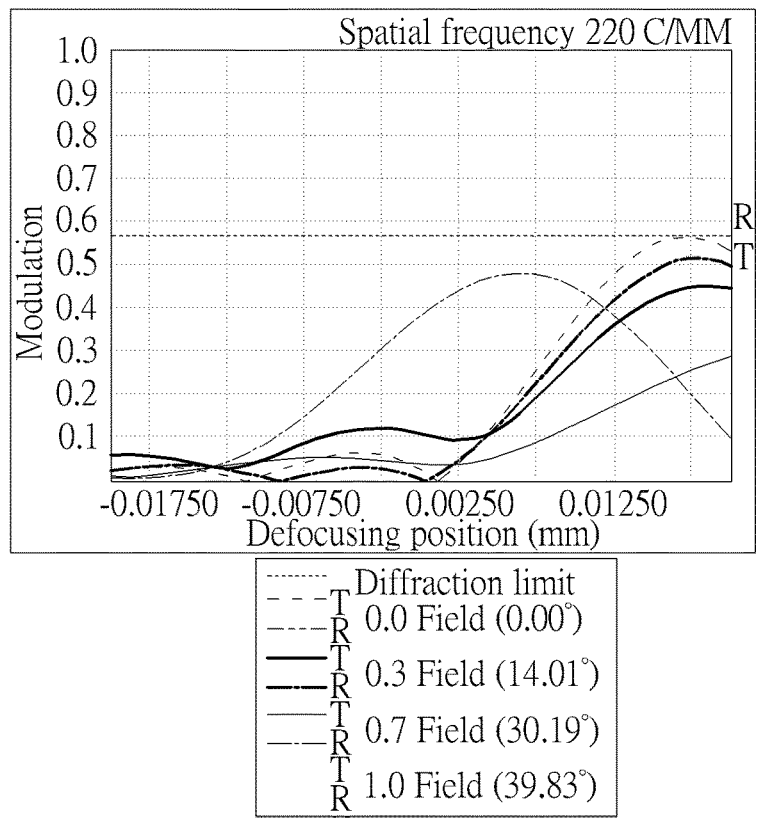
FIG. 4E is a diagram illustrating the through-focus MTF values for the infrared light spectrum at the central field of view, 0.3 field of view and 0.7 field of view of the fourth embodiment of the present disclosure.

Please refer to FIGS. 4A and 4B, wherein FIG. 4A is a schematic view of the optical image capturing system according to the fourth embodiment of the present disclosure. FIG. 4B is a curve diagram illustrating the spherical aberration, astigmatism and optical distortion of the optical image capturing system in sequence from left to right according to the fourth embodiment of the present disclosure. FIG. 4C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane according to the fourth embodiment of the present disclosure. FIG. 4D is a diagram illustrating the through-focus MTF values for the visible light spectrum at the central field of view, 0.3 field of view and 0.7 field of view of the fourth embodiment of the present disclosure. FIG. 4E is a diagram illustrating the through-focus MTF values for the infrared light spectrum at the central field of view, 0.3 field of view and 0.7 field of view of the fourth embodiment of the present disclosure. As shown in FIG. 4A, in the order from an object side to an image side, the optical image capturing system includes an aperture 400, a first lens 410, a second lens 420, a third lens 430, a fourth lens 440, an infrared filter 470, an image plane 480 and an image sensing device 490.

The first lens 410 has positive refractive power and is made of plastic material. The first lens 410 has a convex object-side surface 412 and a convex image-side surface 414, wherein both of them are aspheric. The object-side surface 412 has one inflection point.

The second lens 420 has positive refractive power and is made of plastic material. The second lens 420 has a concave object-side surface 422 and a convex image-side surface 424, wherein both of them are aspheric.

The third lens 430 has negative refractive power and is made of plastic material. The third lens 430 has a concave object-side surface 432 and a convex image-side surface 434, wherein both of them are aspheric. The object-side surface 432 and image-side surface 434 respectively have one inflection points.

The fourth lens 440 has negative refractive power and is made of plastic material. The fourth lens 440 has a convex object-side surface 442 and a concave image-side surface 444, wherein both of them are aspheric. The object-side surface 442 has two inflection points and the image-side surface 444 has one inflection point.

The infrared filter 470 is made of glass material and is configured between the fourth lens 440 and the image plane 480. The infrared filter 470 does not affect the focal length of the optical image capturing system.

Table 7 and Table 8 below should be incorporated into the reference of the present embodiment.

TABLE 7

Lens Parameters for the fourth Embodiment
f(focal length) = 1.2105 mm; f/HEP = 1.8; HAF (half angle of view) = 39.9959 deg.

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Aperture | 1E+18 | −0.067 | | | | |
| 2 | Lens 1 | 0.784336281 | 0.247 | Plastic | 1.535 | 56.27 | 1.460 |
| 3 | | −393.9262737 | 0.025 | | | | |
| 4 | | 1E+18 | 0.117 | | | | |
| 5 | Lens 2 | −1.101407874 | 0.263 | Plastic | 1.535 | 56.27 | 1.033 |
| 6 | | −0.399426327 | 0.068 | | | | |
| 7 | Lens 3 | −0.23133124 | 0.170 | Plastic | 1.642 | 22.46 | −2.537 |
| 8 | | −0.347009161 | 0.025 | | | | |
| 9 | Lens 4 | 0.498327622 | 0.170 | Plastic | 1.642 | 22.46 | −7.086 |
| 10 | | 0.389238689 | 0.175 | | | | |
| 11 | Infrared Filter | 1E+18 | 0.210 | BK7_SCHOTT | 1.517 | 64.13 | |
| 12 | | 1E+18 | 0.310 | | | | |
| 13 | Image Plane | 1E+18 | 0.000 | | | | |

Reference wavelength = 555 nm; shield position: the $4^{th}$ surface with clear aperture of 0.345 mm and the $8^{th}$ surface with clear aperture of 0.468 mm

TABLE 8

The Aspheric Coefficients of the Fourth Embodiment
Table 8: Aspheric Coefficients

| | Surface No. | | | | | |
|---|---|---|---|---|---|---|
| | 2 | 3 | 5 | 6 | 7 | 8 |
| k= | −1.020827E+00 | −3.038257E−06 | −1.703173E+01 | −1.800217E+00 | −2.803791E+00 | −8.721218E−01 |
| $A_4$= | 5.627056E−02 | −5.697717E−01 | −2.752503E+00 | 3.705009E+00 | 7.040642E+00 | 8.194044E+00 |
| $A_6$= | 5.057071E+00 | 8.511500E+00 | 1.335006E+01 | −4.848739E+01 | −2.032034E+02 | −1.293267E+02 |
| $A_8$= | −2.014915E+02 | −2.838089E+02 | −3.158938E+02 | 4.481381E+00 | 2.379889E+03 | 1.294220E+03 |
| $A_{10}$= | 3.840518E+03 | 3.991369E+03 | 5.422582E+03 | 4.724044E+03 | −1.550812E+04 | −8.096744E+03 |
| $A_{12}$= | −4.289195E+04 | −3.514359E+04 | −6.955130E+04 | −4.455505E+04 | 6.358438E+04 | 3.313582E+04 |
| $A_{14}$= | 2.546353E+05 | 1.673683E+05 | 4.700972E+05 | 1.748318E+05 | −1.500607E+05 | −7.948195E+04 |

TABLE 8-continued

The Aspheric Coefficients of the Fourth Embodiment
Table 8: Aspheric Coefficients

| $A_{16}=$ | −6.403435E+05 | −3.920760E+05 | −1.429321E+06 | −2.666417E+05 | 1.502723E+05 | 8.738322E+04 |
|---|---|---|---|---|---|---|
| $A_{18}=$ | 0.000000E+00 | 0.000000E+00 | 0.000000E+00 | 0.000000E+00 | 0.000000E+00 | 0.000000E+00 |
| $A_{20}=$ | 0.000000E+00 | 0.000000E+00 | 0.000000E+00 | 0.000000E+00 | 0.000000E+00 | 0.000000E+00 |

| | Surface No. | |
|---|---|---|
| | 9 | 10 |
| k= | −1.327939E+01 | −2.656881E+00 |
| $A_4=$ | 2.247202E+00 | −7.433225E+00 |
| $A_6=$ | −1.576761E+02 | 4.487536E+01 |
| $A_8=$ | 2.092105E+03 | −1.766633E+02 |
| $A_{10}=$ | −1.495706E+04 | 4.017896E+02 |
| $A_{12}=$ | 6.122017E+04 | −4.614220E+02 |
| $A_{14}=$ | −1.350593E+05 | 1.239455E+02 |
| $A_{16}=$ | 1.237298E+05 | 1.227822E+02 |
| $A_{18}=$ | 0.000000E+00 | 0.000000E+00 |
| $A_{20}=$ | 0.000000E+00 | 0.000000E+00 |

In the fourth embodiment, the form of the aspheric surface equation therein is presented as that in the first embodiment. In addition, the definition of parameters in the following tables is equivalent to that in the first embodiment, so that the repetitive details are not stated here.

The following values for the conditional expressions may be obtained from the data in Table 7 and Table 8.

| Fourth Embodiment (Primary reference wavelength = 555 nm) | | | | | |
|---|---|---|---|---|---|
| InRS41 | InRS42 | HVT41 | HVT42 | ODT % | TDT % |
| −0.11204 | −0.10139 | 0.27835 | 0.39657 | 2.02448 | 1.24944 |
| \|f/f1\| | \|f/f2\| | \|f/f3\| | \|f/f4\| | \|f1/f2\| | \|f2/f3\| |
| 0.82922 | 1.17155 | 0.47713 | 0.17083 | 1.41283 | 0.40727 |
| ΣPPR | ΣNPR | ΣPPR/\|ΣNPR\| | ΣPP | ΣNP | f1/ΣPP |
| 1.64868 | 1.00005 | 1.64860 | −1.50378 | −5.62614 | −0.68710 |
| f4/ΣNP | IN12/f | IN23/f | IN34/f | TP3/f | TP4/f |
| −0.25947 | 0.11744 | 0.05644 | 0.02065 | 0.14044 | 0.14044 |
| InTL | HOS | HOS/HOI | InS/HOS | InTL/HOS | ΣTP/InTL |
| 1.08524 | 1.78029 | 1.73180 | 0.95985 | 0.60959 | 0.78301 |
| (TP1 + IN12)/TP2 | (TP4 + IN34)/TP3 | TP1/TP2 | TP3/TP4 | IN23/(TP2 + IN23 + TP3) | |
| 1.47709 | 1.14706 | 0.93692 | 1.00000 | 0.13623 | |
| \|InRS41\|/TP4 | \|InRS42\|/TP4 | HVT42/HOI | HVT42/HOS | | |
| 0.6590 | 0.5964 | 0.3858 | 0.2228 | | |
| f1/f2 | TP2/TP3 | IN12 | IN23 | IN34 | |
| 1.413 | 1.548 | 0.142 | 0.068 | 0.025 | |
| InTL234 | InTL234/f | HEP | HEP/IN12 | | |
| 0.696 | 0.575 | 0.6725 | 4.731 | | |
| PSTA | PLTA | NSTA | NLTA | SSTA | SLTA |
| −0.009 mm | 0.007 mm | −0.002 mm | −0.007 mm | −0.001 mm | 0.005 mm |

-continued

| Fourth Embodiment (Primary reference wavelength = 555 nm) | | | | | |
|---|---|---|---|---|---|
| VSFS0 | VSFS3 | VSFS7 | VTFS0 | VTFS3 | VTFS7 |
| 0.003 | 0.005 | −0.008 | 0.003 | 0.005 | 0.008 |
| VSMTF0 | VSMTF3 | VSMTF7 | VTMTF0 | VTMTF3 | VTMTF7 |
| 0.597 | 0.524 | 0.542 | 0.597 | 0.426 | 0.347 |
| ISFS0 | ISFS3 | ISFS7 | ITFS0 | ITFS3 | ITFS7 |
| 0.018 | 0.018 | 0.008 | 0.018 | 0.018 | 0.018 |
| ISMTF0 | ISMTF3 | ISMTF7 | ITMTF0 | ITMTF3 | ITMTF7 |
| 0.565 | 0.517 | 0.480 | 0.565 | 0.450 | 0.258 |
| FS | AIFS | AVFS | AFS | | |
| 0.015 | 0.016 | 0.003 | 0.013 | | |

The following values for the conditional expressions may be obtained from the data in Table 7 and Table 8.

| Values Related to Inflection Point of fourth Embodiment (Primary Reference Wavelength = 555 nm) | | | | | | | |
|---|---|---|---|---|---|---|---|
| HIF111 | 0.32753 | HIF111/HOI | 0.31861 | SGI111 | 0.06812 | \|SGI111\|/(\|SGI111\| + TP1) | 0.21647 |
| HIF311 | 0.29908 | HIF311/HOI | 0.29093 | SGI311 | −0.12797 | \|SGI311\|/(\|SGI311\| + TP3) | 0.42947 |
| HIF321 | 0.35265 | HIF321/HOI | 0.34304 | SGI321 | −0.14781 | \|SGI321\|/(\|SGI321\| + TP3) | 0.46510 |
| HIF411 | 0.14588 | HIF411/HOI | 0.14191 | SGI411 | 0.01742 | \|SGI411\|/(\|SGI411\| + TP4) | 0.09296 |
| HIF412 | 0.52643 | HIF412/HOI | 0.51209 | SGI412 | −0.09525 | \|SGI412\|/(\|SGI412\| + TP4) | 0.35910 |
| HIF421 | 0.17182 | HIF421/HOI | 0.16714 | SGI421 | 0.02983 | \|SGI421\|/(\|SGI421\| + TP4) | 0.14926 |

The values pertaining to the outline curve lengths may be obtained from the data in Table 7 and Table 8:

| Fourth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.336 | 0.346 | 0.00959 | 102.85% | 0.247 | 140.23% |
| 12 | 0.336 | 0.337 | 0.00053 | 100.16% | 0.247 | 136.55% |
| 21 | 0.336 | 0.351 | 0.01499 | 104.46% | 0.263 | 133.43% |
| 22 | 0.336 | 0.362 | 0.02541 | 107.56% | 0.263 | 137.39% |
| 31 | 0.336 | 0.374 | 0.03811 | 111.34% | 0.170 | 220.17% |
| 32 | 0.336 | 0.368 | 0.03229 | 109.60% | 0.170 | 216.74% |
| 41 | 0.336 | 0.339 | 0.00251 | 100.75% | 0.170 | 199.23% |
| 42 | 0.336 | 0.343 | 0.00662 | 101.97% | 0.170 | 201.65% |
| ARS | EHD | ARS value | ARS − EHD | (ARS/EHD) % | TP | ARS/TP (%) |
| 11 | 0.336 | 0.346 | 0.010 | 102.85% | 0.247 | 140.23% |
| 12 | 0.346 | 0.346 | 0.000 | 100.08% | 0.247 | 140.34% |
| 21 | 0.350 | 0.371 | 0.021 | 106.05% | 0.263 | 141.06% |
| 22 | 0.429 | 0.483 | 0.054 | 112.67% | 0.263 | 183.57% |
| 31 | 0.444 | 0.491 | 0.047 | 110.58% | 0.170 | 289.10% |
| 32 | 0.468 | 0.522 | 0.054 | 111.44% | 0.170 | 306.79% |
| 41 | 0.538 | 0.595 | 0.057 | 110.52% | 0.170 | 349.83% |
| 42 | 0.689 | 0.760 | 0.071 | 110.28% | 0.170 | 447.19% |

Fifth Embodiment

Figure 5A:
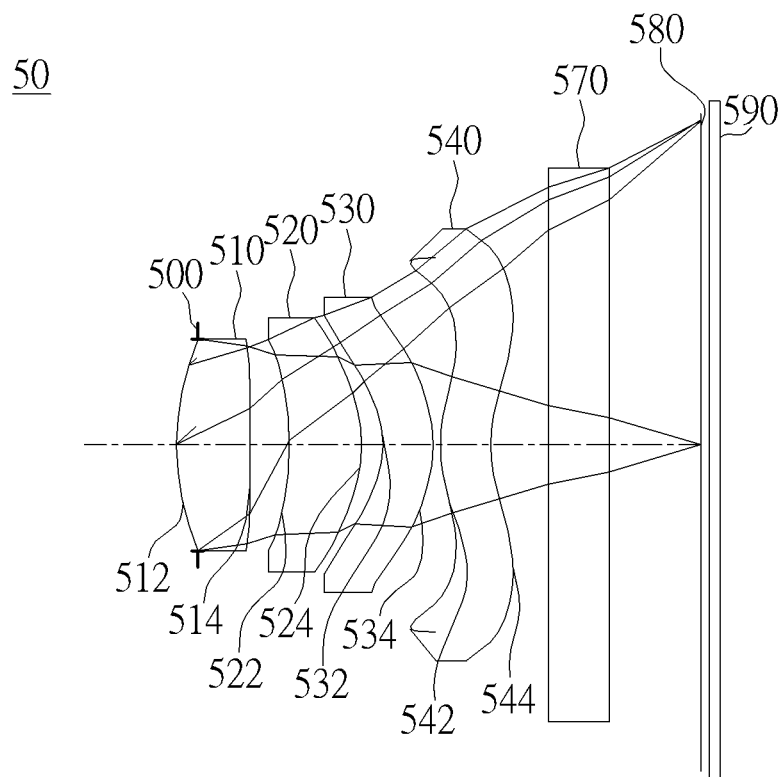
FIG. 5A is a schematic view of the optical image capturing system according to a fifth embodiment of the present disclosure.
Figure 5B:
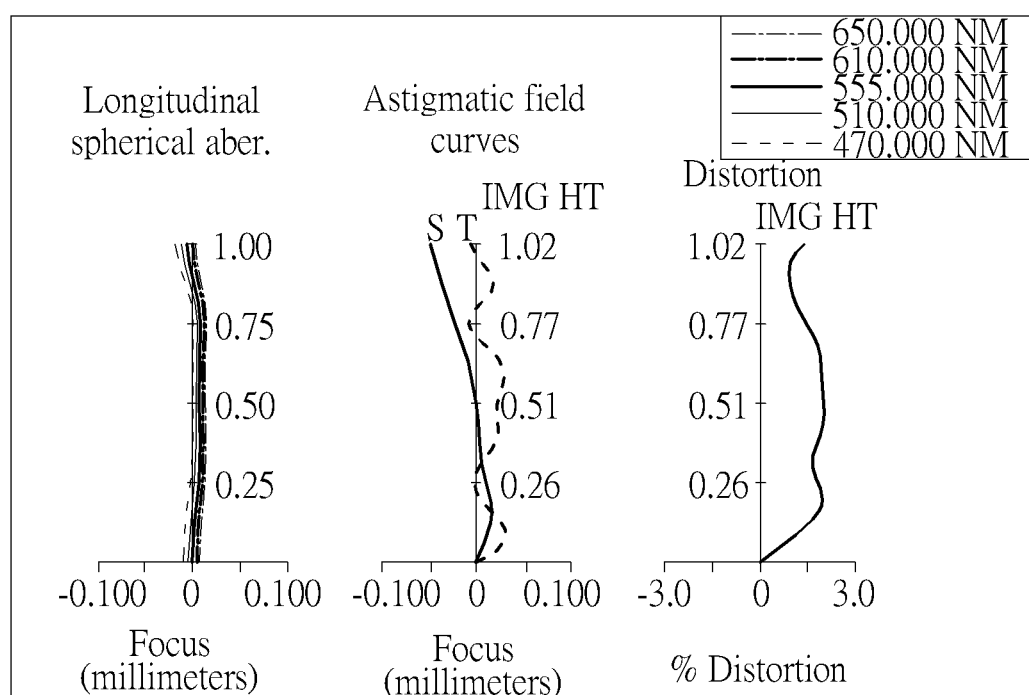
FIG. 5B is a curve diagram illustrating the spherical aberration, astigmatism and optical distortion of the optical image capturing system in the sequence from left to right according to the fifth embodiment of the present disclosure.
Figure 5C:
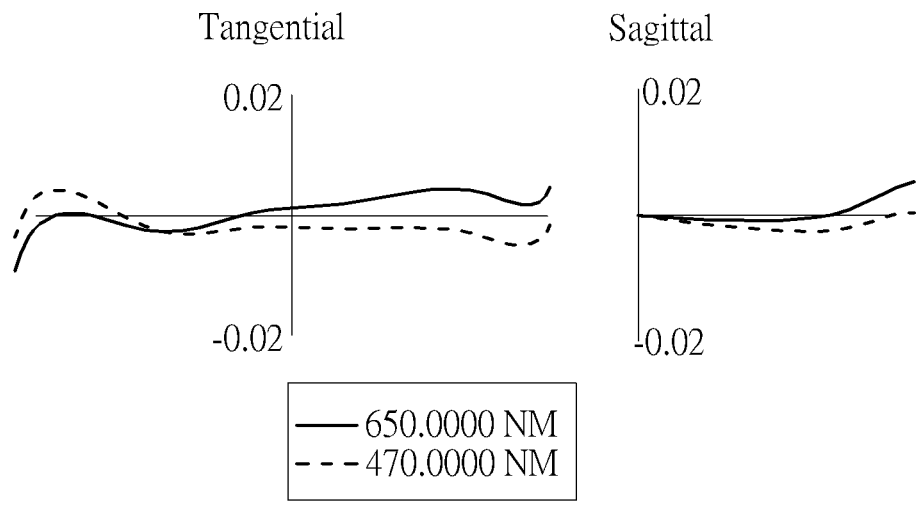
FIG. 5C is a transverse aberration diagram of the longest operation wavelength and the shortest operation wavelength for the tangential fan and the sagittal fan, of which the longest operation wavelength and the shortest operation wavelength pass through the edge of aperture at the position of 0.7 field of view on the image plane, according to the fifth embodiment of the present disclosure.
Figure 5D:
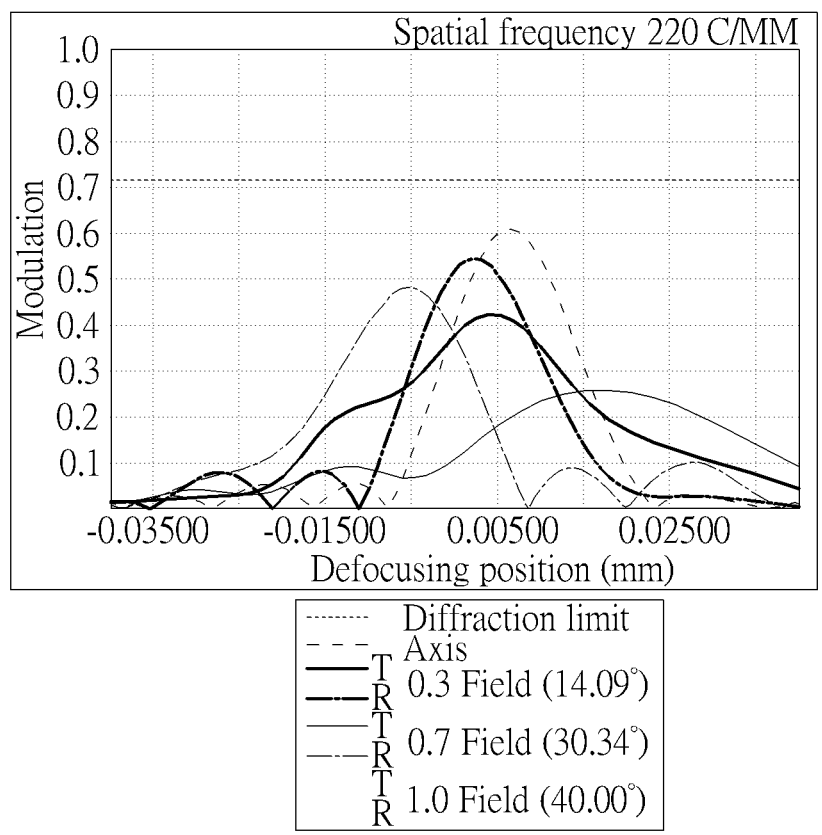
FIG. 5D is a diagram illustrating the through-focus MTF values for the visible light spectrum at the central field of view, 0.3 field of view and 0.7 field of view of the fifth embodiment of the present disclosure.
Figure 5E:
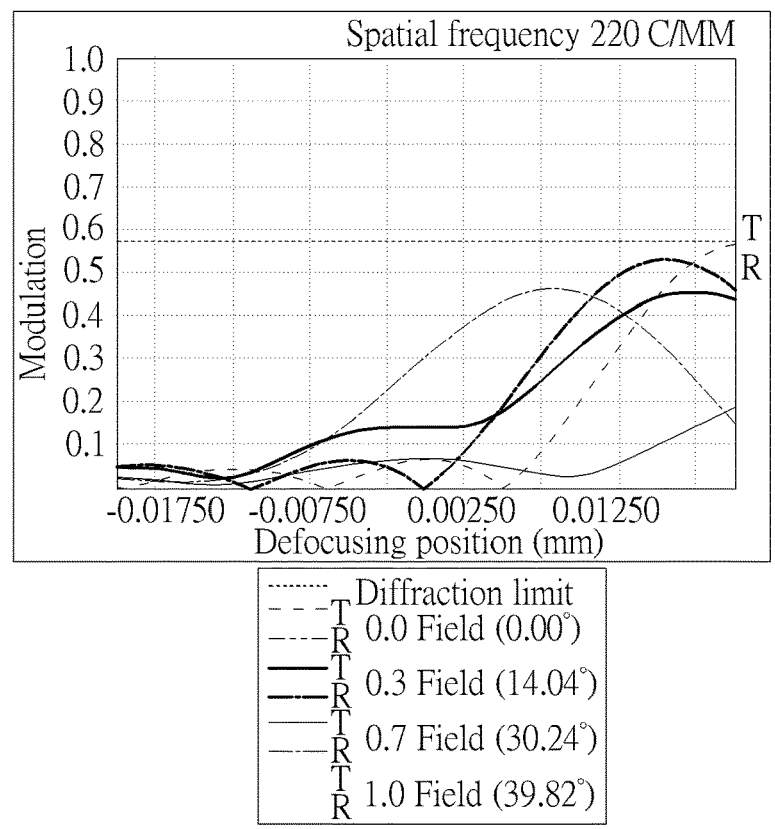
FIG. 5E is a diagram illustrating the through-focus MTF values for the infrared light spectrum at the central field of view, 0.3 field of view and 0.7 field of view of the fifth embodiment of the present disclosure.

Please refer to FIGS. 5A and 5B, wherein FIG. 5A is a schematic view of the optical image capturing system according to the fifth embodiment of the present disclosure. FIG. 5B is a curve diagram illustrating the spherical aberration, astigmatism and optical distortion of the optical image capturing system in sequence from left to right according to the fifth embodiment of the present disclosure. FIG. 5C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane according to the fifth embodiment of the present disclosure. FIG. 5D is a diagram illustrating the through-focus MTF values for the visible light spectrum at the central field of view, 0.3 field of view and 0.7 field of view of the fifth embodiment of the present disclosure. FIG. 5E is a diagram illustrating the through-focus MTF values for the infrared light spectrum at the central field of view, 0.3 field of view and 0.7 field of view of the fifth embodiment of the present disclosure. As shown in FIG. 5A, in the order from an object side to an image side, the optical image capturing system includes an aperture 500, a first lens 510, a second lens 520, a third lens 530, a fourth lens 540, an infrared filter 570, an image plane 580 and an image sensing device 590.

The first lens 510 has positive refractive power and is made of plastic material. The first lens 510 has a convex object-side surface 512 and a concave image-side surface 514, wherein both of them are aspheric. The object-side surface 512 and the image-side surface 514 both have one inflection point.

The second lens 520 has positive refractive power and is made of plastic material. The second lens 520 has a concave object-side surface 522 and a convex image-side surface 524, wherein both of them are aspheric. The image-side surface 524 has two inflection points.

The third lens 530 has negative refractive power and is made of plastic material. The third lens 530 has a concave object-side surface 532 and a convex image-side surface 534, wherein both of them are aspheric. The object-side surface 532 has three inflection points and the image-side surface 534 has one inflection point.

The fourth lens 540 has negative refractive power and is made of plastic material. The fourth lens 540 has a convex object-side surface 542 and a concave image-side surface 544, wherein both of them are aspheric. The object-side surface 542 has two inflection points and the image-side surface 544 has one inflection point.

The infrared filter 570 is made of glass material and is configured between the fourth lens 540 and the image plane 580. The infrared filter 570 does not affect the focal length of the optical image capturing system.

Table 9 and Table 10 below should be incorporated into the reference of the present embodiment.

TABLE 9

Lens Parameters for the Fifth Embodiment
f(focal length) = 1.209 mm; f/HEP = 1.8; HAF (half angle of view) = 39.997 deg.

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Aperture | 1E+18 | −0.067 | | | | |
| 2 | Lens 1 | 0.76460811 | 0.248 | Plastic | 1.535 | 56.27 | 1.457 |
| 3 | | 31.40050163 | 0.025 | | | | |
| 4 | | 1E+18 | 0.109 | | | | |
| 5 | Lens 2 | −1.078536244 | 0.246 | Plastic | 1.535 | 56.27 | 1.154 |
| 6 | | −0.424438702 | 0.074 | | | | |
| 7 | Lens 3 | −0.233114515 | 0.170 | Plastic | 1.642 | 22.46 | −2.338 |
| 8 | | −0.354515302 | 0.025 | | | | |
| 9 | Lens 4 | 0.498547641 | 0.170 | Plastic | 1.642 | 22.46 | −85.460 |
| 10 | | 0.427714363 | 0.193 | | | | |
| 11 | Infrared Filter | 1E+18 | 0.210 | BK_7 | 1.517 | 64.13 | |
| 12 | | 1E+18 | 0.310 | | | | |
| 13 | Image Plane | 1E+18 | 0.000 | | | | |

Reference wavelength = 555 nm; shield position: the $4^{th}$ surface with clear aperture of 0.345 mm and the $8^{th}$ surface with clear aperture of 0.468 mm

TABLE 10

The Aspheric Coefficients of the Fifth Embodiment
Table 10: Aspheric Coefficients

| | Surface No. | | | | | |
|---|---|---|---|---|---|---|
| | 2 | 3 | 5 | 6 | 7 | 8 |
| k= | −1.550487E+00 | −5.589746E+00 | −2.543466E+00 | −2.092590E+00 | −2.781709E+00 | −8.719395E−01 |
| $A_4$= | 1.289244E−01 | −7.337918E−01 | −1.918082E+00 | 3.321708E+00 | 1.066918E+01 | 1.607406E+01 |
| $A_6$= | 8.995393E+00 | 6.236999E+00 | 2.001528E+01 | −7.785986E+01 | −3.063659E+02 | −3.165855E+02 |
| $A_8$= | −3.159649E+02 | −2.342460E+02 | −7.079516E+02 | 9.434965E+02 | 3.817722E+03 | 3.597163E+03 |
| $A_{10}$= | 5.518384E+03 | 3.125346E+03 | 1.241027E+04 | −1.245753E+04 | −3.148856E+04 | −2.566930E+04 |
| $A_{12}$= | −5.659070E+04 | −2.446544E+04 | −1.174042E+05 | 1.3 50601E+05 | 1.970077E+05 | 1.149440E+05 |

TABLE 10-continued

The Aspheric Coefficients of the Fifth Embodiment
Table 10: Aspheric Coefficients

| | | | | | | |
|---|---|---|---|---|---|---|
| $A_{14}=$ | 3.105895E+05 | 1.020548E+05 | 6.145034E+05 | −7.259874E+05 | −7.749334E+05 | −2.911962E+05 |
| $A_{16}=$ | −7.243784E+05 | −2.311911E+05 | −1.558542E+06 | 1.407042E+06 | 1.298253E+06 | 3.183284E+05 |
| $A_{18}=$ | 0.000000E+00 | 0.000000E+00 | 0.000000E+00 | 0.000000E+00 | 0.000000E+00 | 0.000000E+00 |
| $A_{20}=$ | 0.000000E+00 | 0.000000E+00 | 0.000000E+00 | 0.000000E+00 | 0.000000E+00 | 0.000000E+00 |

| | Surface No. | |
|---|---|---|
| | 9 | 10 |
| k= | −2.942395E−01 | −2.198422E+00 |
| $A_4=$ | −1.243419E+00 | −4.141496E+00 |
| $A_6=$ | −1.208782E+02 | 1.845980E+00 |
| $A_8=$ | 1.363545E+03 | 7.898369E+01 |
| $A_{10}=$ | −8.277411E+03 | −4.608915E+02 |
| $A_{12}=$ | 2.941998E+04 | 1.232841E+03 |
| $A_{14}=$ | −5.782708E+04 | −1.677979E+03 |
| $A_{16}=$ | 4.778228E+04 | 9.261661E+02 |
| $A_{18}=$ | 0.000000E+00 | 0.000000E+00 |
| $A_{20}=$ | 0.000000E+00 | 0.000000E+00 |

In the fifth embodiment, the form of the aspheric surface equation therein is presented as that in the first embodiment. In addition, the definition of parameters in the following tables is equivalent to that in the first embodiment, so that the repetitive details are not stated here.

The following values for the conditional expressions may be obtained from the data in Table 9 and Table 10.

| Fifth Embodiment (Primary reference wavelength = 555 nm) | | | | | |
|---|---|---|---|---|---|
| InRS41 | InRS42 | HVT41 | HVT42 | ODT % | TDT % |
| −0.07977 | −0.08279 | 0.32110 | 0.40546 | 2.04421 | 1.01470 |
| \|f/f1\| | \|f/f2\| | \|f/f3\| | \|f/f4\| | \|f1/f2\| | \|f2/f3\| |
| 0.82943 | 1.04759 | 0.51691 | 0.01414 | 1.26302 | 0.49343 |
| ΣPPR | ΣNPR | ΣPPR/\|ΣNPR\| | ΣPP | ΣNP | f1/ΣPP |
| 1.56450 | 0.84357 | 1.85461 | −1.18437 | −84.00332 | −0.97406 |
| f4/ΣNP | IN12/f | IN23/f | IN34/f | TP3/f | TP4/f |
| −0.01735 | 0.11097 | 0.06105 | 0.02069 | 0.14066 | 0.14100 |
| InTL | HOS | HOS/HOI | InS/HOS | InTL/HOS | ΣTP/InTL |
| 1.06689 | 1.78023 | 1.73174 | 0.95920 | 0.59930 | 0.78170 |
| (TP1 + IN12)/TP2 | (TP4 + IN34)/TP3 | TP1/TP2 | TP3/TP4 | IN23/(TP2 + IN23 + TP3) | |
| 1.55560 | 1.14944 | 1.00956 | 0.99763 | 0.15076 | |
| \|InRS41\|/TP4 | \|InRS42\|/TP4 | HVT42/HOI | HVT42/HOS | | |
| 0.4681 | 0.4859 | 0.3944 | 0.2278 | | |
| f1/f2 | TP2/TP3 | IN12 | IN23 | IN34 | |
| 1.263 | 1.445 | 0.134 | 0.074 | 0.025 | |
| InTL234 | InTL234/f | HEP | HEP/IN12 | | |
| 0.685 | 0.567 | 0.6714 | 5.006 | | |
| PSTA | PLTA | NSTA | NLTA | SSTA | SLTA |
| −0.001 mm | 0.004 mm | −0.003 mm | −0.009 mm | −0.0003 mm | 0.005 mm |

-continued

| Fifth Embodiment (Primary reference wavelength = 555 nm) | | | | | |
|---|---|---|---|---|---|
| VSFS0 | VSFS3 | VSFS7 | VTFS0 | VTFS3 | VTFS7 |
| 0.008 | 0.003 | −0.005 | 0.008 | 0.005 | 0.018 |
| VSMTF0 | VSMTF3 | VSMTF7 | VTMTF0 | VTMTF3 | VTMTF7 |
| 0.602 | 0.545 | 0.481 | 0.602 | 0.422 | 0.257 |
| ISFS0 | ISFS3 | ISFS7 | ITFS0 | ITFS3 | ITFS7 |
| 0.020 | 0.015 | 0.008 | 0.018 | 0.018 | 0.018 |
| ISMTF0 | ISMTF3 | ISMTF7 | ITMTF0 | ITMTF3 | ITMTF7 |
| 0.568 | 0.531 | 0.462 | 0.532 | 0.458 | 0.146 |
| FS | AIFS | AVFS | AFS | | |
| 0.013 | 0.016 | 0.006 | 0.010 | | |

The following values for the conditional expressions may be obtained from the data in Table 9 and Table 10.

| Values Related to Inflection Point of fifth Embodiment (Primary Reference Wavelength = 555 nm) | | | | | | | |
|---|---|---|---|---|---|---|---|
| HIF111 | 0.32631 | HIF111/HOI | 0.31743 | SGI111 | 0.06896 | \|SGI111\|/(\|SGI111\| + TP1) | 0.21759 |
| HIF121 | 0.06209 | HIF121/HOI | 0.06039 | SGI121 | 0.00005 | \|SGI121\|/(\|SGI121\| + TP1) | 0.00021 |
| HIF221 | 0.31161 | HIF221/HOI | 0.30312 | SGI221 | −0.09959 | \|SGI221\|/(\|SGI221\| + TP2) | 0.28849 |
| HIF222 | 0.33310 | HIF222/HOI | 0.32402 | SGI222 | −0.11191 | \|SGI222\|/(\|SGI222\| + TP2) | 0.31302 |
| HIF311 | 0.30074 | HIF311/HOI | 0.29255 | SGI311 | −0.12892 | \|SGI311\|/(\|SGI311\| + TP3) | 0.43128 |
| HIF312 | 0.38025 | HIF312/HOI | 0.36989 | SGI312 | −0.18269 | \|SGI312\|/(\|SGI312\| + TP3) | 0.51799 |
| HIF313 | 0.39801 | HIF313/HOI | 0.38717 | SGI313 | −0.19383 | \|SGI313\|/(\|SGI313\| + TP3) | 0.53275 |
| HIF321 | 0.37321 | HIF321/HOI | 0.36305 | SGI321 | −0.15115 | \|SGI321\|/(\|SGI321\| + TP3) | 0.47065 |
| HIF411 | 0.17764 | HIF411/HOI | 0.17280 | SGI411 | 0.02847 | \|SGI411\|/(\|SGI411\| + TP4) | 0.14317 |
| HIF412 | 0.54456 | HIF412/HOI | 0.52972 | SGI412 | −0.07061 | \|SGI412\|/(\|SGI412\| + TP4) | 0.29297 |
| HIF421 | 0.19684 | HIF421/HOI | 0.19148 | SGI421 | 0.03677 | \|SGI421\|/(\|SGI421\| + TP4) | 0.17747 |

The values pertaining to the outline curve lengths are obtainable from the data in Table 9 and Table 10:

| Fifth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.336 | 0.345 | 0.00936 | 102.79% | 0.248 | 139.14% |
| 12 | 0.336 | 0.336 | 0.00006 | 100.02% | 0.248 | 135.39% |
| 21 | 0.336 | 0.347 | 0.01136 | 103.38% | 0.246 | 141.28% |
| 22 | 0.336 | 0.358 | 0.02246 | 106.69% | 0.246 | 145.80% |
| 31 | 0.336 | 0.374 | 0.03844 | 111.45% | 0.170 | 220.06% |
| 32 | 0.336 | 0.362 | 0.02653 | 107.90% | 0.170 | 213.05% |
| 41 | 0.336 | 0.340 | 0.00474 | 101.41% | 0.170 | 199.76% |
| 42 | 0.336 | 0.343 | 0.00760 | 102.26% | 0.170 | 201.44% |
| ARS | EHD | ARS value | ARS − EHD | (ARS/EHD) % | TP | ARS/TP (%) |
| 11 | 0.336 | 0.345 | 0.009 | 102.79% | 0.248 | 139.14% |
| 12 | 0.346 | 0.346 | 0.000 | 100.14% | 0.248 | 139.57% |
| 21 | 0.350 | 0.366 | 0.016 | 104.55% | 0.246 | 149.03% |
| 22 | 0.417 | 0.460 | 0.044 | 110.45% | 0.246 | 187.37% |
| 31 | 0.422 | 0.476 | 0.054 | 112.87% | 0.170 | 279.90% |
| 32 | 0.468 | 0.522 | 0.054 | 111.63% | 0.170 | 307.32% |
| 41 | 0.551 | 0.604 | 0.053 | 109.58% | 0.170 | 354.18% |
| 42 | 0.686 | 0.751 | 0.065 | 109.53% | 0.170 | 440.75% |

Sixth Embodiment

Figure 6A:
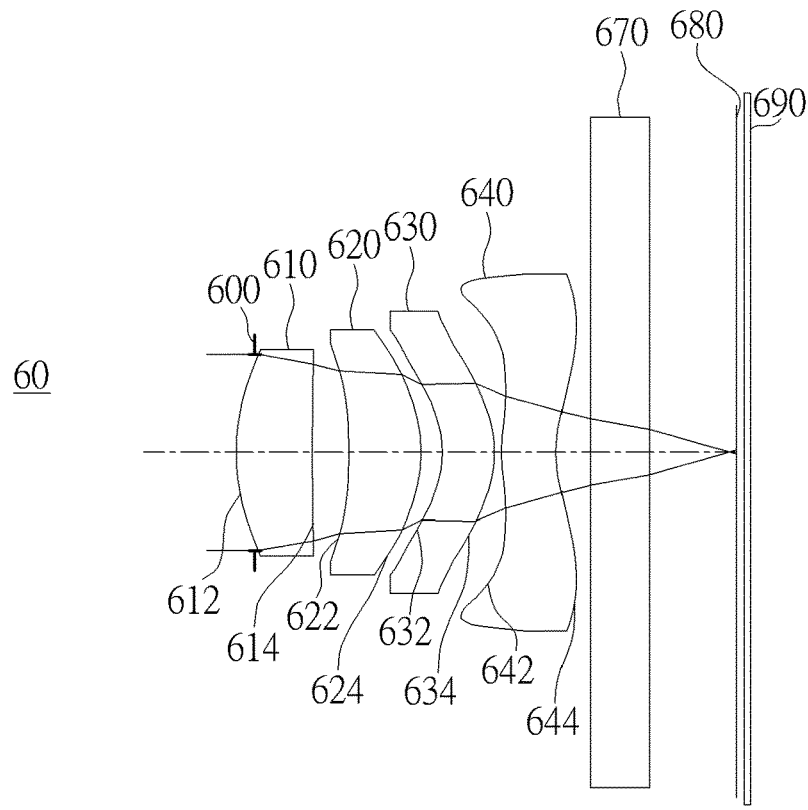
FIG. 6A is a schematic view of the optical image capturing system according to a sixth embodiment of the present disclosure.
Figure 6B:
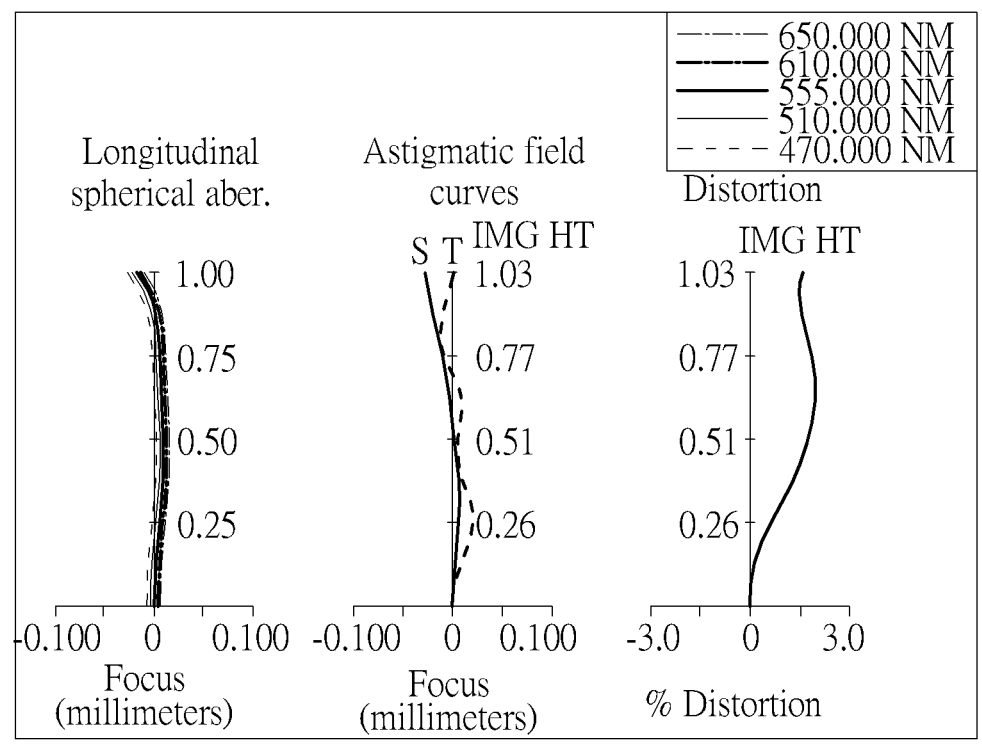
FIG. 6B is a curve diagram illustrating the spherical aberration, astigmatism and optical distortion of the optical image capturing system in the sequence from left to right according to the sixth embodiment of the present disclosure.
Figure 6C:
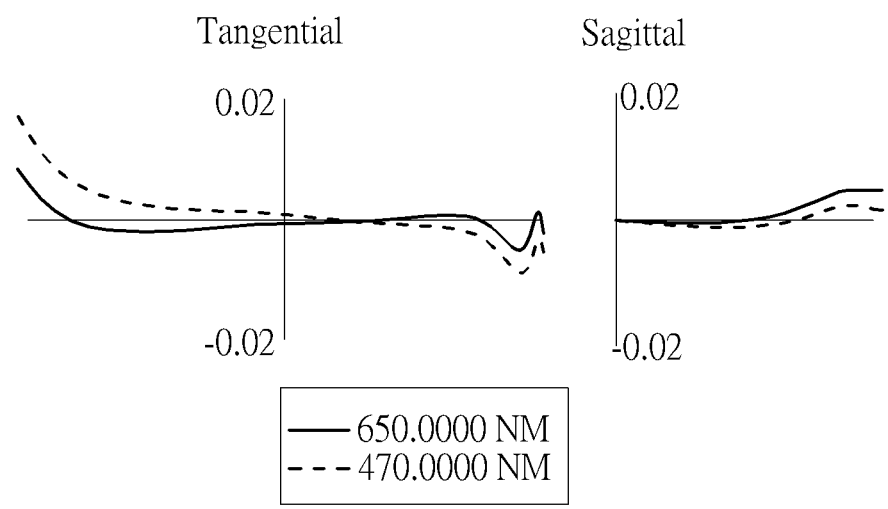
FIG. 6C is a transverse aberration diagram of the longest operation wavelength and the shortest operation wavelength for the tangential fan and the sagittal fan, of which the longest operation wavelength and the shortest operation wavelength pass through the edge of aperture at the position of 0.7 field of view on the image plane, according to the sixth embodiment of the present disclosure.
Figure 6D:
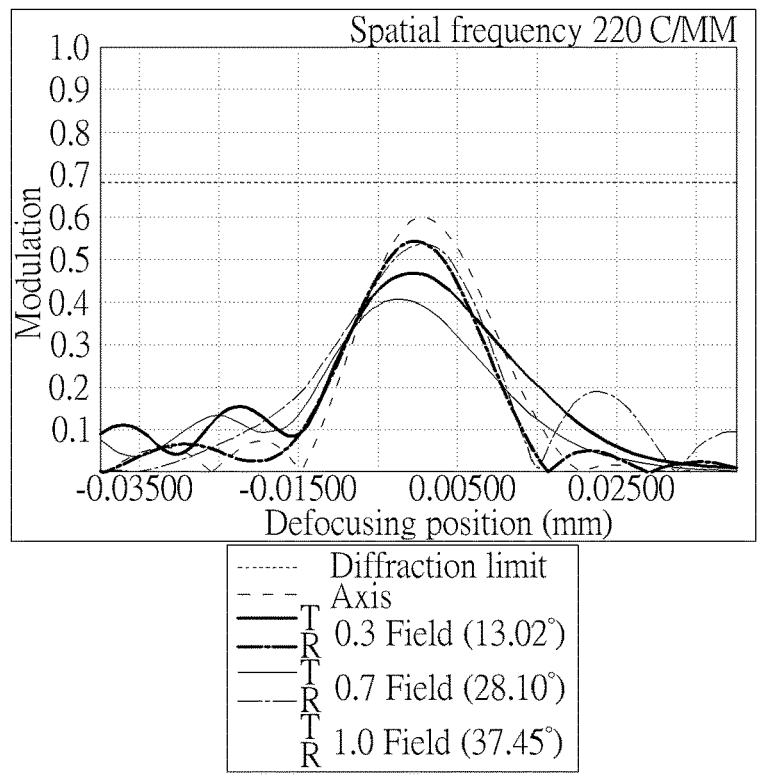
FIG. 6D is a diagram illustrating the through-focus MTF values for the visible light spectrum at the central field of view, 0.3 field of view and 0.7 field of view of the sixth embodiment of the present disclosure.
Figure 6E:
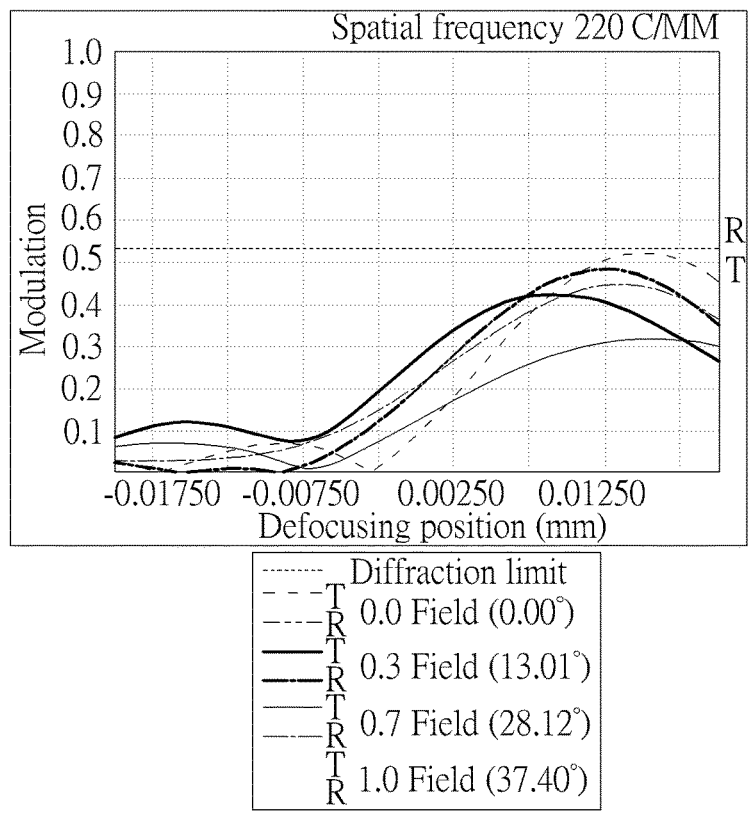
FIG. 6E is a diagram illustrating the through-focus MTF values for the infrared light spectrum at the central field of view, 0.3 field of view and 0.7 field of view of the sixth embodiment of the present disclosure.

Please refer to FIGS. 6A and 6B, wherein FIG. 6A is a schematic view of the optical image capturing system according to the sixth embodiment of the present disclosure. FIG. 6B is a curve diagram illustrating the spherical aberration, astigmatism and optical distortion of the optical image capturing system in sequence from left to right according to the sixth embodiment of the present disclosure. FIG. 6C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane according to the sixth embodiment of the present disclosure. FIG. 6D is a diagram illustrating the through-focus MTF values for the visible light spectrum at the central field of view, 0.3 field of view and 0.7 field of view of the sixth embodiment of the present disclosure. FIG. 6E is a diagram illustrating the through-focus MTF values for the infrared light spectrum at the central field of view, 0.3 field of view and 0.7 field of view of the sixth embodiment of the present disclosure. As shown in FIG. 6A, in the order from an object side to an image side, the optical image capturing system includes an aperture 600, a first lens 610, a second lens 620, a third lens 630, a fourth lens 640, an infrared filter 670, an image plane 680 and an image sensing device 690.

The first lens 610 has positive refractive power and is made of plastic material. The first lens 610 has a convex object-side surface 612 and a concave image-side surface 614, wherein both of them are aspheric. The image-side surface 612 has one inflection point.

The second lens 620 has positive refractive power and is made of plastic material. The second lens 620 has a concave object-side surface 622 and a convex image-side surface 624, wherein both of them are aspheric. The object-side surface 622 has one inflection point.

The third lens 630 has negative refractive power and is made of plastic material. The third lens 630 has a concave object-side surface 632 and a convex image-side surface 634, wherein both of them are aspheric. The object-side surface 632 has two inflection points and the image-side surface 634 has one inflection point.

The fourth lens 640 has negative refractive power and is made of plastic material. The fourth lens 640 has a convex object-side surface 642 and a concave image-side surface 644, wherein both of them are aspheric. The object-side surface 642 has two inflection points and the image-side surface 644 has one inflection point.

The infrared filter 670 is made of glass material and is configured between the fourth lens 640 and the image plane 680. The infrared filter 670 does not affect the focal length of the optical image capturing system.

Table 11 and Table 12 below should be incorporated into the reference of the present embodiment.

TABLE 11

Lens Parameters for the Sixth Embodiment
f(focal length) = 1.313 mm; f/HEP = 2.022; HAF (half angle of view) = 37.450 deg.

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Aperture | 1E+18 | −0.067 | | | | |
| 2 | Lens 1 | 0.765802158 | 0.248 | Plastic | 1.535 | 56.27 | 1.429 |
| 3 | | 22.27734496 | 0.025 | | | | |
| 4 | | 1E+18 | 0.116 | | | | |
| 5 | Lens 2 | −1.163048553 | 0.267 | Plastic | 1.535 | 56.27 | 1.248 |
| 6 | | −0.375351466 | 0.061 | | | | |
| 7 | Lens 3 | −0.214900519 | 0.170 | Plastic | 1.642 | 22.46 | −249.580 |
| 8 | | −0.342003703 | 0.025 | | | | |
| 9 | Lens 4 | 0.465361364 | 0.170 | Plastic | 1.642 | 22.46 | −1.562 |
| 10 | | 0.375404859 | 0.178 | | | | |
| 11 | Infrared Filter | 1E+18 | 0.210 | BK_7 | 1.517 | 64.13 | |
| 12 | | 1E+18 | 0.310 | | | | |
| 13 | | 1E+18 | 0.000 | | | | |
| 14 | Image Plane | 1E+18 | 0.000 | | | | |

Reference wavelength = 555 nm; shield position: the 4$^{th}$ surface with clear aperture of 0.345 mm and the 8$^{th}$ surface with clear aperture of 0.468 mm

TABLE 12

The Aspheric Coefficients of the Sixth Embodiment
Table 12: Aspheric Coefficients

| | Surface No. | | | | | |
|---|---|---|---|---|---|---|
| | 2 | 3 | 5 | 6 | 7 | 8 |
| k= | −5.607668E+00 | −9.188891E−11 | −6.955560E+00 | −2.192777E+00 | −2.736321E+00 | −9.669974E−01 |
| $A_4$= | 1.300009E+00 | −8.952387E−01 | −2.495812E+00 | 4.343440E+00 | 1.343179E+01 | 1.742073E+01 |
| $A_6$= | 2.088324E+00 | 1.589290E+01 | 2.123902E+01 | −4.159517E+01 | −2.900519E+02 | −2.983874E+02 |
| $A_8$= | −2.332779E+02 | −5.116229E+02 | −8.500585E+02 | −1.154837E+03 | 1.855323E+03 | 2.811013E+03 |
| $A_{10}$= | 4.480996E+03 | 7.503420E+03 | 1.485143E+04 | 2.288455E+04 | 3.608247E+03 | −1.617881E+04 |

TABLE 12-continued

The Aspheric Coefficients of the Sixth Embodiment
Table 12: Aspheric Coefficients

| | | | | | | |
|---|---|---|---|---|---|---|
| $A_{12}=$ | −4.793708E+04 | −6.408258E+04 | −1.450339E+05 | −1.612380E+05 | −9.536701E+04 | 5.851307E+04 |
| $A_{14}=$ | 2.713905E+05 | 2.889475E+05 | 7.739772E+05 | 5.202059E+05 | 4.212395E+05 | −1.226781E+05 |
| $A_{16}=$ | −6.544679E+05 | −5.880448E+05 | −1.887577E+06 | −6.604047E+05 | −6.274874E+05 | 1.155443E+05 |
| $A_{18}=$ | 0.000000E+00 | 0.000000E+00 | 0.000000E+00 | 0.000000E+00 | 0.000000E+00 | 0.000000E+00 |
| $A_{20}=$ | 0.000000E+00 | 0.000000E+00 | 0.000000E+00 | 0.000000E+00 | 0.000000E+00 | 0.000000E+00 |

| | Surface No. | |
|---|---|---|
| | 9 | 10 |
| $k=$ | −1.170886E+00 | −4.120300E+00 |
| $A_4=$ | −2.108225E+00 | −2.038239E+00 |
| $A_6=$ | −8.712372E+01 | −1.059966E+01 |
| $A_8=$ | 9.356325E+02 | 1.128080E+02 |
| $A_{10}=$ | −5.209531E+03 | −4.564976E+02 |
| $A_{12}=$ | 1.748140E+04 | 9.726620E+02 |
| $A_{14}=$ | −3.367492E+04 | −1.093386E+03 |
| $A_{16}=$ | 2.768090E+04 | 5.013550E+02 |
| $A_{18}=$ | 0.000000E+00 | 0.000000E+00 |
| $A_{20}=$ | 0.000000E+00 | 0.000000E+00 |

In the sixth embodiment, the form of the aspheric surface equation therein is presented as that in the first embodiment. Besides, the definition of parameters in the following tables is equivalent to that in the first embodiment, so that the repetitive details are not stated here.

The following values for the conditional expressions may be obtained from the data in Table 11 and Table 12.

| Sixth Embodiment (Primary reference wavelength = 555 nm) | | | | | |
|---|---|---|---|---|---|
| InRS41 | InRS42 | HVT41 | HVT42 | ODT % | TDT % |
| −0.12235 | −0.02946 | 0.22744 | 0.41779 | 1.99226 | 0.52327 |
| \|f/f1\| | \|f/f2\| | \|f/f3\| | \|f/f4\| | \|f1/f2\| | \|f2/f3\| |
| 0.91884 | 1.05252 | 0.00526 | 0.84073 | 1.14549 | 0.00500 |
| ΣPPR | ΣNPR | ΣPPR/\|ΣNPR\| | ΣPP | ΣNP | f1/ΣPP |
| 1.89325 | 0.92410 | 2.04874 | −0.31436 | −248.15060 | 4.96949 |
| f4/ΣNP | IN12/f | IN23/f | IN34/f | TP3/f | TP4/f |
| −0.00576 | 0.09957 | 0.05847 | 0.02044 | 0.14020 | 0.14761 |
| InTL | HOS | HOS/HOI | InS/HOS | InTL/HOS | ΣTP/InTL |
| 1.13741 | 1.78020 | 1.73171 | 0.96236 | 0.63892 | 0.79390 |
| (TP1 + IN12)/TP2 | (TP4 + IN34)/TP3 | TP1/TP2 | TP3/TP4 | IN23/(TP2 + IN23 + TP3) | |
| 1.54969 | 1.19868 | 1.04122 | 0.94978 | 0.14821 | |
| \|InRS41\|/TP4 | \|InRS42\|/TP4 | HVT42/HOI | HVT42/HOS | | |
| 0.6311 | 0.1520 | 0.4064 | 0.2347 | | |
| f1/f2 | TP2/TP3 | IN12 | IN23 | IN34 | |
| 1.145 | 1.397 | 0.131 | 0.077 | 0.027 | |
| InTL234 | InTL234/f | HEP | HEP/IN12 | | |
| 0.739 | 0.563 | 0.6495 | 4.967 | | |
| PSTA | PLTA | NSTA | NLTA | SSTA | SLTA |
| −0.005 mm | −0.002 mm | 0.017 mm | 0.008 mm | 0.002 mm | 0.005 mm |

-continued

| Sixth Embodiment (Primary reference wavelength = 555 nm) | | | | | |
|---|---|---|---|---|---|
| VSFS0 | VSFS3 | VSFS7 | VTFS0 | VTFS3 | VTFS7 |
| −0.000 | −0.000 | −0.000 | −0.000 | −0.000 | −0.003 |
| VSMTF0 | VSMTF3 | VSMTF7 | VTMTF0 | VTMTF3 | VTMTF7 |
| 0.599 | 0.544 | 0.539 | 0.599 | 0.469 | 0.408 |
| ISFS0 | ISFS3 | ISFS7 | ITFS0 | ITFS3 | ITFS7 |
| 0.015 | 0.013 | 0.013 | 0.015 | 0.010 | 0.015 |
| ISMTF0 | ISMTF3 | ISMTF7 | ITMTF0 | ITMTF3 | ITMTF7 |
| 0.522 | 0.483 | 0.446 | 0.522 | 0.425 | 0.319 |
| FS | AIFS | AVFS | AFS | | |
| 0.015 | 0.013 | −0.000 | 0.014 | | |

The following values for the conditional expressions may be obtained from the data in Table 11 and Table 12.

| Values Related to Inflection Point of sixth Embodiment (Primary Reference Wavelength = 555 nm) | | | | | | | |
|---|---|---|---|---|---|---|---|
| HIF121 | 0.16300 | HIF121/HOI | 0.15856 | SGI121 | 0.00166 | \|SGI121\|/(\|SGI121\| + TP1) | 0.00896 |
| HIF122 | 0.30238 | HIF122/HOI | 0.29414 | SGI122 | 0.00267 | \|SGI122\|/(\|SGI122\| + TP1) | 0.01433 |
| HIF211 | 0.32088 | HIF211/HOI | 0.31214 | SGI211 | −0.05253 | \|SGI211\|/(\|SGI211\| + TP2) | 0.28218 |
| HIF311 | 0.29696 | HIF311/HOI | 0.28887 | SGI311 | −0.11570 | \|SGI311\|/(\|SGI311\| + TP3) | 0.29374 |
| HIF312 | 0.35762 | HIF312/HOI | 0.34788 | SGI312 | −0.15281 | \|SGI312\|/(\|SGI312\| + TP3) | 0.35455 |
| HIF321 | 0.34092 | HIF321/HOI | 0.33164 | SGI321 | −0.13250 | \|SGI321\|/(\|SGI321\| + TP3) | 0.32263 |
| HIF411 | 0.11986 | HIF411/HOI | 0.11659 | SGI411 | 0.00776 | \|SGI411\|/(\|SGI411\| + TP4) | 0.05035 |
| HIF412 | 0.49894 | HIF412/HOI | 0.48535 | SGI412 | −0.11263 | \|SGI412\|/(\|SGI412\| + TP4) | 0.43479 |
| HIF421 | 0.17996 | HIF421/HOI | 0.17506 | SGI421 | 0.03126 | \|SGI421\|/(\|SGI421\| + TP4) | 0.17595 |

The values pertaining to the outline curve lengths are obtainable from the data in Table 11 and Table 12:

| Sixth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.326 | 0.337 | 0.01146 | 103.52% | 0.268 | 125.85% |
| 12 | 0.326 | 0.325 | −0.00053 | 99.84% | 0.268 | 121.37% |
| 21 | 0.326 | 0.332 | 0.00615 | 101.89% | 0.257 | 128.97% |
| 22 | 0.326 | 0.348 | 0.02197 | 106.75% | 0.257 | 135.12% |
| 31 | 0.326 | 0.356 | 0.03046 | 109.36% | 0.184 | 193.35% |
| 32 | 0.326 | 0.352 | 0.02675 | 108.22% | 0.184 | 191.33% |
| 41 | 0.326 | 0.327 | 0.00097 | 100.30% | 0.194 | 168.42% |
| 42 | 0.326 | 0.332 | 0.00629 | 101.93% | 0.194 | 171.17% |
| ARS | EHD | ARS value | ARS − EHD | (ARS/EHD) % | TP | ARS/TP (%) |
| 11 | 0.326 | 0.337 | 0.011 | 103.48% | 0.268 | 125.85% |
| 12 | 0.343 | 0.342 | −0.001 | 99.83% | 0.268 | 127.72% |
| 21 | 0.364 | 0.373 | 0.009 | 102.36% | 0.257 | 144.90% |
| 22 | 0.408 | 0.449 | 0.041 | 110.11% | 0.257 | 174.51% |
| 31 | 0.409 | 0.455 | 0.046 | 111.27% | 0.184 | 246.96% |
| 32 | 0.468 | 0.515 | 0.047 | 110.13% | 0.184 | 279.91% |
| 41 | 0.523 | 0.575 | 0.051 | 109.82% | 0.194 | 296.53% |
| 42 | 0.724 | 0.766 | 0.042 | 105.85% | 0.194 | 395.30% |

Although the present disclosure is disclosed via the aforementioned embodiments, those embodiments do not serve to limit the scope of the present disclosure. A person skilled in the art may perform various alterations and modifications to the present disclosure without departing from the spirit and the scope of the present disclosure. Hence, the scope of the present disclosure should be defined by the following appended claims.

Despite the fact that the present disclosure is specifically presented and illustrated with reference to the exemplary embodiments thereof, it should be obvious to a person skilled in the art that, various modifications to the forms and details of the present disclosure may be performed without departing from the scope and spirit of the present disclosure defined by the following claims and equivalents thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical image capturing system, from an object side to an image side, comprising:
    a first lens with refractive power;
    a second lens with refractive power;
    a third lens with negative refractive power;
    a fourth lens with refractive power;
    a first image plane, which is an image plane specifically for visible light and perpendicular to an optical axis, and a central field of view of the first image plane has a maximum value of through-focus modulation transfer rate (MTF) at a first spatial frequency; and
    a second image plane, which is an image plane specifically for infrared light and perpendicular to the optical axis, and a central field of view of the second image plane has a maximum value of through-focus modulation transfer rate (MTF) at the first spatial frequency;
    wherein a sequence of the refractive powers from the first lens to the fourth lens is −+−+ or ++−−, the optical image capturing system comprises four lenses with refractive power, at least one of the first lens, the second lens and the fourth lens has positive refractive power, a focal length of the first lens, the second lens, the third lens, and the fourth lens is denoted as f1, f2, f3 and f4 respectively, a focal length of the optical image capturing system is denoted as f, an entrance pupil diameter of the optical image capturing system is denoted as HEP, a distance on the optical axis from an object-side surface of the first lens to the first image plane is denoted as HOS, a distance on the optical axis from the object-side surface of the first lens to an image-side surface of the fourth lens is denoted as InTL, half of a maximum angle of view of the optical image capturing system is denoted as HAF, the optical image capturing system has a maximum image height HOI perpendicular to the optical axis on the first image plane, a distance on the optical axis between the first image plane and the second image plane is denoted as FS, and conditions as follows are satisfied: $1 \leq f/HEP \leq 10$, $0 \deg < HAF \leq 150 \deg$, and $|FS| \leq 25$ μm.

2. The optical image capturing system of claim 1, wherein a wavelength of the infrared light ranges from 700 nm to 1300 nm, the first spatial frequency is denoted as SP1, and a condition as follows is satisfied: $SP1 \leq 440$ cycles/mm.

3. The optical image capturing system of claim 1, wherein an outline curve starting from an intersection point of the optical axis and any surface of any one of the four lenses, travelling along an outline of the surface, and ending at a coordinate point on the surface which has a vertical height of ½ entrance pupil diameter from the optical axis, has an outline curve length denoted as ARE, and a condition as follows is satisfied: $0.9 \leq 2(ARE/HEP) \leq 2.0$.

4. The optical image capturing system of claim 1, wherein the optical image capturing system satisfies a condition as follows: $1 \leq f1/f2 \leq 2$.

5. The optical image capturing system of claim 1, wherein an outline curve starting from an intersection point of the optical axis and an object-side surface of the fourth lens, travelling along an outline of the object-side surface, and ending at a coordinate point on the surface which has a vertical height of ½ entrance pupil diameter from the optical axis, has an outline curve length denoted as ARE41; an outline curve starting from an intersection point of the optical axis and the image-side surface of the fourth lens, travelling along an outline of the image-side surface, and ending at a coordinate point on the surface that has a vertical height of ½ entrance pupil diameter from the optical axis, has an outline curve length denoted as ARE42; a central thickness of the fourth lens on the optical axis is denoted as TP4, and conditions as follows are satisfied: $0.05 \leq ARE41/TP4 \leq 25$, and $0.05 \leq ARE42/TP4 \leq 25$.

6. The optical image capturing system of claim 1, wherein the first lens has negative refractive power, a TV distortion for image formation in the optical image capturing system is TDT, a transverse aberration of a longest operation wavelength of a positive direction tangential fan of the optical image capturing system passing through an edge of an entrance pupil and incident at a position of 0.7 HOI on the first image plane is denoted as PLTA, a transverse aberration of a shortest operation wavelength of the positive direction tangential fan of the optical image capturing system passing through the edge of the entrance pupil and incident at the position of 0.7 HOI on the first image plane is denoted as PSTA, a transverse aberration of the longest operation wavelength of a negative direction tangential fan of the optical image capturing system passing through the edge of the entrance pupil and incident at the position of 0.7 HOI on the first image plane is denoted as NLTA, a transverse aberration of the shortest operation wavelength of a negative direction tangential fan of the optical image capturing system passing through the edge of the entrance pupil and incident at the position of 0.7 HOI on the first image plane is denoted as NSTA, a transverse aberration of the longest operation wavelength of a sagittal fan of the optical image capturing system passing through the edge of the entrance pupil and incident at the position of 0.7 HOI on the first image plane is denoted as SLTA, a transverse aberration of the shortest operation wavelength of the sagittal fan of the optical image capturing system passing through the edge of the entrance pupil and incident at the position of 0.7 HOI on the first image plane is denoted as SSTA, and conditions as follows are satisfied: $PLTA \leq 100$ μm, $PSTA \leq 100$ μm, $NLTA \leq 100$ μm, $NSTA \leq 100$ μm, $SLTA \leq 100$ μm, $SSTA \leq 100$ μm, and $|TDT| < 100\%$.

7. The optical image capturing system of claim 1, further comprising an aperture, wherein a distance from the aperture to the first image plane on the optical axis is defined as InS, a distance on the optical axis from an object-side surface of the first lens to the first image plane is denoted as HOS, and a condition as follows is satisfied: $0.2 \leq InS/HOS \leq 1.1$.

8. An optical image capturing system, from an object side to an image side, comprising:
- a first lens with refractive power;
- a second lens with positive refractive power;
- a third lens with negative refractive power;
- a fourth lens with refractive power;
- a first image plane, which is an image plane specifically for visible light and perpendicular to an optical axis, and a central field of view of the first image plane has a maximum value of through-focus modulation transfer rate (MTF) at a first spatial frequency of 220 cycles/mm; and
- a second image plane, which is an image plane specifically for infrared light and perpendicular to the optical axis, and a central field of view of the second image plane has a maximum value of the through-focus modulation transfer rate (MTF) at the first spatial frequency of 220 cycles/mm;
- wherein a sequence of the refractive powers from the first lens to the fourth lens is −+−+or ++−−, the optical image capturing system comprises four lenses with refractive power, a focal length of the first lens, the second lens, the third lens, and the fourth lens is denoted as f1, f2, f3 and f4 respectively, a focal length of the optical image capturing system is denoted as f, an entrance pupil diameter of the optical image capturing system is denoted as HEP, a distance from an object-side surface of the first lens to the first image plane on the optical axis is denoted as HOS, a distance from the object-side surface of the first lens to an image-side surface of the fourth lens on the optical axis is denoted as InTL, half of a maximum angle of view of the optical image capturing system is denoted as HAF, the optical image capturing system has a maximum image height HOI on the first image plane perpendicular to the optical axis, an outline curve starting from an intersection point of the optical axis and any surface of any one of the four lenses, travelling along an outline of the surface, and ending at a coordinate point on the surface which has a vertical height of ½ entrance pupil diameter from the optical axis, has an outline curve length denoted as ARE, a distance between the first image plane and the second image plane on the optical axis is denoted as FS, and conditions as follows are satisfied: 1≤f/HEP≤10, 0 deg<HAF≤150 deg, |FS|≤25 μm, and 0.9≤2(ARE/HEP)≤2.0.

9. The optical image capturing system of claim 8, wherein a maximum effective half diameter of any surface of any one of the four lenses is denoted as EHD, an outline curve starting from the intersection point of the optical axis and any surface of any one of the four lenses, travelling along an outline of the surface, and ending at a point which is defined as the maximum effective half diameter, has an outline curve length denoted as ARS, and a condition as follows is satisfied: 0.9≤ARS/EHD≤2.0.

10. The optical image capturing system of claim 8, wherein a distance between the first lens and the second lens on the optical axis is denoted as IN12, and a condition as follows is satisfied: 0<IN12/f≤0.25.

11. The optical image capturing system of claim 8, wherein a distance between the first lens and the second lens on the optical axis is denoted as IN12, a distance between the second lens and the third lens on the optical axis is denoted as IN23, a distance between the third lens and the fourth lens on the optical axis is denoted as IN34, and a condition as follows is satisfied: IN12>IN23>IN34.

12. The optical image capturing system of claim 8, wherein at least one surface of the first lens, the second lens, the third lens and the fourth lens has at least one inflection point.

13. The optical image capturing system of claim 8, wherein central thicknesses of the second lens and the third lens on the optical axis are denoted as TP2 and TP3 respectively, and a condition as follows is satisfied: 1≤TP2/TP3≤2.

14. The optical image capturing system of claim 8, wherein a distance on the optical axis from the object-side surface of the second lens to an image-side surface of the fourth lens is denoted as InTL234, and a condition as follows is satisfied: 0<InTL234/f≤0.6.

15. The optical image capturing system of claim 8, wherein a distance between the first lens and the second lens on the optical axis is denoted as IN12, and a condition as follows is satisfied: 3≤HEP/IN12≤6.

16. The optical image capturing system of claim 8, wherein the second lens has a concave object-side surface on the optical axis and a convex image-side surface on the optical axis.

17. The optical image capturing system of claim 8, wherein a distance on the optical axis from the object-side surface of the first lens to an image-side surface of the fourth lens is denoted as InTL, and the optical image capturing system satisfies a condition as follows: 1 mm≤InTL≤1.2 mm.

18. An optical image capturing system, from an object side to an image side, comprising:
- a first lens with refractive power;
- a second lens with positive refractive power;
- a third lens with negative refractive power;
- a fourth lens with negative refractive power;
- a first average image plane, which is an image plane specifically for visible light and perpendicular to the optical axis, and configured at an average position of the through-focus positions where all of central field of view, 0.3 field of view and 0.7 field of view of the optical image capturing system have their respective maximums of through-focus modulation transfer rates (values of MTF) of the visible light at a first spatial frequency of 220 cycles/mm; and
- a second average image plane, which is an image plane specifically for infrared light and perpendicular to the optical axis, and configured at the average position of the through-focus positions where all of central field of view, 0.3 field of view and 0.7 field of view of the optical image capturing system have their respective maximums of through-focus modulation transfer rates (values of MTF) of the infrared light at the first spatial frequency of 220 cycles/mm;
- wherein a sequence of the refractive powers from the first lens to the fourth lens is −+−+or ++−−, the optical image capturing system comprises four lenses with refractive power, a focal length of the first lens, the second lens, the third lens, and the fourth lens is denoted as f1, f2, f3 and f4 respectively, a focal length of the optical image capturing system is denoted as f, an entrance pupil diameter of the optical image capturing system is denoted as HEP, a distance from an object-side surface of the first lens to the first average image plane on the optical axis is denoted as HOS, a distance from the object-side surface of the first lens to an image-side surface of the fourth lens on the optical axis is denoted as InTL, half of a maximum angle of view of the optical image capturing system is denoted as HAF, the optical image capturing system has a maximum image height HOI on the first average image plane perpendicular to the optical axis, an outline curve starting from an intersection point of the optical axis and any surface of any one of the four lenses, travelling along an outline of the surface, and ending at a coordinate point on the surface that has a vertical height of ½ entrance pupil diameter from the optical axis which has an outline curve length denoted as ARE, a distance between the first average image plane and the second average image plane is denoted as AFS, and conditions as follows are satisfied: $1 \leq f/HEP \leq 10$, $0 \deg < HAF \leq 150 \deg$, $|AFS| \leq 25$ μm, and $0.9 \leq 2(ARE/HEP) \leq 2.0$.

19. The optical image capturing system of claim 18, wherein a maximum effective half diameter of any surface of any one of the four lenses is denoted as EHD, an outline curve starting from the intersection point of the optical axis and any surface of any one of the four lenses, travelling along an outline of the surface, and ending at a point which defines the maximum effective half diameter, has an outline curve length denoted as ARS, and a condition as follows is satisfied: $0.9 \leq ARS/EHD \leq 2.0$.

20. The optical image capturing system of claim 18, wherein the optical image capturing system satisfies a condition as follows: $1 \leq f1/f2 \leq 2$.

21. The optical image capturing system of claim 18, wherein central thicknesses of the second lens and the third lens on the optical axis is denoted as TP2 and TP3 respectively, and a condition as follows is satisfied: $1 \leq TP2/TP3 \leq 2$.

22. The optical image capturing system of claim 18, wherein a distance on the optical axis from the object-side surface of the second lens to an image-side surface of the fourth lens is denoted as InTL234, and a condition as follows is satisfied: $0 < InTL234/f \leq 0.6$.

23. The optical image capturing system of claim 18, further comprising an aperture and an image sensing device, wherein the image sensing device is configured behind the first average image plane and includes at least 100 thousands pixels, a distance from the aperture to the first average image plane on the optical axis is denoted as InS, a distance on the optical axis from an object-side surface of the first lens to the first image plane is denoted as HOS, and a condition as follows is satisfied: $0.2 \leq InS/HOS \leq 1.1$.

* * * * *